(12) United States Patent
Hirakata et al.

(10) Patent No.: US 7,138,974 B2
(45) Date of Patent: *Nov. 21, 2006

(54) LIQUID CRYSTAL DISPLAY DEVICE HAVING AN IMPROVED LIGHTING DEVICE

(75) Inventors: Junichi Hirakata, Chiba (JP); Kikuo Ono, Mobara (JP); Akira Shingai, Chiba (JP)

(73) Assignees: Hitachi, Ltd., Tokyo (JP); Hitachi Device Engineering Co., Ltd., Chiba-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/636,612

(22) Filed: Aug. 8, 2003

(65) Prior Publication Data

US 2004/0051692 A1    Mar. 18, 2004

Related U.S. Application Data

(63) Continuation of application No. 09/934,696, filed on Aug. 23, 2001, now Pat. No. 6,636,190.

(30) Foreign Application Priority Data

Oct. 12, 2000   (JP) .............................. 2000-316855

(51) Int. Cl.
*G09G 3/36* (2006.01)

(52) U.S. Cl. ......................................... 345/98; 345/87
(58) Field of Classification Search .................. 345/52, 345/74.1, 205, 211, 213, 101, 102, 106, 63–66, 345/77–87, 88–100, 204, 207, 214; 205/777.5; 257/72; 323/282; 327/536, 561; 340/57
See application file for complete search history.

(56) References Cited

U.S. PATENT DOCUMENTS

| | | | |
|---|---|---|---|
| 5,432,626 A | 7/1995 | Sasuga et al. | |
| 5,640,216 A | 6/1997 | Hasegawa et al. | |
| 5,677,598 A * | 10/1997 | De Hair et al. | 315/147 |
| 5,818,172 A | 10/1998 | Lee | |
| 6,066,920 A | 5/2000 | Torihara et al. | |
| 6,118,219 A | 9/2000 | Okigami et al. | |
| 6,315,440 B1 * | 11/2001 | Satoh | 362/561 |
| 6,636,190 B1 * | 10/2003 | Hirakata et al. | 345/74.1 |
| 6,670,941 B1 * | 12/2003 | Albu et al. | 345/98 |
| 2002/0121865 A1 | 9/2002 | Nakatsuka et al. | |
| 2002/0154256 A1 | 10/2002 | Gotoh et al. | |

FOREIGN PATENT DOCUMENTS

| | | |
|---|---|---|
| EP | 0 524 766 A2 | 7/1992 |
| JP | 05-257142 | 3/1992 |
| JP | 07-175035 | 12/1993 |
| JP | 07-281185 | 4/1994 |

(Continued)

*Primary Examiner*—Nitin Patel
(74) *Attorney, Agent, or Firm*—Reed Smith LLP; Stanley P. Fisher, Esq.; Juan Carlos A. Marquez, Esq.

(57) ABSTRACT

A liquid crystal display device includes a liquid crystal display panel having plural pixels, a lighting device having at least one light source and projecting light generated by the light source on the liquid crystal display panel, and a circuit supplying a first current during a first period and a second current smaller than the first current during a second period to the light source alternately. The circuit includes a current monitoring circuit which measures the first current and the second current, and a light control circuit which adjusts a ratio of the first period to the second period based upon a signal from the current monitoring circuit.

5 Claims, 30 Drawing Sheets

| | FOREIGN PATENT DOCUMENTS | | | JP | 11-67485 | 8/1997 |
|---|---|---|---|---|---|---|
| | | | | JP | 11-283759 | 3/1998 |
| JP | 08-008083 | 6/1994 | | JP | 1-298058 | 4/1998 |
| JP | 09-260074 | 3/1996 | | JP | 11-305197 | 4/1998 |
| JP | 09-266078 | 3/1996 | | KR | 1998-70293 | 12/1997 |
| JP | 09-288262 | 4/1996 | | | | |
| JP | 10-199480 | 1/1997 | | | | |
| JP | 11-038381 | 7/1997 | | | | |

* cited by examiner

FIG. 4(a)

RECTANGULAR WAVEFORM OF DC CURRENT INPUT TO AN INVERTER CIRCUIT

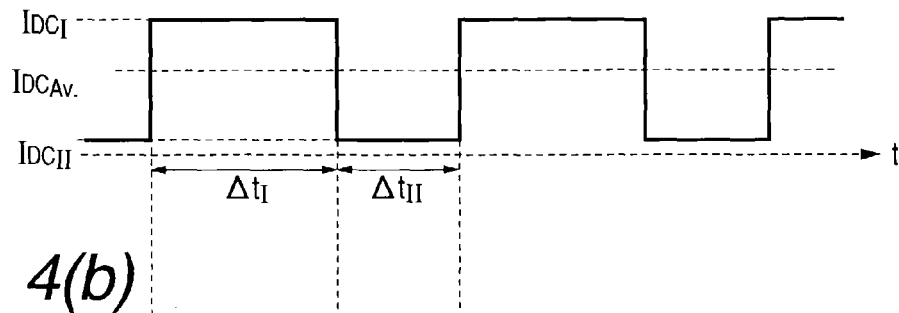

FIG. 4(b)

WAVEFORM OF AC CURRENT INPUT TO A PRIMARY WINDING OF A TRANSFORMAER FROM THE INVERTER CIRCUIT

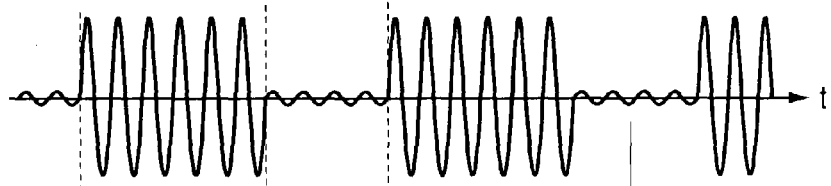

FIG. 4(c)

WAVEFORM OF AC CURRENT IN A SECONDARY CIRCUIT

"FLAT" PRODUCED WHEN DISCHARGE IS NOT MAINTAINED

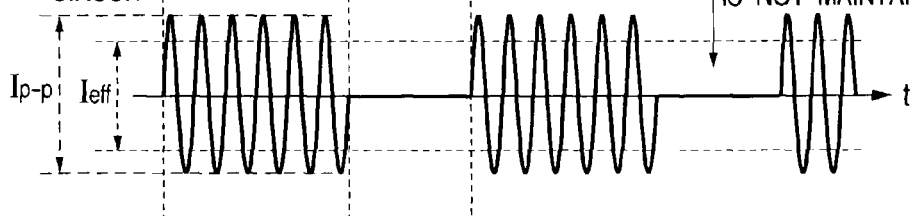

FIG. 4(d)

WAVEFORM OF VIRTUAL AC CURRENT IN THE SECONDARY CIRCUIT CALCULATED BASED ON MEASURED EFFECTIVE VALUE OF THE CURRENT IN THE SECONDARY CIRCUIT

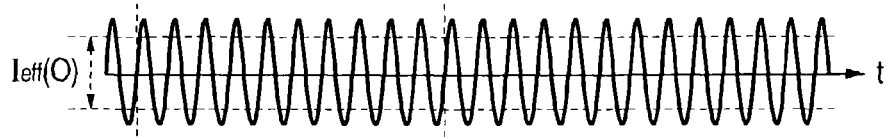

SYNC SIGNAL Vsync

DISPLAY SIGNAL

BACKLIGHT-LIGHTING SIGNAL

BACKLIGHT BRIGHTNESS WAVEFORM

SYNC SIGNAL Vsync

BACKLIGHT BRIGHTNESS WAVEFORM
DUTY RATIO=75%, HIGH BRIGHTNESS

BACKLIGHT BRIGHTNESS WAVEFORM
DUTY RATIO=50%, MEDIUM BRIGHTNESS

BACKLIGHT BRIGHTNESS WAVEFORM
DUTY RATIO=25%, LOW BRIGHTNESS

BACKLIGHT BRIGHTNESS WAVEFORM
DUTY RATIO=50%, HIGH BRIGHTNESS

LIQUID CRYSTAL DISPLAY DEVICE HAVING AN IMPROVED LIGHTING DEVICE

This application is a continuation application of U.S. application Ser. No. 09/934,696 filed on Aug. 23, 2001 now U.S. Pat. No 6,636,190.

BACKGROUND OF THE INVENTION

The present invention relates to a liquid crystal display device, and relates to a light source suitable for efficiently enhancing a brightness of a display screen and making it uniform over the entire display screen area, and a control method therefor.

A display device using a liquid crystal display element (also called a liquid crystal display panel), an electroluminescent element (which is divided into an organic system and an inorganic system depending on a fluorescent material used, hereinafter referred to as an EL element), a field emission device (hereinafter referred to as an FE element) or the like displays an image without requiring a space (a vacuum envelope) for scanning an electron beam two-dimensionally on the back of the display screen as in a cathode ray tube (CRT). Accordingly, these display devices have characteristics that they are thin and light as compared with the CRT, and power consumption is low. These display devices are sometimes called a flat panel display because of its external appearance.

The display device using a liquid crystal display element, an EL element or a field emission device or the like has been widely spread due to the above-described advantage with respect to the CRT in place of a display device using the CRT in various uses. The fact that replacement from the CRTs to the flat panel displays has been progressed is also due to a technical innovation in enhancement of quality of images of a liquid crystal display element or an EL element. With the recent spreading of multi-media or the Internet, displaying of moving pictures has been strongly demanded. For example, in the display device using a liquid crystal display element, an improvement in a liquid crystal material or a driving method has been made for realizing a moving picture display. However, in the display device called a flat panel display as well as a display device using a liquid crystal display element, an increase of brightness is an important factor for displaying an image equal in quality to that of a conventional CRT.

For obtaining a moving picture display equal in quality to that of the CRT, it is essential to have impulse-type light generation as by scanning an electron beam projected from an electron gun on each pixel to excite phosphors of respective pixels to luminescence. On the other hand, for example, the liquid crystal display device utilizes the hold-type light generation using a backlight system by way of a fluorescent lamp, and therefore, complete moving picture display has been difficult.

The processes for solving the above-described problems in connection with the liquid crystal display devices reported are an improvement in a liquid crystal material for a liquid crystal display cell (a liquid crystal layer sealed between substrates) or a display mode, and a method for using a direct-light backlight (a light source construction for arranging a plurality of fluorescent lamps opposite to a display screen of a liquid crystal display element). FIG. 31 shows one example of a method of lighting of the direct-light backlight proposed for the moving picture display, using a layout of the direct-light backlight having eight (8) tubular lamps arranged opposite to a display screen (a frame indicated by the broken line), and timing of lighting-start time of the lamps provided thereon in terms of brightness waveforms. The brightness waveforms shown in FIG. 31 show that upward projections depict brightness rises.

As is apparent from FIG. 31, the lighting-start time of the respective fluorescent tubes is successively delayed from one fluorescent tube at the top to one fluorescent tube at the bottom. A series of lighting operation is synchronized with a scanning period of image display signals, and is repeated every image display period of one frame (a period for transferring video signals to all pixels of a display screen). (See "LIQUID CRYSTAL", Vol. 3, No. 2 (1999), p. 99–p. 106.)

On the other hand, there is a technique for modulating brightness of a light source according to a scene of a moving picture signals transmitted to the liquid crystal display device. In this technique, a maximum brightness data, a minimum brightness data and an average brightness data of a video signal transmitted to the liquid crystal display device are read every image (in the case of a movie film, every "frame") constituting a moving picture frame to control a current (hereinafter called a lamp current) supplied to a light source according to the data. Suppose a current supplied normally to the light source is a reference current (for example, 4.5 mA), in the case of an image which is bright over the entire area, a lamp current is set to be higher than the reference current (for example, 8 mA) in a certain period, and is returned to the reference current later. Conversely, in the case of an image which is dark over the entire area, a lamp current is set to be lower than the reference current (for example, 1.5 mA). (See "NIKKEI ELECTRONICS", Nov. 15, 1999 issue, No. 757, 1999, p 139–p 146)

In the case of the former (the wholly bright image), temperature rise of a light source is larger by a portion corresponding to an increase in current supplied to the light source from the reference current. In the case of a fluorescent lamp, vapor pressure of mercury (Hg) within a fluorescent lamp rises due to rising of temperature thereof, and mercury atoms (the amount of mercury vapor) increase within the fluorescent lamp. On the other hand, surplus mercury atoms are present within the fluorescent lamp, there is increased probability that ultraviolet rays produced within the fluorescent lamp due to collision between hydrogen atoms and electrons are absorbed by the mercury atoms, and brightness of the fluorescent lamp decreases. For avoiding this influence, a lamp current is set to be higher than the reference current in the period described above, after which the lamp current is returned to the reference current before the mercury vapor pressure within the fluorescent lamp changes. By changing the lamp current as described above, the brightness of the fluorescent lamp is made higher than that when the reference current is supplied thereto.

In the case of the latter (the wholly dark image), when the brightness of the light source is high, it is necessary to suppress a leakage of a small amount of light from a pixel which displays black or a color close thereto. In the wholly dark screen, even for the pixel whose light transmission is set to be highest within the screen, the absolute amount of light to be transmitted is small. Because of this, the lamp current is set to be lower than the reference current, and the brightness of the light source is suppressed to restrict leakage of light from a pixel which displays black or color close thereto, and power consumption in the light source is reduced.

From a combination of the two techniques, the dynamic range of brightness (the ratio of the maximum brightness to the minimum brightness) in the moving picture image as a whole becomes 2.8 times that of the conventional one, and the contrast ratio is from 400:1 to 500:1, which is not less than 2 times that of the conventional liquid crystal display device.

SUMMARY OF THE INVENTION

In a case where in the liquid crystal display device, the technique of lighting light sources in turn in the direct-light backlight as described above is carried out, if the number of lamps (fluorescent lamps) mounted on the direct-light backlight is increased, for example, a light-generating duration of each lamp during a lighting operation of one period (corresponding to one frame) should be shortened. Because of this, the brightness efficiency of the whole direct-light backlight lowers.

On the other hand, when power applied to each lamp is increased in order to raise a brightness of a display image, a liquid crystal cell is locally heated by heat generation of the lamp, and display uniformity also lowered. An image display in the liquid crystal display device is carried out by twisting a liquid crystal molecule sealed in a liquid crystal cell of a liquid crystal display element mounted in a direction corresponding to the image information (field applied to a liquid crystal cell), and changing the light transmission to the desired value. For twisting the liquid crystal molecule within the liquid crystal cell decidedly in a direction in response to the image information, a chiral agent together with the liquid crystal molecule is sometimes incorporated into the liquid crystal cell. A layer of substances which are present within the liquid crystal cell including these additives is sometimes called "a liquid crystal layer". However, when a temperature of the liquid crystal cell locally rises, the light transmission of the liquid crystal cell varies in that portion according to the change in the refractive index of the liquid crystal molecule present in that portion, and therefore, non-uniformity occurs in the display image. Further, the viscosity of the liquid crystal layer lowers in that portion, and the directions of a portion of the liquid crystal molecules becomes random (the liquid crystal layer becomes isotropic). Accordingly, the light transmission of a part of the liquid crystal cell fails to correspond to the electric field applied to the liquid crystal molecules, and the display non-uniformity described above occurs. This problem often occurs, as compared with a liquid crystal display device of a twisted nematic type (TN type), in a vertical alignment type (VA type) in which a temperature at which the liquid crystal layer becomes isotropic is low (which is called a transition temperature of liquid crystal material or a transition temperature), or in a liquid crystal display device of the horizontal electric field type (the in-plane-switching type, or the ISP type). Therefore, it is difficult to increase the display brightness of the ISP type liquid crystal display device.

Further, in a case where the technique of adjusting the brightness of a light source for every image formed by moving picture signals is applied to the liquid crystal display device, setting of timing for reduce a large lamp current of the light source for the wholly bright image to the reference current is difficult in practical use. As described above, for increasing the brightness of the light source from that provided by the reference current, initially the lamp current has to be made higher than the reference current, and then the lamp current has to be returned to the reference current before the mercury vapor pressure within the fluorescent lamp changes. However, timing for changing the lamp currents has to be set experientially, for example, on the basis of correlation between measured data of changes in temperature of the light source (the fluorescent lamp) and the brightness of the light source. Further, since in this technique, the light source brightness at the respective image display time is changed according to the brightness of the respective image, the contrast ratio for every image remains the value that may be achieved by the conventional liquid crystal display device. In other words, even if this technique is applied to the liquid crystal display device, in a case where an image whose brightness rarely varies for a given period (a period in which a plurality of image data are transmitted to the liquid crystal display device) such as a static image is displayed, the contrast ratio cannot be enhanced.

The relationship between the current supplied to the light source of the liquid crystal display device and the temperature of the light source or the brightness is discussed, for example, in Japanese Publications such as Japanese Patent Laid-Open Nos. Hei 11-38381(laid-open on Feb. 12, 1999), 9-260074(laid-open on Oct. 3, 1997), 11-283759(laid-open on Oct. 15, 1999), 7-175035(laid-open on Jul. 14, 1995), and 8-8083(laid-open on Jan. 12, 1996). However, even if these publications are referred to, it is difficult to find the conditions for adequately setting switching timing of the lamp current.

An object of the present invention is to provide a liquid crystal display device by which brightness of an image displayed on a liquid crystal display panel (a liquid crystal display element) mounted thereon is efficiently improved, and various problems associated with heat generation of a light source for illuminating the liquid crystal display panel with light are solved.

A further object of the present invention is to provide a liquid crystal display device by which an image or video is displayed with a contrast ratio as high as that of a CRT.

For achieving the aforementioned objects, the present invention provides liquid crystal display devices configured as mentioned below.

In accordance with an embodiment of the present invention, there is provided a liquid crystal display device comprising: a liquid crystal display panel having a plurality of pixels; a lighting device having at least one light source and projecting light generated by the at least one light source on the liquid crystal display panel; and a circuit for supplying alternately a first alternating current of a first amplitude during a first period $t_1$ and a second alternating current of a second amplitude during a second period $t_2$ to the at least one light source, the first amplitude being greater than the second amplitude, wherein the circuit controls the first alternating current and the second alternating current such that the following relationship is satisfied: first electric power E1 is lower than second electric power E2, where the first power E1 is defined as $\{(t_1 \times i_{p-p}(1) \times V_{p-p}(1))/2\} + \{(t_2 \times i_{p-p}(2) \times V_{p-p}(2))/2\}$, $i_{p-p}(1)$=a peak-to-peak value of the first alternating current flowing through a respective one of the at least one light source during the first period $t_1$, $V_{p-p}(1)$=a peak-to-peak value of a voltage across the respective one of the at least one light source during the first period $t_1$, $i_{p-p}(2)$=a peak-to-peak value of the second alternating current flowing through the respective one of the at least one light source during the second period $t_2$, $V_{p-p}(2)$=a peak-to-peak value of a voltage across the respective one of the at least one light source during the second period $t_2$, the second electric power E2 is defined as $(t_1+t_2) \times (I_{eff} \times V_{eff})$, $I_{eff}$ is an effective value of a current flowing through the respective one of the at least one light source during the first period $t_1$ plus and the second period $t_2$, and $V_{eff}$ is an effective value of a voltage across the respective one of the at least one light source during the first period $t_1$ plus and the second period $t_2$.

In accordance with another embodiment of the present invention, there is provided a liquid crystal display device comprising: a liquid crystal display panel having a plurality of pixels; a lighting device having at least one light source and projecting light generated by the at least one light source on the liquid crystal display panel; and a circuit for alternately supplying a lamp current to the at least one light source during a first period $t_1$ and ceasing to supply the lamp current to the at least one light source during a second period $t_2$, wherein the following relationship is satisfied: first electric power E1 is lower than second power E2, where the first power E1 is defined as $(t_1 \times i_{p-p} \times V_{p-p})/2$, $i_{p-p}$ = a peak-to-peak value of the lamp current flowing through a respective one of the at least one light source during the first period $t_1$, $V_{p-p}$ = a peak-to-peak value of a voltage across the respective one of the at least one light source during the first period $t_1$, the second power E2 is defined as $(t_1+t_2) \times (I_{eff} \times V_{eff})$, $I_{eff}$ is an effective value of the lamp current flowing through the respective one of the at least one light source during the first period $t_1$ plus and the second period $t_2$, and $V_{eff}$ is an effective value of a voltage across the respective one of the at least one light source during the first period $t_1$ plus and the second period $t_2$.

In accordance with another embodiment of the present invention, there is provided a liquid crystal display device comprising: a liquid crystal display panel having a plurality of pixels; a lighting device having at least one light source and projecting light generated by the at least one light source on the liquid crystal display panel; and a circuit for supplying alternately a first voltage having a first effective value $V_1$ during a first period $t_1$ and a second voltage having a second effective value $V_2$ during a second period $t_2$ to the at least one light source, the first voltage producing a first current having a first effective value $i_1$ flowing through the respective one of the at least one light source during the first period $t_1$, the second voltage producing a second current having a second effective value $i_2$ flowing through the respective one of the at least one light source during the second period $t_2$, the second effective value $i_2$ being smaller than the first effective value $i_1$, wherein a first ratio of a first brightness to a first electric power is greater than a second ratio of a second brightness to a second electric power, where the first brightness is a brightness produced by the respective one of the at least one light source during the first period $t_1$ plus the second period $t_2$, the first electric power is defined as $\{(t_1 \times V_1 \times i_1)+(t_2 \times V_2 \times i_2)\}/(t_1+t_2)$, the second electric power is defined as $(V_{eff} \times i_{eff})$, $V_{eff}$ is an effective value produced by a combination of the first voltage supplied during the first period $t_1$ and the second voltage supplied during the second period $t_2$, $i_{eff}$ is an effective value produced by a combination of the first current flowing during the first period $t_1$ and the second current flowing during the second period $t_2$, and the second brightness is a brightness produced by the respective one of the at least one light source supplied with the second electric power.

In accordance with another embodiment of the present invention, there is provided a liquid crystal display device comprising: a liquid crystal display panel having a plurality of pixels; a lighting device having a cold-cathode tube having an end-to-end length L (cm) and projecting light generated by the cold-cathode tube on the liquid crystal display panel; and a circuit for supplying alternately a first electric power $W_1$ (W) during a first period $t_1$ and a second electric power $W_2$ (W) during a second period $t_2$ to the cold-cathode tube, the second electric power $W_2$ being lower than the first power $W_1$, wherein a ratio of the first electric power $W_1$ to the end-to-end length L is greater than 0.2 W/cm, and a ratio of the second electric power $W_2$ to the end-to-end length L is equal to or less than 0.1 W/cm.

In accordance with another embodiment of the present invention, there is provided a liquid crystal display device comprising: a liquid crystal display panel having a plurality of pixels; a lighting device having at least one light source and projecting light generated by the at least one light source on the liquid crystal display panel; and a circuit for supplying alternately a first current having a first effective value $i_1$ during a first period $t_1$ and a second current having a second effective value $i_2$ during a second period $t_2$ to a respective one of the at least one light source, the first effective value $i_1$ being greater than a rated value of a lamp current flowing through the respective one of the at least one light source, the second effective value $i_2$ being smaller than the rated value of the lamp current wherein the first effective value $i_1$, the second effective value $i_2$, the first period $t_1$ and the second period $t_2$ are selected such that an integral of brightness produced by the respective one of the at least one light source over the first period $t_1$ plus the second period $t_2$ is greater than an integral of brightness produced by the respective one of the at least one light source supplied with the lamp current of the rated value over the first period $t_1$ plus the second period $t_2$.

In accordance with another embodiment of the present invention, there is provided a liquid crystal display device comprising: a liquid crystal display panel having a plurality of pixels; a lighting device having at least one light source and projecting light generated by the at least one light source on the liquid crystal display panel; a control circuit configured so as to switch between a first operation and a second operation, the first operation supplying a first current having a first effective value $i_1$ during a first period $t_1$ to the at least one light source, and the second operation supplying a second current having a second effective value $i_2$ during a second period $t_2$ to the at least one light source, the second effective value $i_2$ being smaller than the first effective value $i_1$; and a temperature detector circuit for detecting a temperature of the at least one light source, wherein the temperature detector circuit transmits a signal to the control circuit when a temperature of an outside wall of the at least one light source exceeds 65° C., and the control circuit switches from the first operation to the second operation in response to the signal.

In accordance with another embodiment of the present invention, there is provided a liquid crystal display device comprising: a liquid crystal display panel having a plurality of pixels; a lighting device having at least one light source and projecting light generated by the at least one light source on the liquid crystal display panel; a control circuit configured so as to switch between a first operation and a second operation, the first operation supplying a first current having a first effective value $i_1$ during a first period $t_1$ to the at least one light source, and the second operation supplying a second current having a second effective value $i_2$ during a second period $t_2$ to the at least one light source, the second effective value $i_2$ being smaller than the first effective value $i_1$; and a brightness detector circuit for detecting brightness of the at least one light source, wherein the brightness detector circuit transmits a signal to the control circuit when the brightness begins to reduce in the first period $t_1$, and the control circuit switches from the first operation to the second operation in response to the signal.

BRIEF DESCRIPTION OF THE DRAWINGS

In the accompanying drawings, in which like reference numerals designate similar components throughout the figures, and in which:

FIG. 4(a) is a waveform view showing a waveform of DC current input in an inverter circuit on the primary side when lighting of a light source according to the present invention is carried out by a, control circuit CTRL shown in FIG. 1, FIG. 4(b) is a waveform view showing a waveform of AC current input in the primary side of a transformer TR, FIG. 4(c) is a waveform view showing a waveform in which an AC current produced in a secondary side circuit is measured by an oscilloscope, and FIG. 4(d) is a waveform view showing a virtual current waveform depicted on the basis of a measured current value by an ammeter of AC current produced in a secondary side circuit;

DETAILED DESCRIPTION

Figure 1:
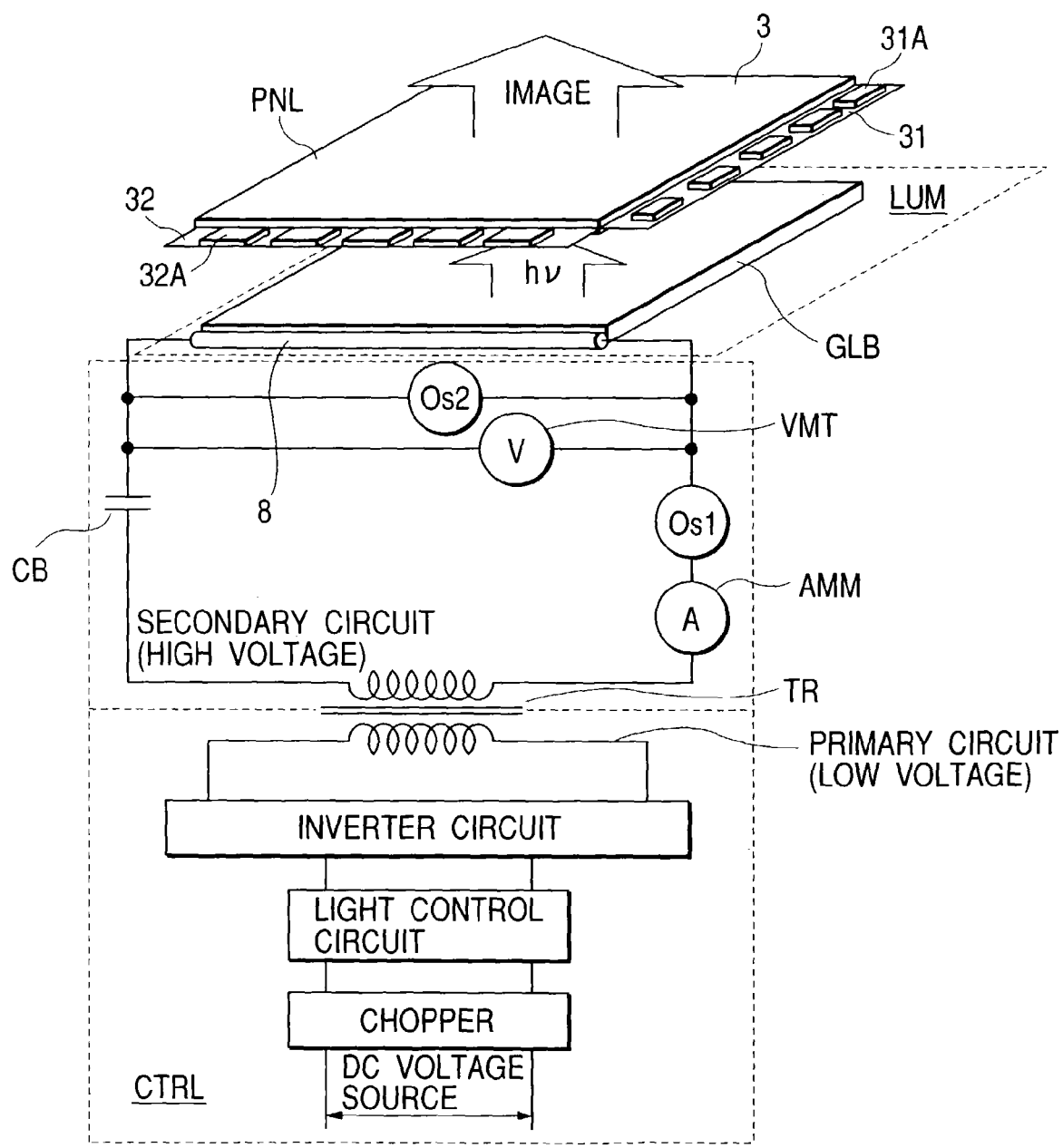
FIG. 1 is a schematic view for explaining an arrangement of main constituent elements of a liquid crystal display device according to the present invention.

In any of the above-described liquid crystal display devices, it is possible to solve the problems that are intended to be solved by the present invention and other various problems, details of which will be described with reference to the embodiment of the present invention.

The specific embodiments of the present invention will be described hereinafter with reference to the drawings associated therewith. In the drawings referred to in the following description, parts having the same function are indicated by the same reference numerals, repeated description of which is omitted.

<<Constitution of a Liquid Crystal Display Device>>

FIG. 1 shows constituent elements related to the present invention in one example of the liquid crystal display device.

A liquid crystal display panel (a liquid crystal display element) used for an image display of a liquid crystal display device is provided with a pair of substrates 3 arranged opposite to each other, a liquid crystal layer (not shown) sealed between the substrates, and driver elements 31A, 32A for supplying a display signal to a pixel electrode formed on at least one of the pair of substrates 3 or controlling a supply timing of the display signal. In the liquid crystal display panel PNL, a plurality of pixels provided with pixel electrodes are arranged in the surface of the substrate.

In FIG. 1, a lighting device LUM for illuminating the liquid crystal display panel PNL with light is provided with a tubular fluorescent lamp 8 (illustrated as a cold-cathode tube, also called as a light source) and a light guide GLB. The upper surface of the light guide GLB is opposed to the lower surface of one (not shown) of the pair of substrates 3 of the liquid crystal display panel whereas the fluorescent lamp 8 is arranged along one of the sides of the light guide, which is therefore displaced to the side as viewed from the lower surface of the liquid crystal display panel PNL. The lighting device having the constitution as described above is called a side-light type, a side-edge type, or an edge-light type. Light generated in the fluorescent lamp 8 enters, from the side of the light guide GLB opposed thereto, therein, after which it is irradiated towards the liquid crystal display panel PNL (the lower surface of one of the pair of substrates 3) from the upper surface thereof. As the fluorescent lamp 8 for the lighting device PNL, for example, a cold-cathode tube is used. Light h v having entered in the liquid crystal display panel PNL from the lighting device LUM transmits through the liquid crystal display panel to display an image formed in the liquid crystal display panel on the upper surface thereof.

A control circuit CTRL for controlling the light source (fluorescent lamp 8) is provided with a ballast capacitor CB, a transformer TR, an inverter circuit, a light control circuit, and a chopper as indicated in an area surrounded by the broken line in FIG. 1. A DC current supplied from a DC power supply is converted into a voltage pulse having a predetermined potential difference in the chopper circuit. For example, a DC voltage of 12V continuously supplied with a variation of 20% is converted into a rectangular wave in which a peak voltage is held at 12V. In the light control circuit, a desired current value is set by pulse width modulation of rectangular DC voltage pulses. Brightness of a light source is determined by the current value. A DC current set to the desired value is converted into an AC current by an inverter circuit, and thereafter input into a transformer TR. This transformer TR imparts a potential difference enough to light the fluorescent lamp 8 to the AC current from the inverter circuit. In the control circuit CTRL, a circuit from the DC power supply to the transformer TR is called a primary side (low voltage) circuit, and a circuit from the transformer TR to the fluorescent lamp 8 is called a secondary side (high voltage) circuit. The ballast capacitor CB is provided in the secondary side circuit of the control circuit CTRL. The ballast capacitor CB bears a difference between a high AC voltage necessary for starting discharge of the fluorescent lamp 8 and a lamp voltage of the fluorescent lamp 8 after starting of the discharge, and functions as a stabilizer for limiting a discharge current of the fluorescent lamp 8 to an adequate value.

Figure 2A:
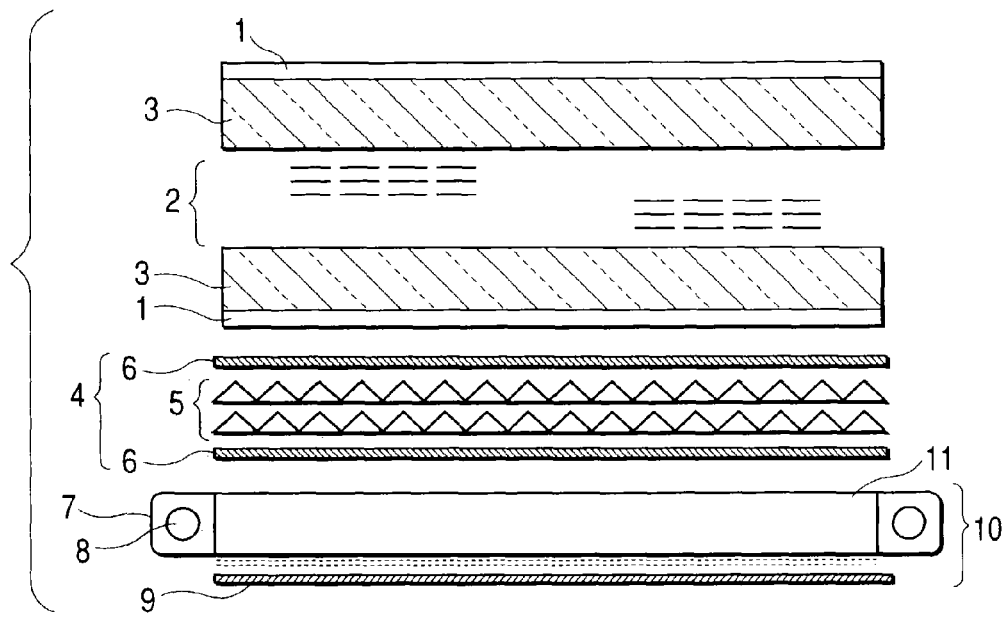
FIG. 2(a) is a schematic cross-sectional view of one example having a light source unit of a side-edge type in the liquid crystal display device according to the present invention.
Figure 2B:
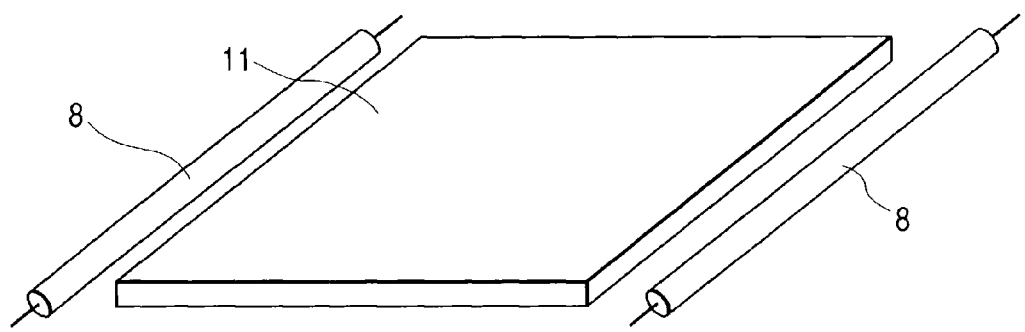
FIG. 2(b) is a perspective view showing a layout of the light source unit.
Figure 2C:
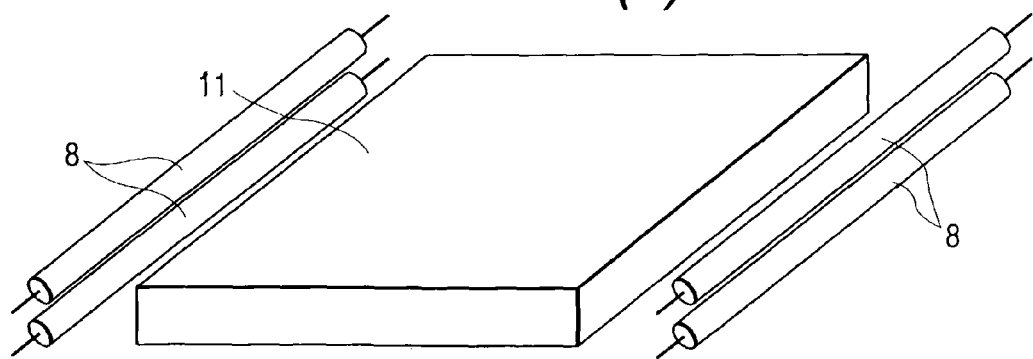
FIG. 2(c) is a perspective view showing a layout of a further light source unit in which the light source unit of FIG. 2(b) is made higher in brightness.
Figure 3A:
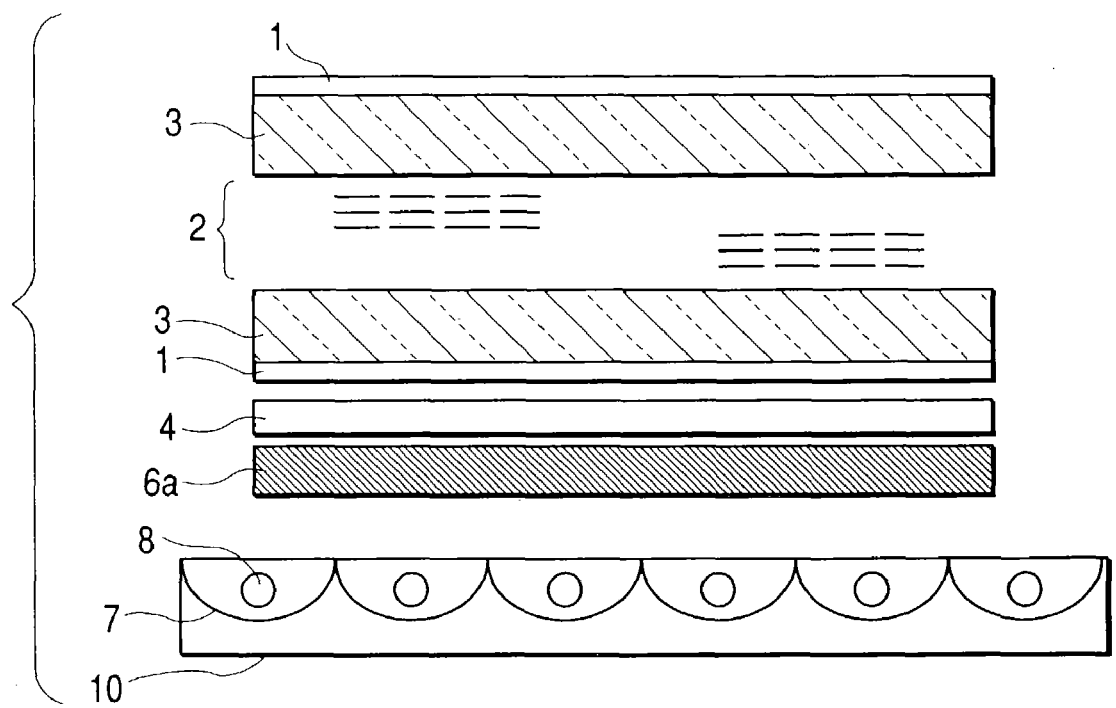
FIG. 3(a) is a schematic cross-sectional view of one example having a direct-light type light source unit in the liquid crystal display device according to the present invention.
Figure 3B:
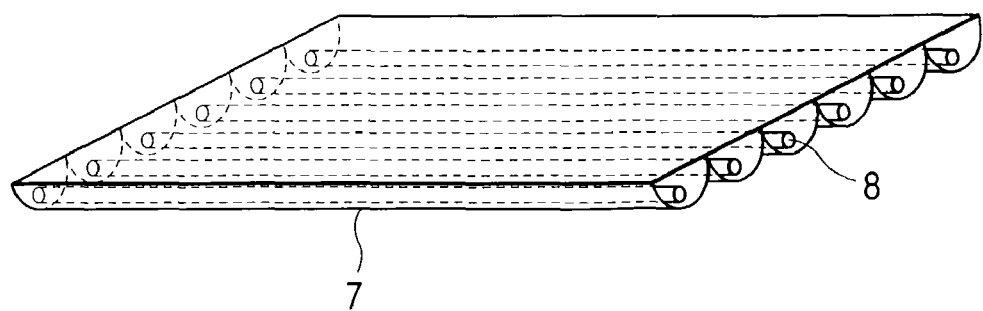
FIG. 3(b) is a perspective view showing a layout of the light source unit.

The detailed construction of the liquid crystal display device (except a control circuit) shown in FIG. 1 is shown conceptually in FIGS. 2(a) to 2(c), 3(a) and 3(b). FIGS. 2(a) and 3(a) show a sectional view of the liquid crystal display device. FIGS. 2(b), 2(c) and 3(b) show a perspective view of a light device (a light source unit) installed on the liquid crystal display device. In any of these drawings, the liquid crystal display device is provided with a pair of substrates 3 in which the respective major surfaces are arranged so as to opposite each other, a liquid crystal display panel comprising a liquid crystal layer (liquid crystal molecules or a mixture of the liquid crystal molecules and a chiral agent is sealed) 2 held therebetween, and a light source unit 10 in which a fluorescent lamp 8 is mounted. Also in FIG. 2(a) and FIG. 3(a), a polarizer 1 is attached to the respective major surfaces of the two substrates 3 of the liquid crystal display element opposite from the liquid crystal layer 2. Further, a plurality of pixels (not shown) are arranged two-dimensionally on the major surface of at least one of the pair of substrates 3 facing toward the liquid crystal layer 2. In the liquid crystal display device shown in any of FIG. 2(a) and FIG. 3(a), the user views an image displayed as a pattern of light transmission of a liquid crystal layer through the major surface of the substrate 3 from the upper side of the figure.

The light source unit 10 of the liquid crystal display device shown in FIG. 2(a) has a construction in which the fluorescent lamps 8 are arranged on both opposite sides of the light guide 11, which is therefore called a side-light type or a side-edge type as in the case of the lighting device LUM shown in. FIG. 1. The light source unit of a side-light type comprises, as shown in FIG. 2(a), a light guide having a quadrilateral upper surface arranged so as to face the lower surface of the liquid crystal display panel, a tubular fluorescent lamp 8 arranged along the side (at least one side of the quadrilateral) thereof, a reflector 7 for reflecting back light radiated from the lamp 8 toward the side of the lamp 8 opposite from the light guide 11, toward the side of the light guide 11, and a reflective film 9 for reflecting light propagating toward the lower surface of the light guide within the light guide toward the upper surface of the light guide so as to illuminate the lower surface of the liquid crystal display element. Between the upper surface of the light guide 11 and the lower surface of the liquid crystal display element are arranged an optical sheet group 4 including, for example, a pair of diffusing films 6 and a prismatic sheet 5 sandwiched therebetween. As optical sheets, a diffusing sheet for enhancing brightness, a polarizing retroreflective film, or a lens sheet for controlling angular dependence of emergent light may be arranged. As described above, the liquid crystal display device of a side-light type is arranged such that the lower surface of the liquid crystal display element does not face the fluorescent lamp 8, but faces the upper surface of the light guide 11 shown in FIG. 2(b).

On the other hand, in the liquid crystal display device shown in FIGS. 3(a), 3(b), the light source unit 10 is called a direct-light type since a plurality of fluorescent lamps 8 are arranged so as to oppose the lower surface of the liquid crystal display element (in other words, directly under the liquid crystal display device as shown in FIG. 3(a)). In the direct-light type light source unit 10, the reflector 7 is arranged so that light radiated downward from the fluorescent lamp 8 in FIG. 3(a) is reflected and projected upward in FIG. 3(a) (toward the lower surface of the liquid crystal display element). The reflector 7 is sometimes formed with corrugations for eliminating variations in light intensity between a plurality of fluorescent lamps 8 and their portions therebetween. Between the light source unit 10 and the liquid crystal display element is arranged an optical sheet group 4 as in the case of the side-light type, but the diffusing sheet 6 of the optical sheet group 4 disposed on its optical sheet 10 side in the side-light type is replaced by a diffusing plate 6a. For eliminating variations in light intensity between the plural fluorescent lamps 8 and the portions therebetween, an optical pattern is sometimes formed in the diffusing plate 6a.

The detailed explanation of the liquid crystal display device of the side-light type is described, for example, in Japanese Patent Laid-open No. Hei 7-281185 (laid-open on Oct. 27, 1995) corresponding to U.S. Pat. No. 5,640,216 (issued on Jun. 17, 1997), and the detailed explanation of the liquid crystal display device of the direct-light type is described, for example, in Japanese Patent Laid-open No. Hei 5-257142 (laid-open on Oct. 8, 1993) corresponding to U.S. Pat. No. 5,432,626 (issued on Jul. 11, 1995).

In the above-described liquid crystal display device, the light transmission is varied by increasing or decreasing an electric field applied across the liquid crystal layer 2 to display an image. For example, in a liquid crystal display device such as a liquid crystal display device (the so-called active matrix type) of TFT (Thin Film Transistor) drive of the twisted nematic (TN) type having liquid crystal molecules of the liquid crystal layer 2 oriented with a twist angle of about 90 degrees or the vertical alignment (VA) type of the liquid crystal layer 2, or a time-multiplexed driven liquid crystal display device (the so-called passive matrix type) of the supertwisted nematic (STN) type having liquid crystal molecules of the liquid crystal layer 2 oriented with a twist angle of 200 to 260°, light transmission varies from the maximum value (a white image) to the minimum value (a black image) as the electric field applied across the liquid crystal layer 2 increases. On the other hand, in a liquid crystal display device of the TFT drive called the horizontal field type (or the in-plane switching type) in which an electric field is applied in parallel with the major surfaces of the substrates within the liquid crystal layer 2, light transmission varies from the minimum value (a black image) to the maximum value (a white image) as the applied electric field to the liquid crystal layer 2 increases.

In the case of the TN type or the vertical alignment type, the product $\Delta n \cdot d$ of birefringence $\Delta n$ of the liquid crystal layer 2 and a cell gap d (a thickness of the liquid crystal layer 2) is preferably in a range of from 0.2 to 0.6 μm for compatibility between contrast ratio and brightness, similarly in the case of the STN type, the $\Delta n \cdot d$ is preferably in a range of from 0.5 to 1.2 μm, and similarly in the case of the horizontal field type, the $\Delta n \cdot d$ is preferably in a range of from 0.2 to 0.5 μm.

<<Control Circuit of a Light Source>>

FIG. 4(a) shows a current waveform input to an inverter circuit when a control circuit CTRL of a light source according to the present invention is employed in the liquid crystal display device shown in FIG. 1; FIG. 4(b) shows a current waveform input to a primary side of a transformer TR corresponding to the input of. FIG. 4(a); FIG. 4(c) shows a current waveform of a secondary side circuit of the transformer TR corresponding to the input of FIG. 4(b) and measured by an oscilloscope Os1 connected in series with the secondary side circuit where the secondary side circuit connects a secondary side of the transformer TR with a fluorescent lamp 8; and FIG. 4(d) shows a virtual current waveform of the secondary side circuit calculated on the basis of an effective value of a current of the secondary side circuit measured by an ammeter AMM connected in series with the secondary side circuit corresponding to the input of FIG. 4(b).

Figure 5:
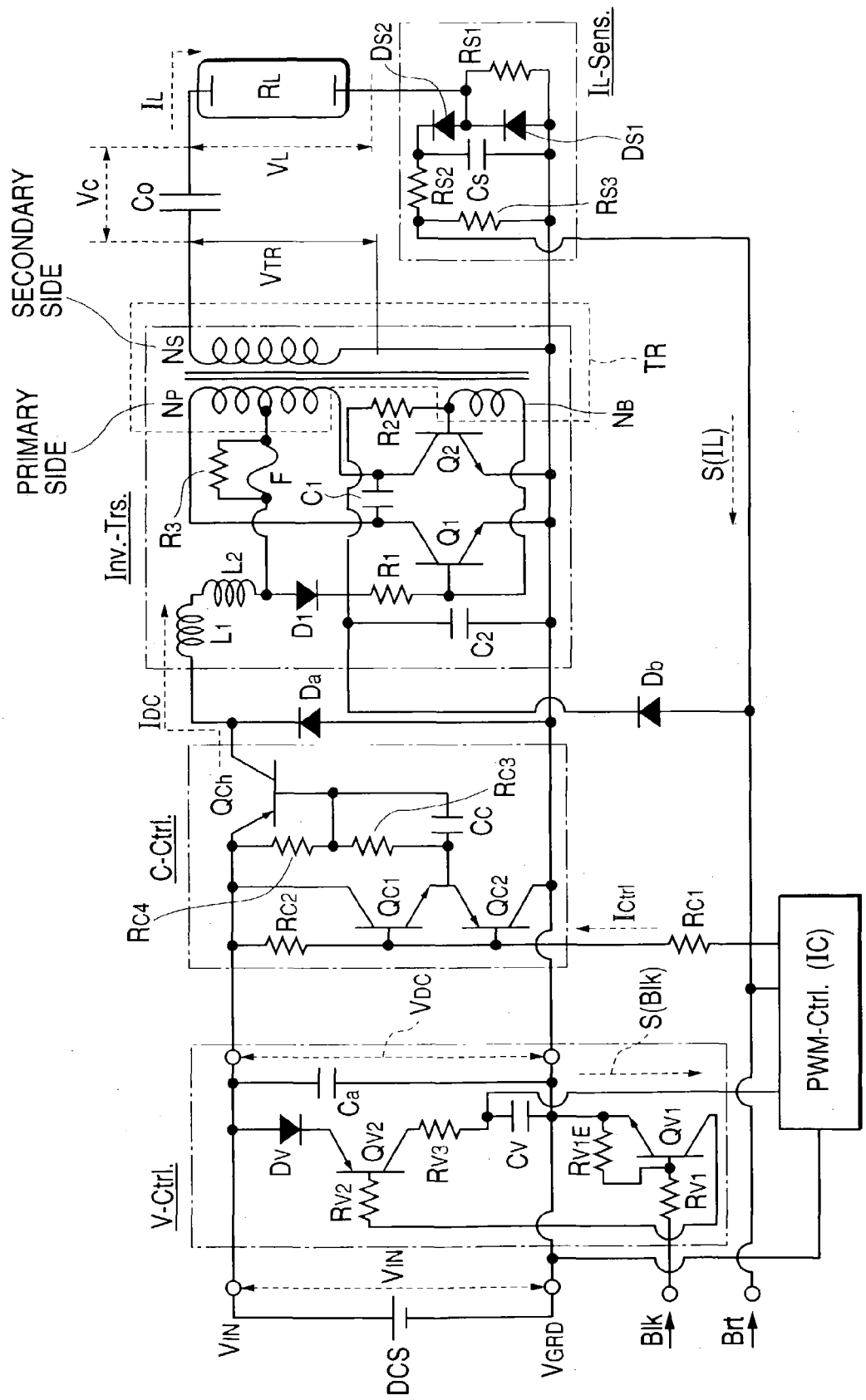
FIG. 5 is a circuit diagram showing a specific example of the control circuit CTRL of the light source shown in FIG. 1.

FIG. 5 further specifically shows one example of a control circuit of a light source shown in FIG. 1. The chopper circuit of FIG. 1 corresponds to a voltage control circuit V-Ctrl of FIG. 5; the light control circuit of FIG. 1 corresponds to a current control circuit C-Ctrl and a control element for pulse width modulation (integrated circuit) PWM-Ctrl of FIG. 5; and the inverter and the transformer TR of FIG. 1 correspond to an inverter-transformer circuit Inv-Trs. A tube current detector circuit $I_L$-Sens is provided in the secondary side circuit (a function of which will be described later). In the circuit shown in FIG. 5, resistance elements; capacitance elements; inductance; diodes; and transistors are respectively displayed, attaching a subscript to an alphabet character, as in $R_{V1}$, $R_{V2}$; $C_A$, $C_V$; $L_1$, $L_2$; $D_a$, $D_v$; and $Q_{V1}$, $Q_{V2}$. Further, $N_p$, $N_s$, and $N_B$ indicated in the transformer TR indicate the number of turns of a coil on the primary side, the number of turns of a coil on the secondary side, and the number of turns of a buffer coil, respectively.

In the control circuit of FIG. 5, a blinking control signal Blk of the light source and a brightness control signal Brt are input in a voltage control circuit V-Ctrl and a current control circuit C-Ctrl, respectively. When the blinking control signal Blk is input to the transistor $Q_{V1}$, a voltage $V_{IN}$ supplied continuously from the DC power supply DCS is input as a blinking control voltage $S_{(BLK)}$ to a pulse width modulation control element PWM-Ctrl via the diode $D_V$, the transistor $Q_{V2}$ and the resistance element $R_{V3}$. The voltage $V_{IN}$ is input intermittently to the pulse width modulation control element PWM-Ctrl according to the blinking control signal Blk whereby the voltage output $V_{DC}$ from the voltage control circuit V-Ctrl is intermittently applied or interrupted to produce a rectangular wave having a predetermined peak voltage. The voltage output $V_{DC}$ is identical with the input voltage $V_{IN}$ unless the blinking control signal Blk is input to the voltage control circuit V-Ctrl.

While in the present embodiment, a potential difference of a DC current input to the control circuit CTRL of FIG. 1 (a potential difference between $V_{IN}$ and $V_{GND}$ shown in FIG. 5) is set to 12V, but this potential difference can be suitably set to a value in a range of from 5 to 30V according to the specification of the liquid crystal display device. Further, among the input terminal $V_{IN}$ (the high voltage side) and $V_{GND}$ (the low voltage side) of the DC current shown in FIG. 5, the potential of $V_{GND}$ is not limited to the so-called ground potential, but may be a reference voltage (a potential like $V_{EE}$ with respect to $V_{CC}$ in an integrated circuit) of a so-called control circuit having a predetermined potential difference with respect to a voltage on the $V_{IN}$ side.

On the other hand, the pulse width modulation control element PWM-Ctrl receives a brightness control signal Brt and a blinking control voltage $S_{(BLK)}$ to send a current control signal $I_{ctrl}$ to the current control circuit C-Ctrl. The current control circuit C-Ctrl is provided with a transistor $Q_{ch}$ for cutting off a DC current flowing from the voltage control circuit V-Ctrl into the current control circuit C-Ctrl. The transistor $Q_{ch}$ receives an output of a complementary circuit comprising transistors $Q_{c1}$ and $Q_{c2}$ operated by a current control signal $I_{ctrl}$ to cut off a current flowing into the current control circuit C-Ctrl at fixed intervals, thereby to determine a value of a DC current $I_{DC}$ flowing into an inverter-transformer circuit Inv-Trs present subsequent to the current control circuit, based on a ratio of a current-supply (or a cutoff) time with respect to unit time. The pulse width modulation control element PWM-Ctrl increases or decreases a cutoff time of the current by the transistor $Q_{ch}$ according to the blinking control voltage $S_{(BLK)}$ input therein, or can generate the current control signal $I_{ctrl}$ so that the transistor $Q_{ch}$ may continue to-cut off the current during a period in which the input of the blinking control voltage $S_{(BLK)}$ is absent.

In one example of operation of the control circuit according to the present invention, the blinking control signal Blk is input into the voltage control circuit V-Ctrl while alternately changing the pulse intervals during each of a first period $\Delta t_I$ and a second period $\Delta t_{II}$. In other words, the blinking control signal Blk is modulated with a period of $\Delta t_I + \Delta t_{II}$. Therefore, the blinking control voltage $S_{(BLK)}$ input into the pulse width modulation control element PWM-Ctrl is also modulated according to the blinking control signal Blk. The pulse width modulation control element PWM-Ctrl detects a variation of voltage pulse intervals of the blinking control voltage $S_{(BLK)}$ to determine a pulse or a waveform of the current control signal $I_{ctrl}$ output therefrom. FIG. 4(a) shows one example of a waveform of an output current $I_{DC}$ of the current control circuit C-ctrl by the current control signal $I_{ctrl}$ set as described above.

In the primary side of the inverter-transformer circuit Inv-Trs, a DC current $I_{DC}$ flowing thereinto is converted into an AC current having a frequency, for example, of 25 kHz to 150 kHz. The frequency of the AC current is selected in a range of 25 kHz to 40 kHz, for example, in a liquid crystal display device for a notebook personal computer, and is selected in a range of 40 kHz to 50 kHz, for example, in a liquid crystal display device for a high-definition monitor display or a television receiver. The frequency of AC current has a tendency to be set at a higher value with increasing high speed of image displaying operation due to an increase in number of pixels constituting a display screen (for example, this is demanded by an increasing degree of definition of an image display), and therefore the frequency is not limited to the aforementioned ranges. Further, the setting range of frequency varies also according to the specification of the transformer TRS. For example, in a case where a piezoelectric transformer is used, a high frequency range, 100 kHz to 150 kHz, is recommended, but a frequency higher than the aforementioned ranges is sometimes set due to the high-definition image by the liquid crystal display device. The AC current having the frequency as mentioned above is generated in the secondary side of the control circuit of the light source and supplied to the fluorescent lamp 8 whereby the fluorescent lamp 8 is uniformly lighted along its tube axis. An AC current entering the transformer TR in the primary side circuit shows a waveform having a current amplitude according to a current value given during each of the periods $\Delta t_I$ and $\Delta t_{II}$ by the current control circuit C-Ctrl. FIG. 4(b) shows one example of a waveform of an AC current input to the transformer TR from the primary side circuit.

Figure 6:
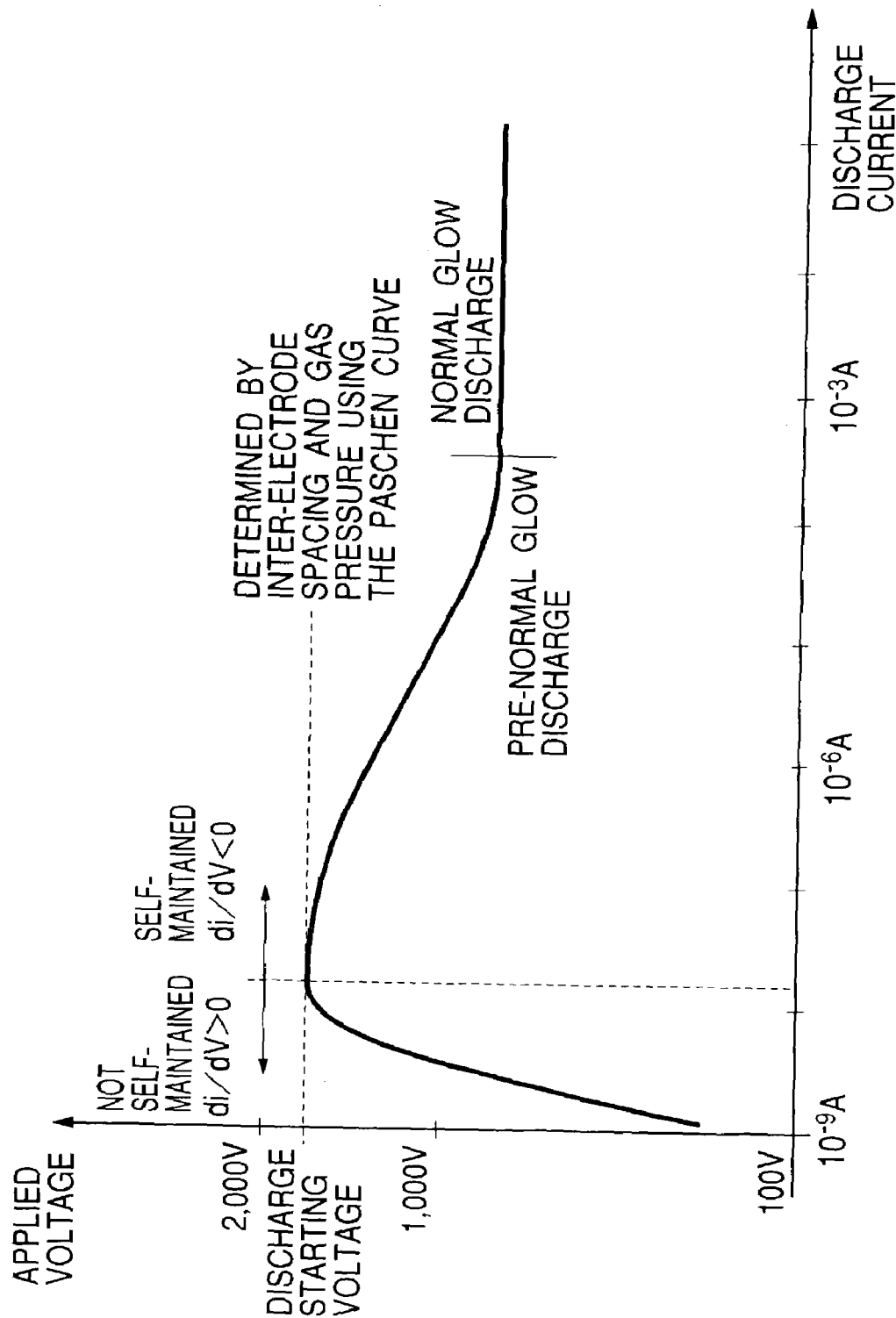
FIG. 6 is a graph for explaining a relationship between a discharge current within a discharge tube of a fluorescent lamp or the like and a voltage applied between electrodes provided in the discharge tube.

On the other hand, when an AC current output from the secondary side of the transformer TR is measured by an oscilloscope Os1 connected in series with the fluorescent lamp 8 as shown in FIG. 1, a waveform as shown in FIG. 4(c) is obtained. This waveform is flat during the period $\Delta t_{II}$. This is because of the fact that in a case where discharge occurs within the fluorescent lamp 8, the fluorescent lamp 8 acts as a resistance element $R_L$ whereas in a case where no discharge occurs, an electric current path is cut off. A discharge tube represented by the fluorescent lamp 8 generates a glow discharge therein to radiate light directly or indirectly. FIG. 6 shows one example of a relationship between a voltage applied between electrodes of a discharge tube and a current (a discharge current) supplied thereto.

In a fluorescent lamp, particularly, a cold-cathode tube, generation of a normal glow discharge in the cold-cathode tube is preferable for its operation serving as a light source. For generating a normal glow discharge in a discharge tube, at least not less than $2\times10^{-4}$ A, preferably, not less than $1\times10^{-3}$ A (1 mA) is preferable. On the other hand, the discharge in a discharge tube cannot be self-sustained when a current supplied thereto is less than $2\times10^{-8}$ A, but in the fluorescent lamp, the discharge sometimes stops even if the current is at a level below a current value which is far higher than $2\times10^{-8}$ A, for example, $1\times10^{-3}$ A (1 mA), the discharge sometimes stops. Actually, the present inventors have confirmed experimentally, for a cold-cathode tube whose rated current for its guaranteed lifetime is 6 mA, there is possibility that the discharge stops when a current supplied thereto is lowered to 2 mA. From this fact, during the period $\Delta t_{II}$, a phenomenon can occur in which a current waveform of FIG. 4(b) is different from that of FIG. 4(c).

Suppose that a current waveform shown in FIG. 4(c) is a sine wave, an effective current value $I_{\it eff}$ is obtained by the following equation, using a peak current value $I_{p-p}$ obtained from a difference between current peaks in the period $\Delta t_I$.

$$I_{\it eff} = I_{p-p}/2^{1/2} \approx I_{p-p} \times 0.707 \qquad (1)$$

The effective current value of the secondary side circuit can be also measured by the ammeter AMM connected in series with the fluorescent lamp in FIG. 1. However, when the period $\Delta t_I + \Delta t_{II}$ is short, the effective current value measured thereby unavoidably results in a value $I_{\it eff}(0)$ reflecting both the supply current during the first period $\Delta t_I$ and the supply current during the second period $\Delta t_{II}$, and the effective current values in the first period and the second period cannot be shown separately. Also in this case, also in the effective current value $I_{\it eff}(0)$ of then AC current., suppose that its waveform is a sin wave, the relationship of Equation (1) is applicable between the peak current value $I_{p-p}(0)$ and the effective current value $I_{\it eff}(0)$. A virtual current waveform derived from the effective current value $I_{\it eff}(0)$ measured by the ammeter AMM can be depicted as shown in FIG. 4(d) using the above relationship.

In the secondary side circuit of FIG. 1, as for the effective voltage value applied to the fluorescent lamp 8, effective voltage values $V_{\it eff}$ in the first period $\Delta t_I$ and the second period $\Delta t_{II}$ are respectively obtained from voltage waveforms measured by an oscilloscope Os2 connected in parallel with the fluorescent lamp 8. However, when this effective voltage is measured by a volt-meter VMT connected in parallel with the fluorescent lamp 8, a value $V_{\it eff}(0)$ reflecting of both the applied voltage during the first period $\Delta t_I$ and the applied voltage during the second period $\Delta t_{II}$ unavoidably results. It is noted that, by obtaining peak voltage values $V_{p-p}$ from the respective voltage waveforms in the first period $\Delta t_I$ and the second period $\Delta t_{II}$ measured by the oscilloscope Os2, and then substituting this value for $I_{p-p}$ in Equation (1), the effective voltage values $V_{\it eff}$ in the respective periods can be calculated as $I_{\it eff}$ in Equation (1).

As the aforementioned ammeter AMM and voltmeter VMT, for example, a so-called transducer type analog meter can be used which provides an effective current value and an effective voltage value by rectifying an AC current and then converting it into a direct current. Further, a power value (a product $I_{\it eff} \times V_{\it eff}$) may be measured directly by a power transducer of the quarter-squares-difference type. Furthermore, in place of these analog meters, digital meters such as an average value rectification type AC voltmeter or a time-multiplexed multiplier type wattmeter may be used.

In the secondary side circuit, a discharge-stabilizing element such as a ballast capacitor CB is connected in series with the fluorescent lamp 8. On the secondary side of the control circuit shown in FIGS. 1 and 5, an output voltage $V_{TR}$ of the transformer TR, a voltage (lamp voltage) $V_L$ applied between electrodes of the fluorescent lamp 8, and a voltage $V_C$ applied across the ballast capacitor CB are in a relationship given by the following equation.

$$\begin{aligned} V_{TR} &= V_L + V_C \\ &= V_L + I_L/(j\omega c_o) \end{aligned} \qquad (2)$$

In Equation (2), $I_L$ is a lamp current supplied to the fluorescent lamp 8, and let $V_{TR}$, $V_L$ and $V_C$ be effective voltage values, $I_L$ is $I_{\it eff}$ described above. Co indicates a capacitance of the ballast capacitor; $\omega$ is an angular frequency of the AC current; and j shows that the capacitance of the ballast capacitor produces an imaginary part (reactance) of an impedance of the secondary side circuit.

Figure 7:
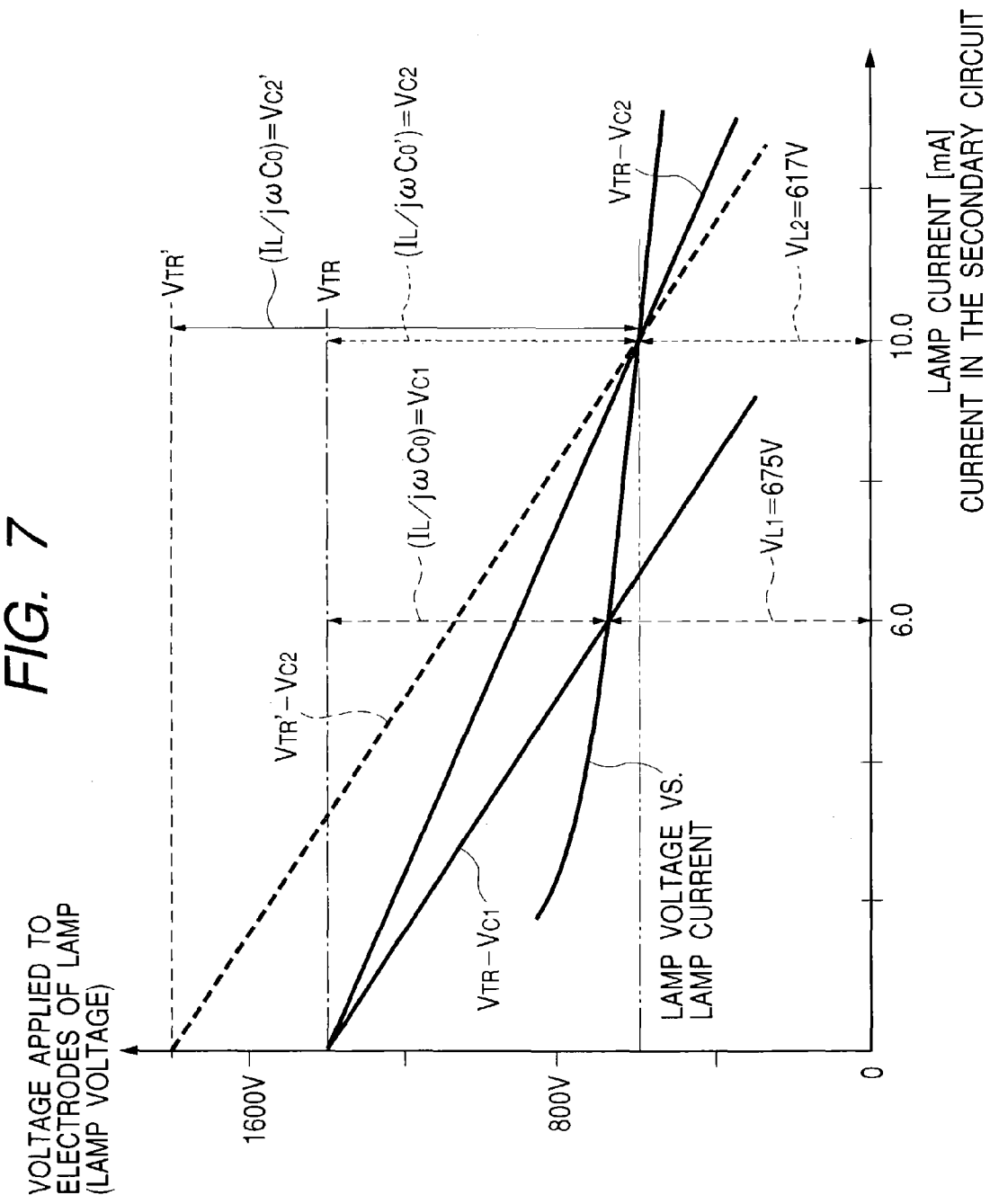
FIG. 7 is a graph for explaining a relationship between a lamp current produced in a circuit including a discharge tube of a fluorescent lamp or the like and a lamp voltage applied between electrodes within a discharge tube.

On the other hand, the fluorescent lamp 8 behaves as the resistance element $R_L$ when discharge is occurring in the fluorescent lamp 8, but the resistance value reduces as the lamp current $I_L$ increases. This feature is illustrated in FIG. 7 as "Lamp Voltage vs. Lamp Current" curve of the fluorescent lamp 8. In Equation (2), suppose that an output voltage $V_{TR}$ of the transformer TR is constant, a voltage VC across the ballast capacitor CB produced by the lamp current IL supplied to the fluorescent lamp 8 is determined. Then, when a relationship of Equation (2) is substantially applicable in the secondary side circuit, the fluorescent lamp 8 continues to discharge stably. This condition is given by an intersection of a curve of the lamp voltage $V_L$ vs. the lamp current $I_L$ and a curve of a voltage difference ($V_{TR}-V_C$) between the transformer output voltage $V_{TR}$-the ballast condenser voltage $V_C$ vs. the lamp current $I_L$ in FIG. 7.

As an example in which the lighting method of the light source according to the present invention is applied to the liquid crystal display device shown in FIG. 1, an operation is repeated in which the first period $\Delta t_I$ is set to 10 msec (millisecond=$10^{-3}$ sec.), a lamp current $I_L$ of the effective value 10 mA is supplied to the fluorescent lamp 8 during the first period $\Delta t_I$, the second period $\Delta t_{II}$ is set to 6.7 msec, and the supply of the lamp current $I_L$ to the fluorescent lamp 8 was ceased during the second period $\Delta t_{II}$. In this embodiment, the lamp current is supplied to the fluorescent lamp 8 only during a fraction of one period $\Delta t_I + \Delta t_{II}$ (which is 16.7 msec) corresponding to 60% ($\Delta t_I/(\Delta t_I + \Delta t_{II})$) of the one period, and consequently, the fluorescent lamp is lighted with the duty ratio of 60%. The lamp current $I_L$ in the secondary side circuit is controlled by monitoring the current waveforms on the oscilloscope Os1 connected in series with the fluorescent lamp 8 and adjusting the brightness control signal Blk input to a light control circuit of the primary side circuit so that the peak-to-peak current value $I_{p-p}$ of the lamp current $I_L$ becomes 14.1 mA which corresponds to $2^{1/2}$ times the effective current $I_{\it eff}$ 10 mA (see FIG. 4(c)). When the fluorescent lamp 8 is blinked periodically as described above, the effective value $V_{L1}$ of the lamp voltage of the fluorescent lamp 8 was calculated based upon the peak-to-peak voltage value $V_{L(p-p)}$ of the voltage waveform on the oscilloscope Os2 connected in parallel with the fluorescent lamp 8 during the first period $\Delta t_I$, and was found to be 617 V.

The effective value $I_L$ of the lamp current supplied to the fluorescent lamp 8 in the above-described blinking operation corresponds to the effective value 6 mA of the lamp current in the 100%-duty-ratio operation (the continuous-lighting operation without blinking).

By using the effective value $I_{eff}(0)$ of the lamp current obtained by considering the one period "$\Delta t_I + \Delta t_{II}$" macrospically as described above, a virtual continuous current waveform can be obtained as shown in FIG. 4(d). When the length of one period becomes short to some extent as mentioned above, the ammeter AMM connected in series with the fluorescent lamp 8 and the voltage meter VMT connected in parallel with the fluorescent lamp 8 indicate the effective current and the effective voltage of the secondary side circuit macrospically measured during one period or more. When the fluorescent lamp 8 is blink-lighted periodically as mentioned above, the effective value $I_L$ of the lamp current measured by the ammeter AMM and the effective value $V_{L1}$ of the lamp voltage measured by the voltmeter VMT were 6 mA and about 900V, respectively.

In a case where the fluorescent lamp of the same specification as that of the fluorescent lamp used for the above blinking operation of the light source described above is operated by setting the effective value of the lamp current $I_L$ at 6 mA and with the duty ratio of 100% (a continuous lighting operation), the effective value $V_{L1}$ of the lamp voltage was 675V. These values calculated from the waveforms on the oscilloscopes Os1, Os2 agreed approximately with the corresponding values measured by the ammeter AMM and the voltage meter VMT without large differences as in the case of the blanking operation of the light source described above.

Under the conditions that the liquid crystal display device of FIG. 1 is used, a group of pixels in a part of the liquid crystal display panel PNL displays a white image, and the fluorescent lamp is blink-lighted as mentioned above, the brightness of light through the group of pixels in the part of the panel PNL are equal both in the case of blink-lighting operation of the fluorescent lamp 8 as described above and in the case of continuous lighting operation of the fluorescent lamp 8. Here the displaying of the white image means the liquid crystal display panel is operated such that the electric field applied across the liquid crystal layer associated with the group of pixels maximizes the light transmission through the liquid crystal layer.

The power consumption of the fluorescent lamp 8 required for displaying the white image having brightness of 100 cd/m² by the group of pixels is 7.4 W/100 cd for the blink-lighting operation with the lamp current of 10 mA and the duty ratio of 60%, which is lower than 8.1 W/100 cd required for the continuous lighting of the fluorescent lamp 8 with the lamp current of 6 mA and the duty ratio of 100%. The results of this experiment will be described in detail subsequently in connection with FIGS. 12(a) and 12(b). The above values of the power consumption were calculated as the products of the effective current value $I_{eff}$ and the effective voltage value $V_{eff}$, where $I_{eff}$ is calculated from the peak-to-peak current value of the lamp current $I_L$ obtained with the oscilloscope Os1 of FIG. 1, and $V_{eff}$ is calculated from the peak-to-peak voltage value of the lamp voltage $V_L$ obtained with the oscilloscope Os2 of FIG. 1.

The secondary side circuit shown in FIG. 1 includes the fluorescent lamp 8 and the ballast capacitor CB. In the latter, a waveform of a current flowing therein has a phase difference with respect to a waveform of a voltage applied thereacross, and therefore the ballast capacitor CB acts as reactance. Because of this, the power supplied from the transformer TR to the secondary side circuit is actually consumed by the fluorescent lamp 8 only.

Accordingly, the blinking operation of the light source suitable for reducing its power consumption for providing desired brightness as described above is characterized by the following items:

Item (a) A first period $\Delta t_1$ for supplying a predetermined lamp current to a light source (a fluorescent lamp) and a second period $\Delta t_2$ for ceasing the supply of the lamp current to the light source are alternately repeated.

Item (b) Calculation of the power consumption (the energy consumption) $P_1$ of the fluorescent lamp 8 during the first period $\Delta t_1$ The peak-to-peak lamp current value $I_{p-p}$ and the peak-to-peak lamp voltage value $V_{p-p}$ are obtained from waveforms of the lamp current and the lamp voltage measured with the oscilloscopes or the similar measuring instrument connected in the secondary side circuit as shown in FIG. 1 during the first period $\Delta t_1$, and then the power consumption $P_1$ (the energy consumption) is obtained by substituting the values $I_{p-p}$ and $V_{p-p}$ in the following equation:

$$\begin{aligned} p_1 &= \Delta t_1 \times I_{eff} \times V_{eff} \\ &= \Delta t_1 \times (I_{p-p}/2^{1/2}) \times (V_{p-p}/2^{1/2}) \\ &= (\Delta t_1 \times I_{eff} \times V_{eff})/2 \end{aligned} \quad (3)$$

Item (c) Calculation of power consumption (energy consumption) $P_2$ based on the measured effective values Effective values $I_{eff}$, $V_{eff}$ of the lamp current and the lamp voltage during one period consisting of the first period $\Delta t_1$ and the second period $\Delta t_2$ are measured by using the ammeter and the voltmeter connected in the secondary side circuit as shown in FIG. 1, and then the power consumption (the energy consumption) $P_2$ is obtained by substituting the values $I_{eff}$ and $V_{eff}$ in the following equation:

$$P_2 = (\Delta t_1 + \Delta t_2) \times (I_{eff} \times V_{eff})$$

Here $I_{eff}$, $V_{eff}$ are values obtained by considering the physical quantities macrospically during the period ($\Delta t_1 + \Delta t_2$), and they are different in definition from the values $I_{eff}$, $V_{eff}$ used in Equation (3).

Item (d) The currents are controlled so that the relationship $P_1 < P_2$ is satisfied.

Both the two power consumptions (the energy consumptions) in items (b) and (c) are power consumptions during one period of the blinking operation, and each of them is defined as the product of an electric power (the time rate of energy consumption) and time during which the electric power is supplied).

In the control circuit of the light source of the liquid crystal display device and its lighting operation according to the present invention the reason why the power consumptions during one period of the blink-lighting operation satisfy the relationship $P_1 < P_2$ is as follows:

In the secondary side circuit, the voltage applied across the ballast condenser CB is proportional to the current (the lamp current $I_L$) flowing into the secondary side circuit as is apparent from the Equation (2). Therefore, in a case where the secondary side output voltage $V_{TR}$ of the transformer TR is constant, the voltage $V_L$ applied between electrodes of the fluorescent lamp 8 is determined corresponding to the current IL flowing through the predetermined secondary side circuit. For the blinking operation of the fluorescent lamp 8, in a case where the $I_L$ and $V_L$ are measured microspically using the waveforms on the oscilloscopes Os1 and Os2 shown in FIG. 1 by considering the first period $\Delta t_1$ and the second period $\Delta t_2$ separately, the effective value of the voltage $V_L$ during the first period $\Delta t_1$ reflects the resistance value $R_L$ of the fluorescent lamp 8 corresponding to the effective value of the current $I_L$ flowing into the secondary side circuit during the first period $\Delta t_1$. During the second period $\Delta t_2$, the resistance $R_L$ of the fluorescent lamp 8 becomes infinite due to ceasing of the discharge within the fluorescent lamp 8, and therefore the effective value of the current $I_L$ in the secondary side circuit becomes substantially zero, and the power consumption of the fluorescent lamp 8 during the second period $\Delta t_2$ is also zero. Accordingly, $P_1$ represents the power consumption of the fluorescent lamp 8 during the first period $\Delta t_1$.

On the other hand, in a case where the current $I_L$ and the voltage $V_L$ are measured macrospically during the first period $\Delta t_1$ and the second period $\Delta t_2$ as a whole by using the ammeter AMM and the voltmeter VMT shown as in FIG. 1, the effective value of $V_L$ is determined corresponding to the effective value of $I_L$ during one period of the first period $\Delta t_1$ plus the second period $\Delta t_2$. Therefore, the effective value of $V_L$ reflects the resistance $R_L$ of the fluorescent lamp 8 during the period $(\Delta t_1 + \Delta t_2)$ as the macroscopic resistance corresponding to the effective value of $I_L$ during that period. Accordingly, the effective value of VL does not reflect the variation of the resistance value of the fluorescent lamp 8 during the period $\Delta t_1$ and the period $\Delta t_2$ on, and the effective value of $I_L$ during the period $(\Delta t_1 + \Delta t_2)$ is also smaller than the effective value of $I_L$ obtained microscopically during the period $t_2$, and therefore, the effective value of VL rises in accordance with the curve of the lamp current $I_L$ vs. the lamp voltage $V_L$ shown in FIG. 7. Therefore, even if the integral of $I_L$ supplied to the secondary side circuit during period $(\Delta t_1 + \Delta t_2)$ based upon the microscopic measurement is equal to that based upon the macroscopic measurement, the relationship "$P_1 < P_2$" is sometimes satisfied as the lamp voltage $V_L$ in macroscopic measurement increases.

Whether the relationship "$P_1 < P_2$" is satisfied or not depends on selection of $\Delta t_1$ and $\Delta t_2$ described later. For example, if both $\Delta t_1$ and $\Delta t_2$ are selected to be shorter than $10^{-4}$ second so that they are equal to an inverse number of the frequency of the AC current in the secondary side circuit as described in Japanese Patent Application Laid-open No. Hei 9-266078, there is little difference in the effective value of the secondary side current between the microscopic measurement and the macroscopic measurement. On the other hand, in the lighting operation of the fluorescent lamp according to the present invention, $\Delta t_1$ and $\Delta t_2$ are selected to be longer than an inverse number of the AC current in the secondary side circuit generated by the inverter circuit, and therefore, in the primary side circuit, a plurality of AC pulses are produced during each of $\Delta t_1$ and $\Delta t_2$, and thereby there occurs a difference in the effective value of the secondary side current between the microscopic measurement and the macroscopic measurement.

<<Specification of a Fluorescent Lamp and Setting and Operation of a Light Source Circuit>>

In the control circuit for the light source of the liquid crystal display device and the lighting operation of the light source according to the present invention, for example, the relationship "$P_1 < P_2$" is established by voltage control by the chopper circuit of the primary side and current control by the light control circuit shown in FIG. 1. In the current setting by the light control circuit, occurrence of some amount of current $i_2$ is acceptable in the primary side circuit during the second period $\Delta t_2$. The reason is that, as already explained in connection with FIGS. 4(b) and 4(c), even if the current $i_2$ is generated in the primary side circuit, when the AC current of the secondary side circuit corresponding to the current $i_2$ is below a critical value of a discharge current capable of self-sustaining discharge in a discharge tube (a fluorescent lamp in the present embodiment), the discharge in the discharge tube stops. Further, as already described, possibility has been found that the discharge of the fluorescent lamp, particularly, the cold-cathode tube ceases when the current value (effective value) of the secondary side circuit lowered to 2 mA corresponding to ⅓ of the rated current (effective value). On the other hand, the effective value of the AC current generated in the secondary side circuit corresponds to that generated in the primary side circuit. Accordingly, to light the fluorescent lamp at the rated current during the first period $\Delta t_1$ satisfying the relationship "$P_1 < P_2$", the light control circuit has to be controlled so that the effective value of the AC current generated during the second period $\Delta t_2$ in the primary side circuit is limited to less than ⅓ of the effective value of the AC current generated in the primary side circuit during the first period $\Delta t_1$.

In a case where the lighting of the fluorescent lamp during the first period $\Delta t_1$ is carried out at the rated current, it is possible to satisfy the relationship "$P_1 < P_2$", but when light radiated from the fluorescent tube 8 in FIG. 1 is projected to the liquid crystal display panel PNL, there is possibility that an image formed in the liquid crystal display panel PNL cannot be sufficiently bright. Accordingly, in a case where the lighting operation of the fluorescent lamp according to the present invention is applied to the liquid crystal display device, it is preferable that the AC current (lamp current) of the secondary side circuit supplied to the fluorescent lamp during the first period $\Delta t_1$ be selected to be high.

For setting of the lamp current (effective value) $I_L$, reference is made to a lamp current value (effective value) described in the specification of the fluorescent lamp (such as the cold-cathode tube), for example. This specification is attached to the product at the time of shipment of the product by a manufacturer of the fluorescent lamp or a manufacturer of the liquid crystal display device on which the fluorescent lamp are mounted. The lamp current value described in the specification is specified in consideration of the guaranteed service life of the fluorescent lamp defined as the lighting time elapsed before the brightness of the fluorescent lamp has fallen to 50% (sometimes 70%) of its initial brightness. Further, in this specification, a lamp voltage value (effective value) suitable for lighting operation of the fluorescent lamp at the above lamp current value is described. Normally, these lamp current and lamp voltage values are described as the continuous-duty rating which specifies conditions enabling lighting operation over the guaranteed service life without the fluorescent lamp exceeding a specified temperature. In the present specification, for the sake of convenience, the lamp current and the lamp voltage values described in the specification of the fluorescent lamps are indicated as lamp current and lamp voltage ratings.

In the liquid crystal display device according to the present invention, a lamp current (effective value) $I_L$ supplied to the fluorescent lamp 8 during the first period $\Delta t_1$ in the secondary side circuit is set to be larger than the lamp current rating. The effective value $I_L$ of the lamp current is adjusted by modulating the pulse width of a DC current in the light control circuit on the primary side of the control circuit CTRL, for example. The current in the light control circuit is controlled such that the AC current (effective value) in the primary side circuit corresponding to the lamp current rating is high during the first period $\Delta t_1$, and is set low during the second period $\Delta t_2$.

Although a critical value of the current in the secondary side circuit for self-sustaining of discharge varies somewhat with the specification of the fluorescent lamp, it can be 2 mA or less for a cold-cathode tube having an inside diameter not more than 5 mm. Accordingly, it is recommended that an effective value of the AC current in the primary side circuit during the second period $\Delta t_2$ be lower than the effective current value in the primary side circuit corresponding to the effective current value 2 mA in the secondary side circuit.

An example of setting the first period $\Delta t_1$ and the second period $\Delta t_2$ will be described later. However, it is recommended that an effective value $I_L$ of the lamp current set as selected above on the basis of the lamp current rating $I_L(0)$ be set to satisfy the following relationship:

$$I_L(0) \geq I_L \times (\Delta t_1/(\Delta t_1 + \Delta t_2)) \quad (4)$$

A preferable relationship between a current value $i_1$ during the first period $\Delta t_1$ and a current value $i_2$ of the second period $\Delta t_2$ in the primary side circuit depends upon the ratio of the effective current value $I_L$ in the secondary side circuit during the first period $\Delta t_1$ to the lamp current rating $I_L(0)$, but the current ratio $i_2/i_1$ will be less than ⅓, preferably, $1/(3n)$ or less, where $n=I_L/I_L(0)$, $n>1$.

For selection of n, it is desirable to study its lower limit in view of the brightness required of the liquid crystal display panel and its upper limit in view of preventing deterioration of the fluorescent tube. By experiments and consulting reference books relating to cold-cathode tubes, it was found out that the following relationship is recommended:

$$1.2 \leq n \leq 2.5, \text{ preferably } 1.5 \leq n \text{ or } n \leq 2.0.$$

On the other hand, in a case where a lamp current rating of the fluorescent tube is not known because its specification is misplaced, for example, an effective value $i_1$ of an AC current in the primary side circuit during the first period $\Delta t_1$, or an effective current value $I_L$ in the secondary side circuit may be set by measuring a critical current value (effective value) at which self-sustaining discharge of the fluorescent tube is stopped. For example, in a case where discharge of the fluorescent lamp stops at an effective current value in the secondary side circuit in a range of 1 to 2 mA, by varying an effective current value $i_1$ (or an effective value $i_1$ of the AC current in the primary side circuit) of the secondary side circuit during the first period $\Delta t_1$ in a range of 5 times to 10 times the above critical value (or an effective value of the AC current in the primary side circuit corresponding to the critical value, an optimum effective current value can be selected from the above range by confirming the brightness of the liquid crystal display device.

In the present embodiment, in operating the light source of the liquid crystal display device under the condition of microspical power consumption (microspical energy consumption) $P_1$<macrospical power consumption (macrospical energy consumption) $P_2$ during the period ($\Delta t_1 + \Delta t_2$), in particular, it is preferable to consider voltage distribution in the secondary side of the control circuit CTRL.

A control circuit (normally a product called an inverter) suitable for operation of the fluorescent lamp of the above lamp current and voltage ratings is selected by considering an output current and an output starting voltage described in its specification and a tube diameter of a fluorescent tube and an overall tube length which the control circuit can operate. Here the starting voltage is a voltage necessary for starting discharge within a tube such as a fluorescent lamp connected to the secondary side of the control circuit CTRL as shown in FIG. 1. In a pair of electrodes provided within a tube not limited to the fluorescent lamp, when no discharge is present within the tube, the secondary side circuit is open between the pair of electrodes. A starting voltage is a voltage which is temporarily applied between the pair of electrodes for starting discharge within the tube, and which is higher than the lamp voltage. At the time when the starting voltage is applied between the pair of electrodes, substantially no current is essentially generated in the secondary side circuit. Therefore, in a case where, in FIG. 7, a secondary side output voltage $V_{TR}$ of the transformer TR of the control circuit CTRL at the time of starting discharge is not changed after starting discharge, the starting voltage is the output voltage $V_{TR}$.

For a control circuit for a cold-cathode tube (a kind of fluorescent tubes), the following explains three kinds of products A, B and C with their DC power supply input voltage on the primary side being 12V, their output current on the secondary side being 5 mA, and their operating frequency (which corresponds to ω in Equation (2)) being 55 kHz, but with their starting voltages being different from each other, and diameters and lengths of the cold-cathode tubes for which application of the respective products are recommended. The starting voltages of these products A, B and C are 900V, 1200V and 1350V, respectively, These products A, B and C are control circuits designed for operating one cold-cathode tube only. For the lighting operation of a cold-cathode tube having a diameter of 2.6 mm or 3.0 mm, the products A, B, and C are recommended for cold-cathode tubes having a tube length in a range of 60 to 130 mm, in a range of 110 to 180 mm, and in a range of 150 to 220 mm, respectively. For the lighting operation of a cold-cathode tube having a diameter of 4.1 mm, the products A and B are recommended for cold-cathode tubes having a tube length in a range of 60 to 160 mm and in a range of 130 to 220 mm, respectively.

Figure 8:
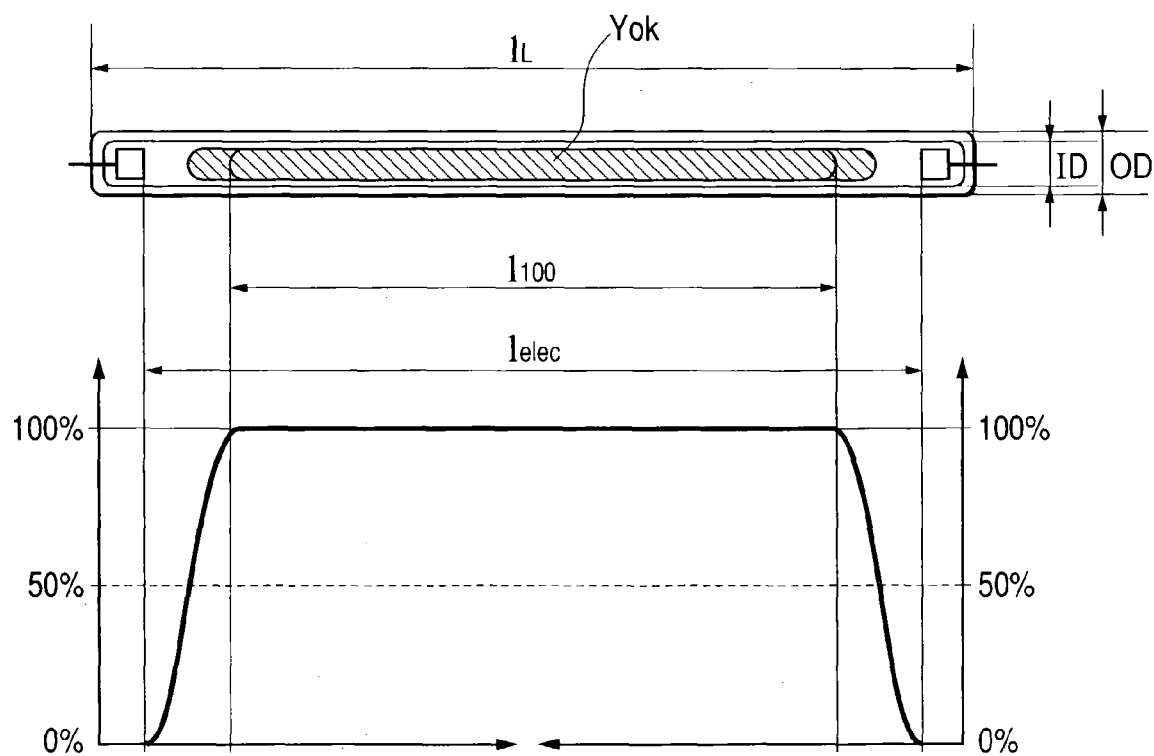
FIG. 8 is a sectional view of a cold-cathode tube showing parameters of a discharge tube in connection with lighting of a light source according to the present invention by way of an example of a cold-cathode tube, and a graph showing a distribution of brightness in a longitudinal direction at the time of lighting.

The tube diameter and tube length of the tubes are defined as dimensions of parts denoted by OD and $l_L$ of the cold-cathode tube of FIG. 8. As is apparent from the comparison of these three kinds of products, the starting voltage necessary for starting discharge of the cold-cathode tube rises as the length become longer and as the diameter becomes smaller. Circuits for supplying an AC current to the fluorescent lamp 8 not limited to the above-explained control circuit for the cold-cathode tube have an impedance comprising a resistance exhibited by the fluorescent lamp during discharge operation and reactances exhibited by elements such as the ballast condenser and an inductance connected in series with the fluorescent lamp. Accordingly, if the three kinds of control circuits having starting voltages different from each other are compared, they are different in at least one of the secondary side output voltage of the transformer and the reactances such as that of the balance condenser are different in at least position.

Recently, as the diagonal dimension of the liquid crystal display devices is increased, there is a tendency that cold-cathode tubes having a tube length of 310 mm and 390 mm are used for a liquid crystal display device of diagonal dimensions of 15 inches and 18 inches for monitor use, respectively, for example. If the diameter (outside diameter) of these cold-cathode tubes is increased to 4.1 mm, the product C recommended for the cold-cathode tube having a diameter of 2.6 mm or 3.0 mm and a length in a range of 150 to 220 mm can be used as an AC current supply circuit for the cold-cathode tubes having the enlarged-diameter.

In the example of the liquid crystal display device provided with the cold-cathode tube of 2.6 mm in diameter, 170 mm in length, and 5 mA in lamp current rating and shown in FIGS. 3(*a*) and 3(*b*), the control circuits of the products B, C can be used for each of the cold-cathode tubes. An inside diameter (ID in FIG. 8) of the cold-cathode tube incorporated into the liquid crystal display device is 2.0 mm, and each of the cold-cathode tubes is provided with a control circuit shown in FIG. 5.

A comparison between the products B and C are made by lighting the light source of the liquid crystal display device of FIG. 3(*a*) with the duty ratio of 50% and at the lamp current of 10 mA during the first period $\Delta t_1$ in accordance with the present invention.

When the product B is used, a voltage $V_C$ appearing across the ballast condenser (reactance element) is raised by the lamp current 10 mA produced in the secondary side circuit because of the large reactance of the secondary side circuit (because of the small capacitance of the ballast condenser). Accordingly, a voltage $V_R$ applied between electrodes of the cold-cathode tube is below a lamp voltage necessary for discharge at the lamp current of 10 mA, and the discharge of the cold-cathode tube during the first period $\Delta t_1$ becomes unstable. The circumstances can be understood by referring to the relationship $V_{TR}$-$V_{C1}$ of FIG. 7.

Therefore, in the product B, it is necessary to stabilize the discharge of the cold-cathode tube during the first period $\Delta t_1$ by raising the input voltage $V_{IN}$ to the primary side circuit or increasing the number $N_S$ of winding turns of the secondary coil of the transformer TR, thereby increasing the secondary side output voltage $V_{TR}$ of the transformer TR. This corresponds to changing the relationship $V_{TR}$-$V_{C1}$ shown in FIG. 7 to the relationship $V'_{TR}$-$V_{C1}$.

On the other hand, when the product C is used, the reactance of the secondary side circuit is small, and therefore the voltage $V_R$ applied between the electrodes of the cold-cathode tube at the lamp current of 10 mA is secured to some extent. The circumstances can be understood by referring to the relationship $V_{TR}$-$V_{C2}$ of FIG. 7. In this case, even if the voltage $V_R$ is below the lamp voltage necessary for discharge at the lamp current 10 mA of the cold-cathode tube, its insufficiency is in a range acceptable for stable discharge of the cold-cathode tube.

By summarizing the above-described comparison with reference to the secondary side circuit of FIG. 1, the following conclusion is obtained.

The voltage $V_L$ applied across the fluorescent lamp 8 is a difference obtained by subtracting the voltage $V_C$ applied across the ballast condenser CB from the output voltage $V_{TR}$ of the transformer TR. The voltage $V_C$ applied across an element such as the ballast condenser is in proportion to the current flowing through the secondary side circuit (the lamp current $I_L$ flowing through the discharging fluorescent lamp 8), and in inverse proportion to the capacitance $C_o$ of the ballast condenser. Therefore, as the lamp current $I_L$ supplied to the fluorescent lamp 8 is increased, the voltage $V_C$ across in the ballast condenser CB increases, and the lamp voltage $V_L$ across the fluorescent lamp 8 decreases. In the case where the lamp current $I_L$ supplied to the fluorescent lamp 8 is increased during the first period $\Delta t_1$, the voltage $V_L$ applied across the fluorescent lamp 8 in the secondary side circuit is designed not to be considerably smaller than the lamp voltage value (determined by the curve of "lamp current $I_L$ vs. the lamp voltage $V_L$" in FIG. 7) suitable for stable discharge of the fluorescent lamp 8 at the lamp current $I_L$.

Accordingly, in operation of the light source according to the present invention, the lamp voltage $V_L$ suitable for discharge of the fluorescent lamp 8 at the lamp current $I_L$ supplied during the first period $\Delta t_1$ is secured by setting the output voltage $V_{TR}$ of the transformer TR in the control circuit connected to the fluorescent lamp higher than its normal value, or selecting the capacitance Co of the ballast condenser CB to be higher than its normal value. Here the normal output voltage VTR and the normal capacitance Co are the output voltage $V_{TR}$ of the transformer and the capacitance Co of the ballast condenser in the control circuit selected corresponding to the continuous operation rating of the fluorescent lamp.

The output voltage $V_{TR}$ and the capacitance Co vary with the tube length of the fluorescent lamp used, for example, and therefore, in the lighting operation of the fluorescent lamp having a tube length specified for the liquid display device in accordance with the present invention, it is recommended that a control circuit is utilized which satisfies the continuous operation rating of a fluorescent lamp having a tube length at 10%, preferably, at least 20% longer than the specified tube length.

It is noted that the lamp current rating and the lamp voltage rating of the fluorescent lamp described above depend upon its shapes (for example, such as its cylindrical shape, its L-shape or bits U-shape), in addition to its tube length and its tube diameter. In the case of the cylindrical fluorescent lamp shown in FIG. 8, the lamp current rating and the lamp voltage rating thereof also depend upon the length $l_L$ of the fluorescent lamp (also called a lamp length), the ratio of its inside diameter ID to its outside diameter OD in its transverse cross-section, and the quantity of gas (such as mercury) sealed therein.

The guaranteed lifetime of the fluorescent lamp also depends upon reduction of brightness caused by consumption of mercury or deterioration of its phosphor. The reduction of brightness caused by the consumption of mercury is due to a phenomenon in which mercury gas sealed within the fluorescent lamp forms an alloy (amalgam) and it makes difficult generation of ultraviolet rays which excite phosphor coated on the inner wall of the tube. The reduction of brightness caused by deterioration of the phosphor is due to a phenomenon in which the phosphor coated on the inner wall of the fluorescent lamp deteriorates and thereby the amount of visible light generated by the ultraviolet rays are reduced.

The greater a tube wall load determined by the ratio $(P/l_L)$ of the supply power (the lamp input) P(W) to the fluorescent lamp to its tube length $l_L$ (cm) of the fluorescent lamp, the faster progress of the deterioration of the phosphor. Therefore, usually in the cold-cathode tube, the lamp input power is selected such that the tube wall load is in a range of 0.10 to 0.15 (W/cm). However, in the lighting operation of the light source according to the present invention, a current flowing through the fluorescent lamp is substantially cut off during the second period $\Delta t_2$ as described above. Accordingly, even if the lighting operation of the fluorescent lamp during the first period $\Delta t_1$ is carried out under the condition that the tube wall load is higher than that of the continuous lighting, the deterioration of the phosphor coated on the inner wall of the tube can be suppressed to some extent. For example, the lamp input $P_1$ during the first period is set so that the tube wall load $(P_1/l_L)$ is greater than 0.2 W/cm, preferably, 0.22 W/cm or more. Further, preferably, the lamp input $P_2$ during the second period is set so that the tube wall load is 0.1 W/cm or less. However, if the lamp input $P_1$ during the first period is excessively high, the deterioration of the phosphor is accelerated even in the lighting operation of the light source according to the present invention. Accordingly, it is preferable to place the upper limit on the lamp input $P_1$. For example, the tube wall load ($P_1/l_L$) may be limited to 0.3 W/cm or less.

<<Setting of First Period $\Delta t_1$ and Second Period $\Delta t_2$>>

As described above, it has been experimentally confirmed that the intermittent lighting operation by supplying the specified lamp currents intermittently to the fluorescent lamp of the liquid crystal display device provides higher brightness than the continuous lighting operation of the fluorescent lamp, when the intermittent lighting operation satisfies the following relationship: a first electric power consumption (energy consumption) E1 is lower than a second electric power (energy consumption) E2, where the first power consumption $P_1$ is defined as $\{(\Delta t_1 \times I_{p-p} \times V_{p-p})/2\}$, $I_{p-p}$=a peak-to-peak value of a lamp current during a first period (a supply period) $\Delta t_1$, $V_{p-p}$=a peak-to-peak value of a lamp voltage applied between the electrodes of the fluorescent lamp during the first period $\Delta t_1$, the second power consumption $P_2$ is defined as $\{(\Delta t_1 + \Delta t_2) \times (I_{eff} \times V_{eff})\}$, $I_{eff}$=an effective value of the lamp current measured during one period ($\Delta t_1 + \Delta t_2$) consisting of the first period $\Delta t_1$ and a second period (light-ceasing period) $\Delta t_2$, and $V_{eff}$=an effective value of the lamp voltage measured during the one period ($\Delta t_1 + \Delta t_2$), and on the other hand, the continuous lighting operation of the fluorescent lamp provides the power $P_2$ continuously during the period ($\Delta t_1 + \Delta t_2$). Generally, the brightness of the fluorescent lamp depends upon a peak-to-peak value of an AC current flowing between its electrodes rather than the effective value of the AC current, and therefore, even in the continuous lighting operation of the fluorescent lamp with the above-mentioned power $P_2$, its brightness can be increased by increasing the peak-to-peak value of the AC current from that of the original sine wave.

However, according to the present invention, the brightness can be increased by repeating alternately supplying of a lamp current during the first period and ceasing of supply of the lamp current during the second period to the fluorescent lamp of the liquid crystal display device. To secure this advantage, it is desirable to give careful consideration to selection of the first period $\Delta t_1$ and the second period $\Delta t_2$. As described above, when the lamp current supplied during the first period is set so that its peak-to-peak value becomes greater, the brightness of the fluorescent lamp increases and the temperature also rises. When the temperature of the fluorescent lamp reaches a certain value (hereinafter the critical temperature), the brightness of the fluorescent lamp begins to decrease. Accordingly, it is preferable that, to secure brightness corresponding to a waveform of a first current supplied to the fluorescent lamp during the first period without incurring loss within the light source, the first period $\Delta t_1$ is set to be shorter than a length of time that the fluorescent lamp takes to reach the critical temperature after supply of the first current.

Figure 9A:
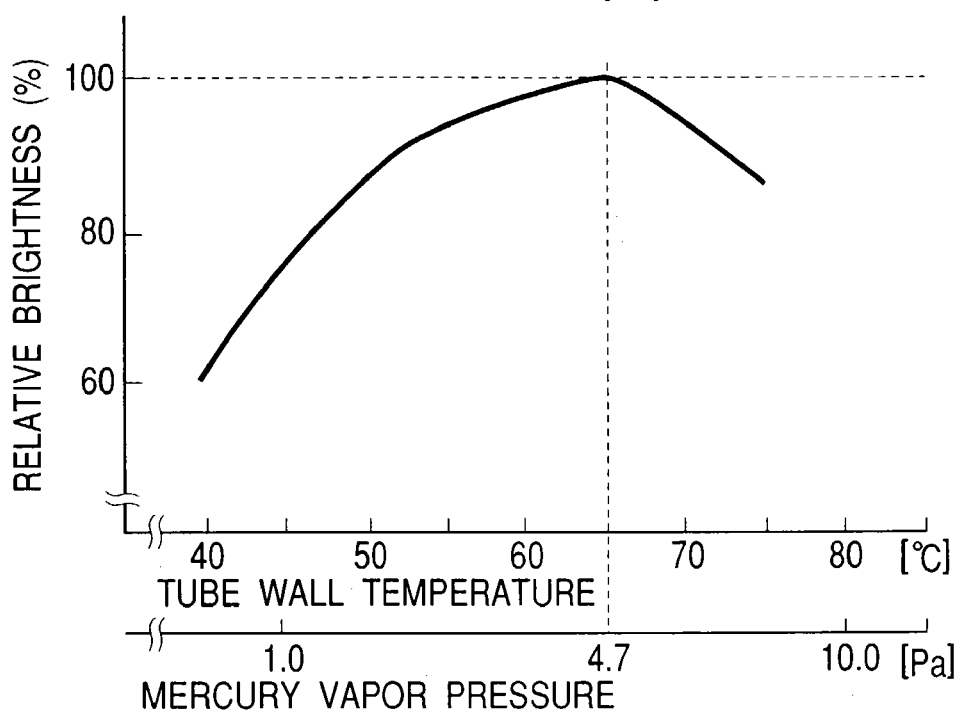
FIG. 9(a) is a graph showing a relationship among wall surface (outer wall) temperatures of a cold-cathode tube mounted on the liquid crystal display device according to the present invention, mercury vapor pressures in the tube, and brightness.
Figure 9B:
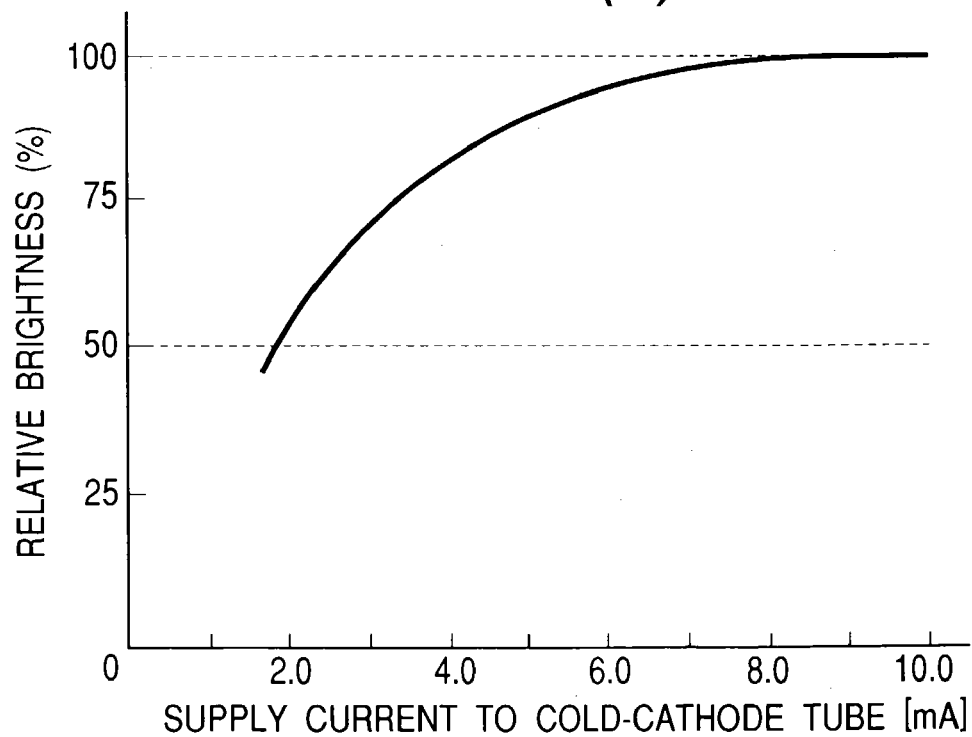
FIG. 9(b) is a graph showing a relationship between a current supplied to a pair of electrodes provided within a cold-cathode tube and brightness.

For a cold cathode tube as an example of the light source, FIG. 9(a) shows a relationship between its temperature (mercury vapor pressure within the tube) and its brightness, and FIG. 9(b) shows a relationship between currents flowing between a pair of electrodes provided therein and its brightness. Not only in cold-cathode tubes, but also in fluorescent lamps or xenon lamps which generate light by flowing an AC current between their electrodes within their tubes and thereby exciting gases and others sealed within their tubes, light radiated from a positive column generated by excitation of the gases and others is used as a light source.

As shown in FIG. 8, a positive column Yok has a brightness distribution which produces dark spaces in the vicinity of both electrodes spaced by a distance $l_{elec}$. The temperature of the cold-cathode tube is measured with a temperature sensor provided on its outer wall in a region $l_{loo}$ in which the brightness of the positive column is its maximum (or is saturated) between electrodes or a region in which the brightness is not less than 90% of the maximum value.

The brightness of the cold-cathode tube depends on mercury vapor pressure within the tube, in other words, the quantity of mercury gas present within the tube, as shown in FIG. 9(a), and in a case where the quantity of the mercury gas is below a certain value (hereinafter the critical mercury quantity), in this example, 4.7 Pa in mercury vapor pressure), the intensity of light within the tube and also the brightness of the cold-cathode tube itself rise with increasing quantity of the mercury gas. Further, as shown in FIG. 9(b), the brightness rise of the cold-cathode tube also corresponds to the increase of the current supplied thereto.

As is apparent from comparison between FIG. 9(a) and FIG. 9(b), due to increase in an electron flow within the cold-cathode tube according to the increase in the current supplied to the cold-cathode tube, the temperature within the cold-cathode tube rises, and the quantity of the mercury gas within the tube also increases. However, when the quantity of mercury gas exceeds the critical mercury quantity, light generated within the tube begins gradually to be absorbed by the mercury gas, as a result of which the brightness of the cold-cathode tube also reduces (see FIG. 9(a)). This change also appears as saturation in the curve of the brightness vs. the supplied current in FIG. 9(b). Such a phenomenon is observed not only in the cold-cathode tube or mercury gas but also in light sources (tubes) containing excitable material therein. For example, the same phenomenon will also occur in xenon lamps as in the case of cold-cathode tubes.

In view of this phenomenon, in the lighting operation of the light source of the liquid crystal display device according to the present invention, supplying of the lamp current (the current in the secondary side circuit in FIG. 1) to the fluorescent lamp during the first period $\Delta t_I$ is substantially discontinued during the second period $\Delta t_{II}$, thereby lowering the temperature of the fluorescent lamp elevated during the first period, during the second period, and reducing the quantity of mercury gas within the fluorescent lamp to a value sufficiently below the critical mercury quantity, and then the supplying of the lamp current to the fluorescent lamp is started again, which corresponds to the lighting operation during the first period of one succeeding period consisting of the first and second periods. In this operation, an AC current supplied to the fluorescent lamp during the first period $\Delta t_I$ has such a large peak-to-peak value which would cause the reduction in brightness if the AC current is supplied to the fluorescent lamp in the continuous lighting operation, but the supplying of the AC current to the fluorescent lamp is repeated during the first period $\Delta t_I$ of one period consisting of the first period $\Delta t_I$ and the second period $\Delta t_{II}$, and thereby the fluorescent lamp can be lit to provide high brightness during each of the first periods.

On the other hand, during the second period, the brightness of the fluorescent lamp begins to reduce from a high value produced during the first period. However, it has been found experimentally that, when the intensity of light emitted from the liquid crystal display panel of the liquid crystal display device provided with this fluorescent lamp was measured, the brightness of a region displaying a white image in the liquid crystal display panel decreases more slowly than expected, because of afterglow of the fluorescent lamp. This phenomenon is indicated by the brightness-time curve of FIG. 10 (whose details will be described later).

As described above, in the fluorescent lamp, mercury gas sealed therein is excited by the lamp current supplied thereto to generate ultraviolet rays, and the phosphor coated on the inner wall of the fluorescent lamp is excited by the ultraviolet rays to generate visible light.

An example of driving the light source of the liquid crystal display device according to the present invention will be described with reference to FIG. 11($a$) showing a sync signal (transferring timing of image information) input to the liquid crystal display device, FIG. 11($b$) showing an image display signal for a pixel of the liquid crystal display device, FIG. 11($c$) showing a lighting signal for a backlight (a light source) of the liquid crystal display device, and FIG. 11($d$) showing a brightness waveform of light radiated from a backlight unit (a light source unit) of the liquid crystal display device. The lighting signal for the backlight is shown as a waveform having an operating period consisting of times $\Delta t_I$ and $\Delta t_{II}$. In the primary side circuit, a first current $i_I$ is supplied to the light source through the transformer TR during time $\Delta t_I$ (a first period), and then a second current $i_{II}$ smaller than the first current $i_{II}$ is supplied to the light source through the transformer TR during time $\Delta t_{II}$ (a second period).

In this example, a current is supplied with the duty ratio of 50% with $\Delta t_I$ and $\Delta t_{II}$ being selected to equal to each other, and the second current is suppressed to approximately 0 mA. However, as described above, no current flows in the secondary side circuit unless the second current $i_{II}$ exceeds a certain value.

Suppose that power consumed by the light source operated by the backlight lighting signal having the above operating period and the waveform shown in FIG. 11($c$) in the primary side circuit is supplied continuously (constant power irrespective of the first and second periods) to the light source, a current value (here, in the primary side circuit) is shown as an intermediate value $i_{CONST}$ between the first current $i_I$ and the second current $i_{II}$. However, when the current $i_{CONST}$ is flowed continuously during a length of time corresponding to a plurality of operating periods, a temperature of the light source gradually rises, and light within the light source gradually reduces. Therefore, although it is expected that brightness produced by the current $i_{CONST}$ of FIG. 11($c$) is an intermediate value indicated by $i_{CONST}$ (broken line) which is between brightness $I_I$ and $I_{II}$ as indicated in FIG. 11($d$), where $I_I$ is brightness which the light source attains during the first period by receiving the first current $i_{II}$, and $I_{II}$ is brightness which the light source attains during the second period by receiving the second current $i_{II}$, actually, a value of $I_{CONST'}$ (solid line) is produce which is lower than the intermediate value $I_{CONST}$. Further, a difference between $I_{CONST}$ (broken line) and $I_{CONST'}$ (solid line) gradually spreads from $\Delta t_1$ to $\Delta t_2$ due to the temperature rise of the light source with the passage of time. The reason why the difference between the expected and measured values of the brightness of the light source increases with the passage of time is that activators (such as mercury and halogen molecules) present within the fluorescent lamp increase due to the temperature rise of the fluorescent lamp (the cold-cathode tube), and consequently, the amount of absorbed light increases, as already explained in connection with FIGS. 9($a$) and 9($b$).

However, as shown in a backlight brightness waveform during the first period $\Delta t_I$ of FIG. 11($d$), when the current $i_I$ is supplied again to the light source (such as the cold-cathode tube) after supplying of the current to the light source has been ceased, the brightness of the light source rises gradually. It is apparent from this that the temperature rise within the tube is delayed by some time from the time of starting supplying of a specified current to the cold-cathode tube.

Incidentally, in consideration of a rewriting period (the frame period) of an image data signal in the liquid crystal display device, for example, 16.7 msec at 60 Hz, and 8.4 msec at 120 Hz (these values are suitable for displaying moving pictures), it is preferable that the operating period of the light source is set to not more than the period. It has been found experimentally that when time division between the first period $\Delta t_I$ and the second period $\Delta t_{II}$, the first current $i_I$ and the second current $i_{II}$ are set corresponding to the operating period, the reduction of brightness due to the temperature rise of the light source can be suppressed.

The following explains the results of the experiments on the continuous lighting and blink-lighting of a cold-cathode tube having the lamp current rating of 6 mA as defined above, including measurement of wall temperatures of the cold-cathode tube. In the experiments, intensities of light passing through pixels of a liquid crystal display panel from the light source (the cold-cathode tube) were measured as brightness of the liquid crystal display panel.

The conditions for measurement of the brightness of the liquid crystal display panel are as follows:

The brightness measurement of the liquid crystal display panel was carried out in accordance with the conditions set forth in ED-2522 of EIAJ (Electronic Industries Association of Japan) Standards and the measured spectral intensity per unit wavelength in the visible region (380 nm to 780 nm) was calibrated by the luminosity function of the human eye (corrected to correspond to an intensity of the light actually perceived by the human eye).

In this measurement, the liquid crystal display device was in a darkroom, and a brightness meter was placed at a distance of 50 cm from the liquid crystal display panel PNL by 50 cm so as to be perpendicular to the display area of the liquid crystal display panel PNL. For example, a Type PR704 brightness meter manufactured by Photo Research Corp. is recommended for the above measurement. This equipment can also measure luminous flux per unit solid angle irrespective of measurement distance or measurement area. Further, this equipment can measure the integral of the brightness over a desired length of time, for example, the operating period consisting of $\Delta t_I$ and $\Delta t_{II}$, variations in brightness during the operating period, and a brightness distribution in the display area of the liquid crystal display element.

The aforementioned brightness measurement is also applicable to contrast ratio measurement described later, and the contrast ratio was provided by the ratio of the brightness produced by displaying a white image over the entire display area of the liquid crystal display panel to the brightness produced by displaying a black image over the entire display area. In addition to the above method, for example, the contrast ratio can also be measured by providing a test pattern signal such that a first portion of the display area of the liquid crystal display panel displays a white image (pixels in the first portion are provided with video signals to maximize light transmission therethrough), and a second portion of the display area displays a black image (pixels in the second portion are provided with signals to minimize light transmission therethrough, and obtaining a ratio of brightness of a first region comprised of a first number of the pixels in the first portion to brightness of a second region comprised of a second number of the pixels in the second portion, the second number being equal to the first number.

The wall surface temperature of the light source (the cold-cathode tube) was measured by attaching a thermistor to the tube surface (the outer wall) in the vicinity of the region (the region denoted by $l_{100}$ in FIG. 8) generating the positive column (the light-generating region characteristic of the fluorescent lamp).

In the following experiment using the above-described brightness measurement procedure, the light source (the cold-cathode tube) was continuously lit at the rated lamp current of 6 mA. The following describes the brightness produced by light emitted from the light source and then passing through the white-image-displaying pixels of the liquid crystal display panel, for various tube-wall surface temperatures.

(1) At a tube-wall surface temperature of 40° C., brightness saturated about 150 seconds after the start of lighting, and reduction of the brightness was not recognized even 200 seconds after the start of lighting.

(2) At a tube-wall surface temperature of 60° C., brightness showed its peak value about 15 seconds after the start of lighting, then the brightness gently reduced, and reached 90% of its peak value 200 seconds after the start of lighting.

(3) At a tube-wall surface temperature of 80° C., brightness showed its peak value about 10 seconds after the start of lighting, then the brightness rapidly reduced to 80% of the peak value in about 10 seconds, and then the brightness continued to reduce gently until 200 seconds after the start of lighting.

Comparison of the above results shows that the maximum of the brightness 200 seconds after the start of lighting of the light source was provided at (2), i.e., the tube-wall surface temperature of 60° C., but the maximum value of the brightness within 200 seconds after the start of lighting was provided at (3), i.e., the tube-wall surface temperature of 80° C. The tube-wall surface temperatures of the light source generally correspond to temperatures within the light source, and increase according to the current supplied to the light source as described above.

By studying this fact and the above experimental results, the present inventors have conceived an idea that the brightness of the liquid crystal display panel can be made higher than that obtained by the above experiment (2) even 200 seconds after the start of lighting of the light source, by supplying a current sufficient to elevate the tube-wall surface temperature to 80° C., for example, for a limited length of time, then cutting of the current about the time when the tube-wall surface temperature reaches 60° C., and then supplying the current to the light source again at the time when the tube-wall surface temperature falls to 40° C. or less.

Based upon this idea, the present inventors have devised a method of lighting the light source which repeats a first step and a second step alternately, where the first step of supplying a first current $i_I$ higher than its rated lamp current (for example, about two times the rated lamp current) to the cold-cathode tube during a first period $\Delta t_1$ and a second step of supplying a second current $i_{II}$ lower than the first current $i_I$ during a second period $\Delta t_{II}$, and they have confirmed the advantages of increase in the brightness of the cold-cathode tube and suppression of its temperature rise.

The following explains an experiment on comparison in brightness between the continuous lighting and the blink-lighting carried out by using the cold-cathode tube having the rated lamp current of 6 mA as in the case of the above-described experiment. In the two continuous lighting operations (with the duty ratio of 100%), the cold-cathode tube was operated at the lamp currents of 6 mA and 10 mA, respectively. In the two blink-lighting operations (with the duty ratio of 60%) consisting of alternate supply and cutoff of the lamp current, the cold-cathode tube was supplied with the lamp currents of 6 mA and 10 mA, respectively, during the first period $\Delta t_1$ of 10 msec, and the lamp currents of the cold-cathode tube were cut off during the second period $\Delta t_2$ of 6.7 msec. Some of the results of this experiment relating to the comparison between the continuous lighting at the lamp current 6 mA and the blink-lighting at the lamp current 10 mA have already been referred to in <<Control circuit of a light source>> described above, and they showed that the blink-lighting at the lamp current of 10 mA is superior to the continuous lighting at the lamp current of 6 mA because both the power consumption (the energy consumption) and the electric power required for obtaining of the luminous intensity of 100 cd are smaller in the blink-lighting than in the continuous lighting.

In the comparison experiment, a liquid crystal display device is used in which a 15 in. screen-diagonal liquid crystal display panel of the IPS (In-Plane Switching) type (also called the horizontal electric field type) is assembled with a light source unit having eight cold-cathode tubes of 2.6 mm in outside diameter and 2.0 mm in inside diameter arranged as shown in FIG. 3(b), and brightness was measured at the white-image-displaying region of the display screen of the liquid crystal display panel. Further, blinking of the eight cold-cathode tubes are synchronized with the on/off timing of the respective cold-cathode tubes.

Figure 12B:
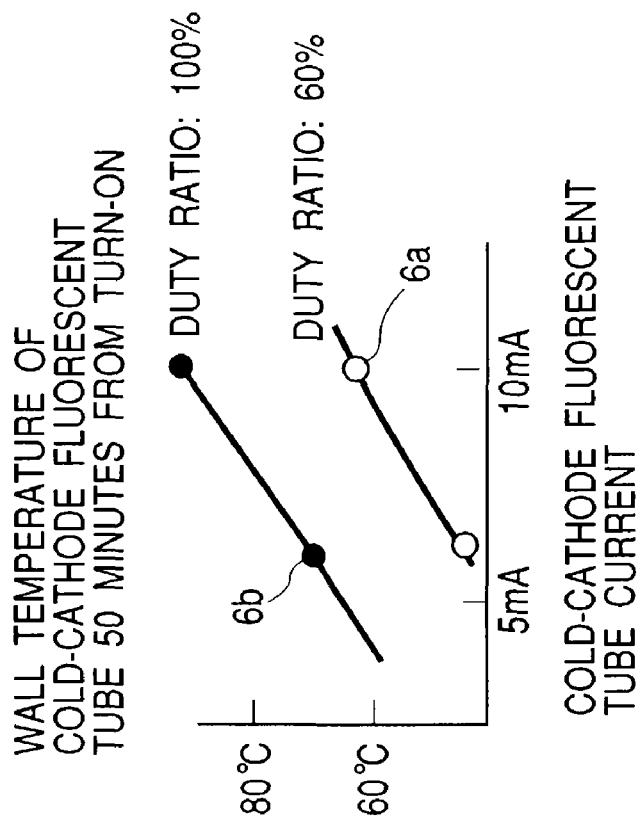
FIG. 12(a) and FIG. 12(b) are respectively graphs showing brightness with respect to a lamp current (an axis of abscissa) and wall surface temperatures after four kinds of lighting different in light duty ratio and lamp current (CFL tube current) of the light source of the liquid crystal display device are continued for 60 minutes.
Figure 12A:
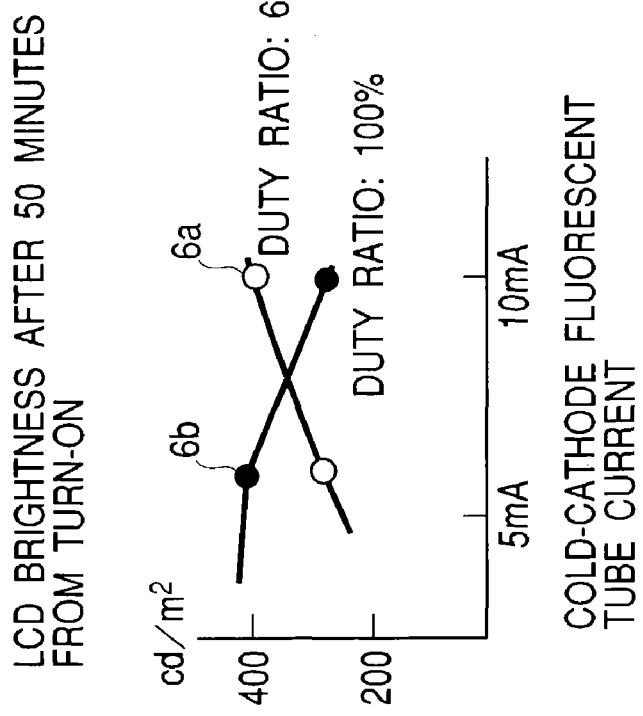

FIG. 12(a) shows the measured results of brightness of the liquid crystal display panel (the white-image-display region) 60 minutes after the start of lighting operation when the lamp currents of 6 mA and 10 mA are supplied to the light sources (cold-cathode tubes) for the lighting duty ratios of 60% and 100%. FIG. 12(b) shows the measured results of tube-wall surface temperature of the light source (cold-cathode tubed) 60 minutes after the start of lighting operation when the lamp currents of 6 mA and 10 mA are supplied to the light source for the lighting duty ratios of 60% and 100%. FIG. 12(a) shows the brightness (plot 6a) produced by the lamp current of 10 mA with the duty ratio of 60% is approximately equal to the brightness (plot 6b) produced by the lamp current of 6 mA with the duty ratio of 100%. However, FIG. 12(b) shows that the tube-wall surface temperature (plot 6a) of the cold-cathode tube at the lamp current of 10 mA with the duty ratio of 60% is lower than the tube-wall surface temperature (plot 6b) at the lamp current of 6 mA with the duty ratio of 100%.

Figure 13A:
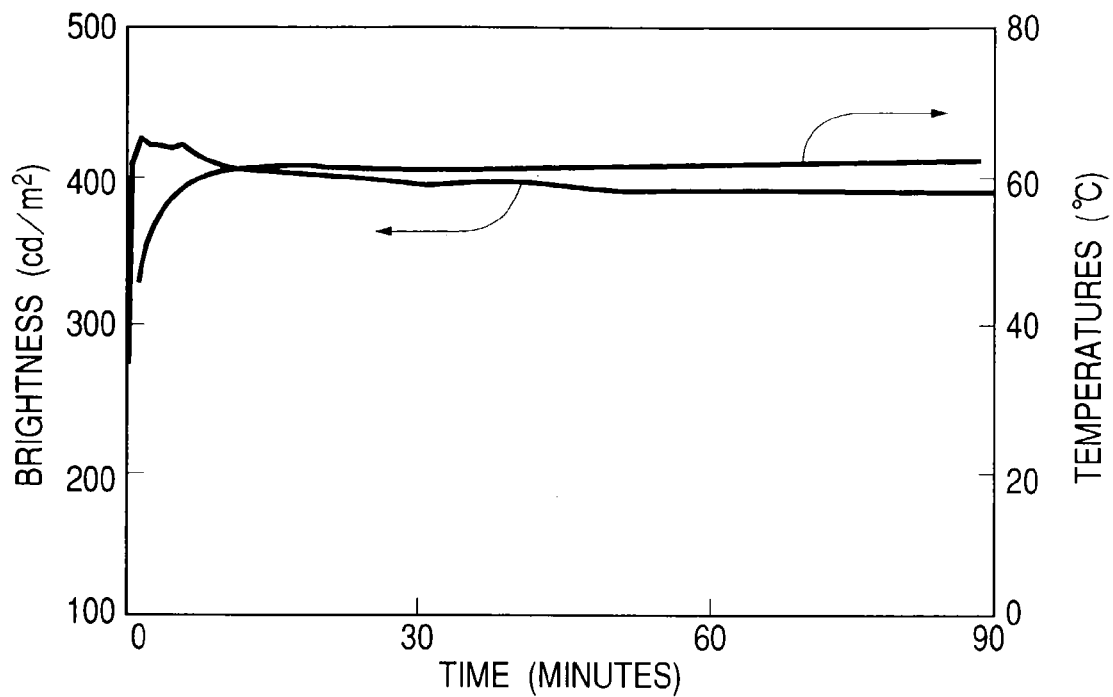
FIG. 13(a) and FIG. 13(b) are respectively graphs showing the change in brightness and wall surface temperature of a light source (a cold-cathode tube) of the liquid crystal display device with time, for a case where the light source is operated in a manner of blinking lighting according to the present invention and a case where the light source is subjected to continuous lighting.
Figure 13B:
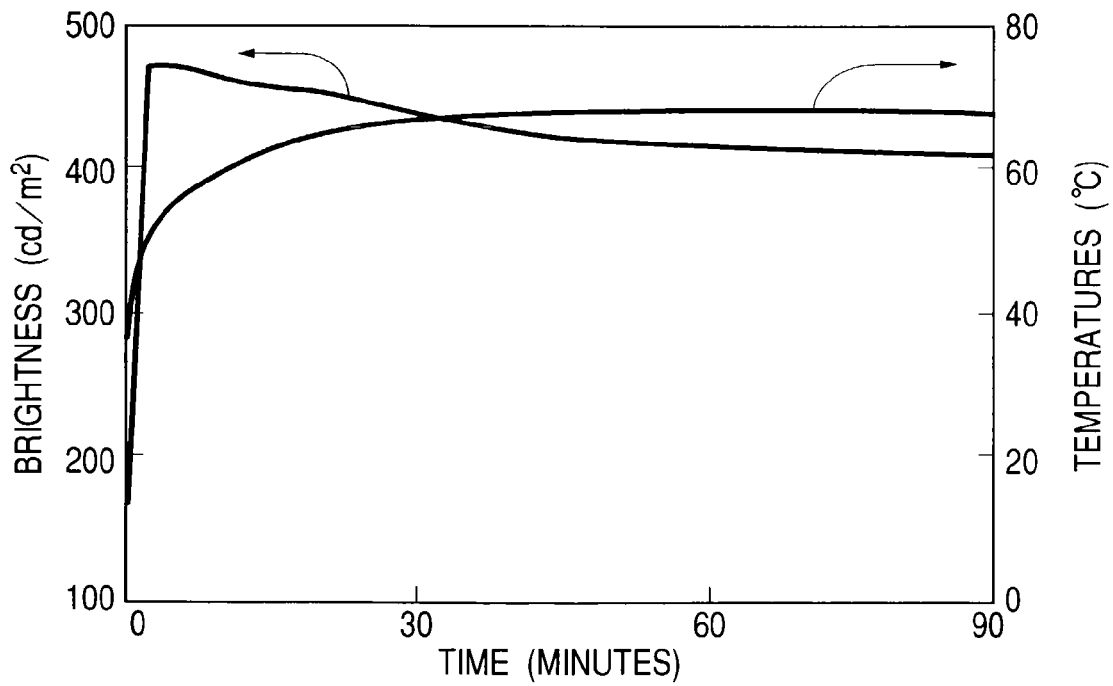

Further, FIGS. 13(a) and 13(b) show the variations of the panel brightness and the tube-wall surface temperature of the cold-cathode tube with time during the 90 minute period from the start of lighting for the blink-lighting at the lamp current 10 mA with the duty ratio 60% and the continuous lighting at the lamp current 6 mA with the duty ratio 100%, respectively. In both the lighting operations, the panel brightness shows their peaks (about 420 cd/m$^2$ in the blink-lighting, and about 470 cd/m$^2$ in the continuous lighting) after the start of lighting, and then decreases. At 60 minutes after the start of lighting, the brightness by the blink-lighting is about 390 cd/m$^2$, that by the continuous lighting is about 420 cd/m$^2$, and this means that the rate of decrease in the brightness by the blink-lighting is 7%, and is smaller than that by the continuous lighting which is 11%. At 90 minutes after the start of lighting, the brightness by the continuous lighting still continues to reduce, but the brightness by the blink-lighting maintains the same brightness as that at 60 minutes after the start of lighting.

The ratios P/Lmax of the electric power P (W) consumed by the light source of the liquid crystal display device to the luminous intensity Lmax (cd) of the useful display area (pixels) of the white-image-displaying liquid crystal display element at 60 minutes after the start of lighting are 7.4 W/(100 cd) in the blink-lighting at the lamp current 10 mA with the duty ratio 60%, and 8.1 W/(100 cd) in the continuous lighting at the lamp current 6 mA with the duty ratio 100%, of the cold-cathode tube. This shows the power required for a given panel brightness value in the blink-lighting at the lamp current 10 mA with the duty ratio 60% is 8.6% smaller than that in the continuous lighting. This difference in the power consumption required for the luminous intensity of 100 cd, although it is smaller than 10%, is very effective for stabilization of the tube-wall surface temperature of the cold-cathode tube (light source) in the blink-lighting, and the difference of at least 5%, preferably at least 7% can substantially stabilize the brightness.

As is apparent from the above-described explanation and the above explanation of <<Control circuit of a light source>>, by the blink-lighting of the cold-cathode tube at the lamp current 10 mA with the duty ratio 60%, there can be obtained the advantages that the power necessary for obtaining a predetermined brightness of the liquid crystal display panel is suppressed, and variations in brightness with time after the start of lighting is also suppressed. Particularly, the advantages that variation of brightness of the liquid crystal display panel is small and becomes approximately constant after 60 minutes from the start of lighting can reduce the burden on the sense of vision of a viewer considerably when this liquid crystal display panel is incorporated into a television receiver for presenting movies or documentary programs for two hours or more.

Figure 14:
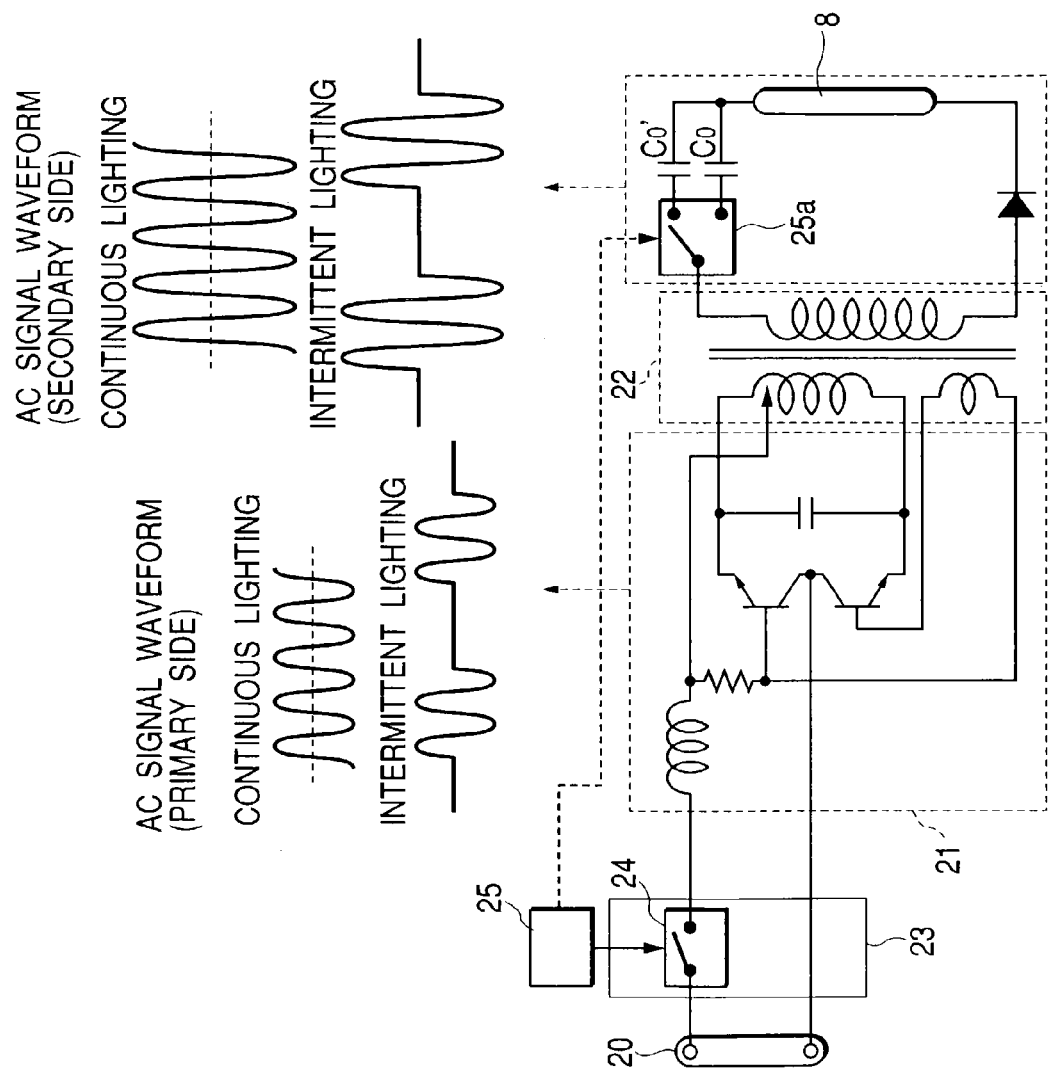
FIG. 14 is a schematic view showing a further example of a control circuit suitable for lighting of a light source of a liquid crystal display device according to the present invention.

The duty ratio of blink-lighting of the light source may be 80% or less from experience, though it depends on use of the liquid crystal display device. Further, the above-described first current $i_f$ may be reduced while the duty ratio is progressively increased to continuous lighting of the light source, or conversely, the duty ratio may be gradually reduced into a state in which lighting is ceased in the liquid crystal display device which is not used. One example of a control circuit suitable for such operation is shown in FIG. 14.

A DC power supply voltage (for example, 12V) from the main body of the liquid crystal display device, a television device incorporating it, or a computer enters a control circuit through an input terminal 20. A DC power supply voltage is converted into a DC voltage according to a voltage that should be supplied to the light source by the light control circuit 23, and then is converted into an AC voltage by an inverter circuit 21 provided in the next stage. This AC voltage is sent to a transformer 22. The circuit configuration mentioned so far corresponds to the primary side circuit already mentioned. The transformer 22 boosts the AC voltage to a voltage high enough to light the light source (the cold-cathode tube or the like) to send it to the light source (the fluorescent lamp) 8. The circuit configuration from the transformer 22 to the fluorescent lamp 8 is called the secondary side circuit mentioned previously.

In a case where blink-lighting of the light source according to the present invention is carried out, the DC power supply voltage is supplied intermittently to a circuit in the later stage. To this end, a switching element 24 for chopping the DC power supply voltage is provided, for example, within the light control circuit 23 in the preceding stage of the inverter circuit. In a case where the above-described second current is set by chopping or cutting-off of the DC power supply voltage, a switching control circuit 25 is provided. The switching control circuit 25 may be provided with a signal terminal such that the image display condition can be input from the outside of the control circuit to prepare for maintenance of the liquid crystal display device.

As explained in connection with FIG. 7, it is necessary for stable discharging of the fluorescent lamp (the cold-cathode tube) in the secondary side circuit at a specified lamp current $I_L$ that the "lamp current $I_L$ versus lamp voltage $V_L$" curve (which depends upon by the fluorescent lamp used) and the "lamp current $I_L$ versus the 'Potential difference ($V_{TR}-V_C$) between transformer output voltage minus ballast condenser voltage'" curve (which is determined by the transformer output voltage and the capacity of the ballast condenser) intersect each other at the above-mentioned specified lamp current $I_L$.

Accordingly, it is preferable that in a case where the fluorescent lamp is continuously lit at a rated lamp current of the fluorescent lamp or is blink-lit at a lamp current higher than the rated lamp current, the capacity Co' of the ballast condenser used in the blink-lighting is made greater than the capacity Co used for the continuous lighting. Accordingly, as shown in FIG. 14, two condensers different in capacity may be provided in parallel with each other in the secondary side circuit such that one of the two condensers are selected according to whether the fluorescent lamp 8 is continuously lit or blink-lit. With this configuration, the lamp current $I_L$ at the time of continuous lighting can be limited to a necessary level, the lifetime of the fluorescent lamp 8 is not degraded unnecessarily, and the fluorescent lamp 8 can be lit stably irrespective of the increase and decrease in the lamp current $I_L$. In view of the fact that the lamp current $I_L$ is increased or decreased in accordance with switching between the continuous lighting and blink-lighting of the fluorescent lamp or changing of the duty ratio in the blink-lighting, it is convenient to configure a control circuit such that one of the two condensers of the secondary side circuit is selected by a lamp current-switching switch 25a included in or interlocked with a switching control circuit 25 for changing lighting operations (switching between the continuous lighting and blink-lighting operations, or changing duty ratios) as shown in FIG. 14. In FIG. 14, the two condensers of the are connected in parallel with each other in the secondary side circuit, but three or more condensers each having different capacitances may be connected in parallel if it is necessary to adjust the lamp current $I_L$ finely according to the duty ratio.

On the other hand, the lamp current $I_L$ can be switched without changing the capacitances (Co) of the ballast condenser. In this case, as shown in FIG. 7, the secondary side output voltage $V_{TR}$ of the transformer TR is raised to $V_{TR}'$ according to an increase of the lamp current. To this end, there are several ways such as providing a switch (selector) at the primary side of the transformer for selecting one of the numbers of winding turns on the primary side of the transformer according to the lamp current; raising the voltage itself of the primary side DC power supply and then adjusting the raised voltage by chopping the primary side circuit voltage by using the switching element 24 according to the lamp current; or providing an additional proper voltage source at the input terminal of the primary side DC power supply circuit so as to increase or decrease the input voltage to the primary side circuit according to the lamp current.

Figure 15:
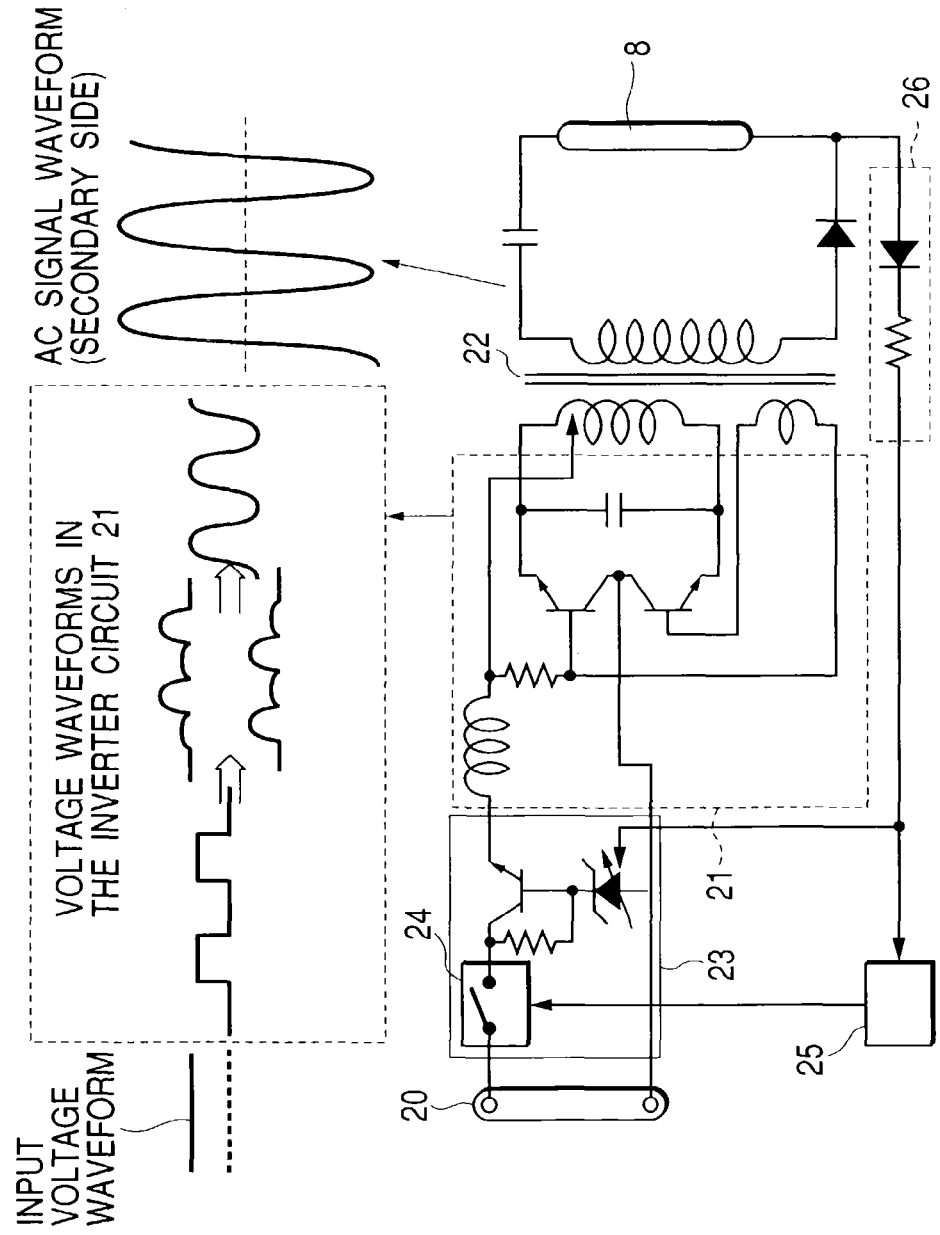
FIG. 15 is a schematic circuit diagram of an example of a control circuit useful for a lighting operation of a light source of a liquid crystal display device in accordance with the present invention.

On the other hand, the temperature of the light source sometimes exhibits unexpected variations caused by the environment in which the liquid crystal display device is used. Accordingly, it is desired that the duty ratio of blink-operation is changed or the lamp current is adjusted according to the temperature of the light source. In view of this, one example of a control circuit suitable for carrying out the present invention is shown in FIG. 15. The current variation in the secondary side circuit according to the temperature of the light source is measured by an ammeter 26 provided therein and its signal is transferred to a light control circuit 23 of the voltage light-control type. Thus, the above-described first and second current are adjusted. Further, the data representing the current variation from the ammeter 26 is also sent to the switching control circuit 25 so that division of time (duty ratio) between periods of time for supplying the first and second currents $i_I$, $i_{II}$ to the light source is adjusted. The first and second current values $i_I$, $i_{II}$ may be adjusted by the switching control circuit 25 instead. In place of monitoring the temperature of the light source by using the current in the secondary side circuit, the temperature can be monitored by a thermistor or a thermocouple attached to the tube-wall surface of the light source measuring the tube-wall surface temperature of the light source, or the temperature can be monitored by the intensity of light radiated from the tube-wall surface of the light source measured with a light-sensitive element (such as a photodiode) provided in the vicinity of the light source.

In the case using the control circuit shown in FIG. 14, or FIG. 15, or other control circuits designed based on the control circuits, in changing the duty ratios, it is desirable to keep the repeating period (the sum of the above-described first period $\Delta t_I$ and the above-described second period $\Delta t_{II}$) constant, or to limit the repeating period to a certain proper time. The reason is that, in the liquid crystal display device performing the blink-lighting operation of the light source according to the present invention, images are reproduced in the way similar to the impulse scanning employed in the cathode ray tube type display device. In the impulse scanning, a problem of flicker of an image arises when its scanning frequency is selected to be below a certain level. This problem appears also in a case where the fluorescent lamp is used in an illuminating device serving as electrical home appliances.

In the lighting operation of the light source of the liquid crystal display device according to the present invention, it is recommended that the above-described first period (the turn-on period) $\Delta t_I$ and the above-described second period (the turn-off period) $\Delta t_{II}$ are selected such that its operating frequency is not below 40 Hz. Accordingly, it is desirable that one period of the blink-lighting operation consisting of the first period $\Delta t_I$ and the second period $\Delta t_{II}$ is limited to 25 msec or less. The liquid crystal display device, particularly, the device using a driving system of the active matrix type performs image-displaying operation of a so-called hold type in which light transmission of a liquid crystal layer associated with each pixel is kept substantially constant in one frame period (a period necessary for completing writing of data into all of the pixels). Accordingly, even if one frame period is different from a period of the blink-lighting operation of the light source, or if the image frame is out of phase with the blink-lighting, the image displaying operation will not be disturbed substantially. Therefore, during the blink-lighting operation in which the first current $i_I$ is supplied to the light source during the predetermined first period $\Delta t_I$ and the supply of the current to the light source is ceased during the predetermined second period $\Delta t_{II}$, even if the brightness is reduced due to the temperature rise of the light source during one repeating period of the blink-lighting operation, it is possible to maintain the desired level of brightness of the light source during the repeating period of the blink-lighting operation by increasing a length of time allotted to the second period $\Delta t_{II}$ only and thereby decreasing the duty ratio of the blink-lighting.

As described above, according to the lighting method of the light source of the liquid crystal display device according to the present invention, the lamp current is not produced in the secondary side circuit during the second period $\Delta t_{II}$, and therefore the reduction of brightness of the light source is expected. Suppose one repeating period ($\Delta t_I + \Delta t_{II}$) of the blink-lighting consists of the first period $\Delta t_I$ and the second period $\Delta t_{II}$, and consider the following two cases:

First Case

The first current is supplied continuously during the first period $\Delta t_I$ only, and this AC current provides an effective value $I_{ieff}$ of the current and a lamp voltage $V_{ieff}$ (an effective value of an AC voltage applied between the electrodes of the light source). The energy consumption is $I_{Ieff} \times V_{Ieff} \times \Delta t_I$.

Second Case

An AC current is supplied to the secondary side circuit continuously during the one repeating period ($\Delta t_I + \Delta t_{II}$), and this AC current provides an effective value $I_{Ceff}$ of the current and a lamp voltage $V_{ceff}$ (an effective value of an AC voltage applied between the electrodes of the light source). The energy consumption is $I_{ceff} \times V_{ceff} \times (\Delta t_I + \Delta t_{II})$.

If $I_{ieff}$, $V_{ieff}$, and $I_{Ieff} \times V_{Ieff} \times \Delta t_I$ are equal to $I_{ceff}$, $V_{ceff}$, and $I_{ceff} \times V_{ceff} \times (\Delta t_I + \Delta t_{II})$, respectively, it might be thought that the integral of the intensity of light radiated from the light source over the repeating period ($\Delta t_I + \Delta t_{II}$) is theoretically equal in both the above two cases, or the integral of the intensity of light in the blink-lighting (First case) which requires time for its brightness to rise at the start of the first period is smaller than that in the continuous lighting (Second case).

The two liquid crystal display elements of the active matrix type of FIG. 1 were operated with the above two conditions First case and Second case, respectively, where the light transmission through the two liquid crystal display elements are adjusted to be equal to each other as by the orientation conditions of the liquid crystal molecules in the liquid crystal display element. The following describes the results of comparison of the integrals of brightness (hereinafter the panel brightness) of light passing through the two liquid crystal display elements over the repeating period.

(4) When light passing through the white-image displaying pixels of the respective liquid crystal display elements are measured, the integral of brightness of the liquid crystal display element combined with the blink-lighting light source was larger than that of the liquid crystal display element combined with the continuous lighting light source.

(5) When light passing through black-image-displaying pixels of the respective liquid crystal display elements are measured, the integral of brightness of the liquid crystal display element combined with the blink-lighting light source turned out to be about half that of the liquid crystal display element combined with the continuous lighting light source.

As described above, by carrying out blink-lighting of the light source of the liquid crystal display device according to the present invention, it was possible to make brightness of the white-displaying pixels higher and that of the black-displaying pixels lower than those, respectively, in the case of the continuous lighting of the light source. In other words, by the blink-lighting of the light source according to the present invention, the contrast ratio of still or moving display images of the liquid crystal display device can be made remarkably higher than that in the case of the conventional blink-lighting of the light source.

In the liquid crystal display elements of the active matrix type used in the experiment which has provided the results of the above (4) and (5), an active element (for example, a thin film transistor) is provided for each pixel, as disclosed, for example, in Japanese Patent Laid-open No. Hei 9-33951 (and corresponding U.S. Pat. No. 5,847,781), and a video signal (a voltage signal) is supplied to a pixel electrode in each pixel via a corresponding active element. Accordingly, the light transmittance of each pixel depends upon orientation of liquid crystal molecules within the liquid crystal layer varying with a difference between a voltage according to a video signal supplied to the pixel electrode and a voltage on a counter electrode (also called a common electrode) facing the pixel electrode with the liquid crystal layer interposed therebetween. The white-displaying pixel means a pixel having its active element supplied with a video signal maximizing the light transmittance (transmittance of light propagating in a direction normal to the major surface of the liquid crystal display panel shown in FIG. 1) of the liquid crystal layer between its pixel electrode and the counter electrode. The black-displaying pixel means a pixel having its active element supplied with a video signal minimizing the light transmittance of the liquid crystal layer present between its pixel electrode and the counter electrode.

Figure 10:
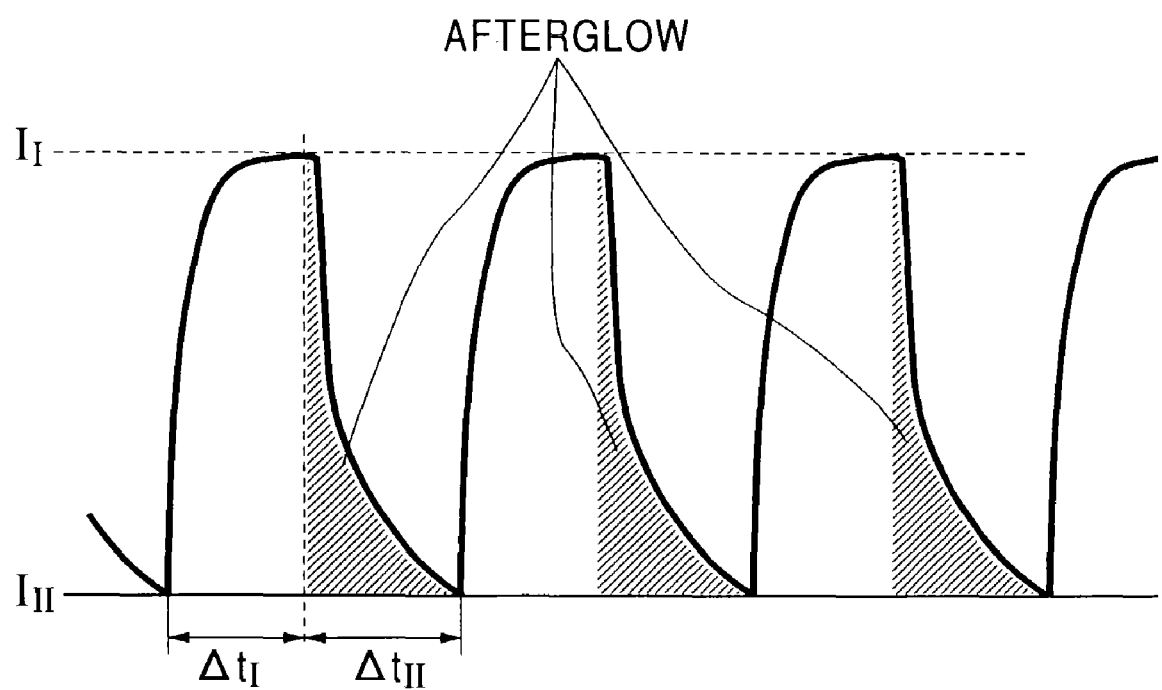
FIG. 10 is a graph showing a variation in brightness of pixels in a state of displaying white on a display screen when a light source of the liquid crystal display device according to the present invention blinks.
Figure 11A:
FIG. 11(a) shows a timing of a sync signal input in a liquid crystal display device in connection with one example of lighting operation of a light source of the liquid crystal display device according to the present invention.
Figure 11B:
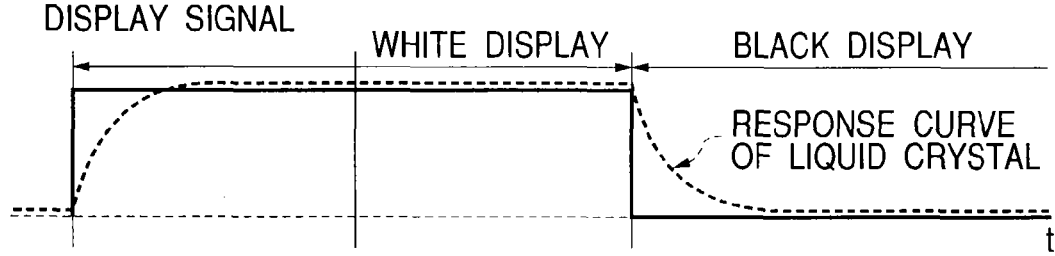
FIG. 11(b) is a waveform view of an image display signal supplied to a pixel of the liquid crystal display device.
Figure 11C:
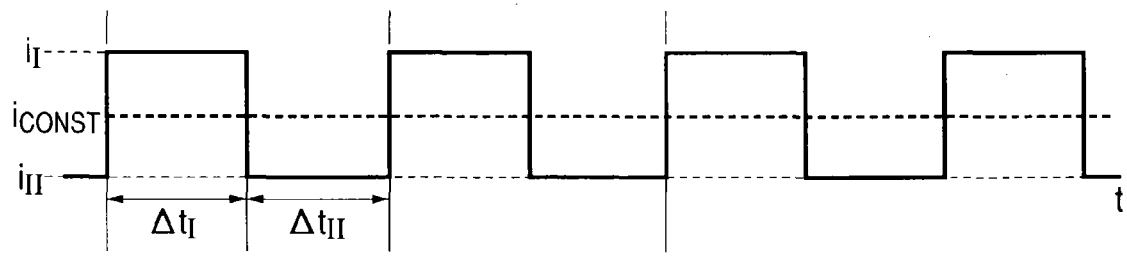
FIG. 11(c) is a waveform view of a lighting control signal (a DC current in primary side circuit) of backlight of the liquid crystal display device.
Figure 11D:
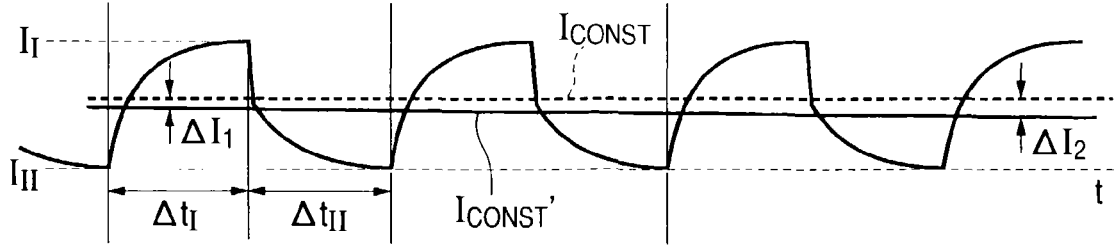
FIG. 11(d) is a waveform view of variation in brightness of backlight.

The following explains the reason why the result of the above (4) was obtained by the blink-lighting of the light source of the liquid crystal display device according to the present invention with reference to FIG. 10.

FIG. 10 is a graph showing brightness variation with time in a white display state when the light source combined with the liquid crystal display element is blink-lit with the first period $\Delta t_I$ and the second period $\Delta t_{II}$ being equal to each other ($\Delta t_I = \Delta t_{II}$, i.e., the duty ratio=50%). One repeating period ($\Delta t_I + \Delta t_{II}$) of blink-lighting is set to 16.7 msec. As is apparent from the graph, the brightness during the second period does not fall to zero steeply, and it takes time corresponding to 80% to 90% of the second period for the brightness to fall to 10% of the brightness at the end of the first period (the start of the second period). Accordingly, when the integral of brightness corresponding to an area of a region surrounded by the curve showing the time-variation of brightness and the time axis (indicated as a line showing zero brightness) is considered, even the integral of the brightness over the second period $\Delta t_{II}$ cannot be ignored compared with that over the first period $\Delta t_I$.

In the blink-lighting, the specified lamp current is supplied to the light source during the first period, then the current is cut off during the succeeding second period, and then the specified lamp current is supplied to the light source again during the succeeding first period, therefore it is thought that the time variation of brightness of the light source in the blink-lighting should exhibit rectangular waveforms similar to the waveforms of the DC current in the primary side circuit shown in FIG. 4(a), instead of the curve of the time variation of brightness shown in FIG. 10. Brightness does not rise steeply even in the earlier half of the first period due to the delay (seen in a rise from time 0 of the brightness curves of FIGS. 13(a) and 13(b) in the case of the fluorescent lamp) in response of the light source to the start of supply of the lamp current, and therefore it is thought that the integral of brightness becomes smaller by so much.

However, actually, the integral of the brightness over the second period more than makes up for loss of the integral of the brightness over the earlier half of the first period.

This large integral of the brightness (shaded area in FIG. 10) over the second period $\Delta t_{II}$ is caused by the afterglow occurring in the light source. Take the fluorescent lamp, for example, the afterglow is generated by the activator species of mercury atoms or ion generated within the fluorescent lamp remaining after the lamp current supplied to the fluorescent lamp has been cut off, or the afterglow is generated because the fluorescent material (coated on the inner wall of the fluorescent lamp) excited by the activator species or ion is kept in the excited state. In the after glow in the former case, the lifetime of the activator species of mercury atoms or ion (here, time required for the activator species or ion to cease to exist after the lamp current has been cut off) is very short, about $10^{-8}$ sec, and its luminescence attenuates steeply. On the other hand, the afterglow in the latter case sometimes requires 1 sec or more till the luminescence ceases to exist depending upon the composition of the fluorescent material.

The fluorescent materials coated on the inner walls of fluorescent lamps including cold-cathode tubes are described, for example, on page 79 of "Illuminating Engineering" (Electric Society, 23rd ed. 1999, Ohm Publishing Co. Ltd.). Among them, halogen calcium phosphate: $3Ca_3(PO_4)_2(CaFCl/Sb, Mn$ (white), europium-activated barium magnesium aluminate: $BaMg_2Al_{16}O_{27}/Eu$ (blue), europium-activated strontium calcium barium chloroboro phosphate: $(Sr, Ca, Ba)_{10}(PO_4)_6Cl_2$-$nB_2O_3/Eu$ (blue), cerium, terbium-activated magnesium aluminate: $MgAl_{11}O_{19}/Ce$, Tb (green), cerium, terbium-activated lanthanum silicophosphate: $La_2O_3$-$0.2SiO_2$-$0.9P_2O_5/Ce$, Tb (green), and europium-activated yttrium oxide: $Y_2O_3/Eu$ (red) are widely used as fluorescent materials for fluorescent lamps. These fluorescent materials are described as fluorescent substance crystal/activator, and the activators determine the afterglow and other characteristics of the fluorescent materials depending upon their concentration in the fluorescent materials or their kind or their firing (synthesis) conditions in combination with the fluorescent substance crystals. Further, the techniques for accelerating and delaying the decay of fluorescent materials are disclosed in Japanese Patent Laid-open Nos. Hei 8-190894 and 11-144685, respectively.

Delaying of the brightness decay during the second period caused by the afterglow shown in FIG. 10 can be realized without using the special technique described in the above-described publications. Even if commercially available fluorescent lamps or cold-cathode tubes for a liquid crystal display device having coated on their inner wall the fluorescent materials as listed above are used as a light source, the advantages provided by the blink-lighting of the light source of the liquid crystal display device according to the present invention are not impaired as long as the time required for the afterglow to cease to exist is longer than 25 msec (the maximum allowable time during the second period for suppressing flicker of display images as explained above). In consideration of the fact that the intensity of the afterglow decays logarithmically with time, it is desired that the brightness after the passage of half the second period is selected to be at least 10% of the brightness at the start of the second period.

The following explains the reason why the above-described result of (5) is obtained by the blink-lighting of the light source of the liquid crystal display device according to the present invention with reference to FIGS. 16(a) to 16(d).

Figure 16A:
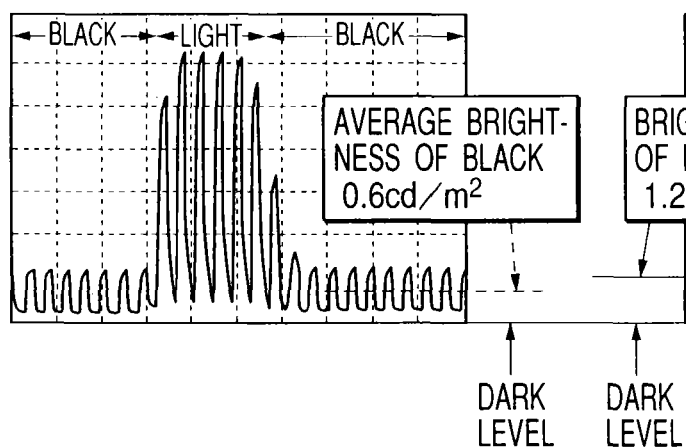
FIGS. 16(a), 16(b), 16(c) and 16(d) are graphs, respectively, for explaining the changes in screen brightness of a liquid crystal display device when the blink-lighting of the present invention is combined with a driving scheme preferable for moving picture displaying, the changes in screen brightness of a liquid crystal display device when the continuous lighting is combined with the driving scheme suitable for moving picture displaying, the contrast ratio (CR) of moving picture display by a conventional liquid crystal display device and the contrast ratio of a display image by the liquid crystal display device according to the present invention.
Figure 16B:
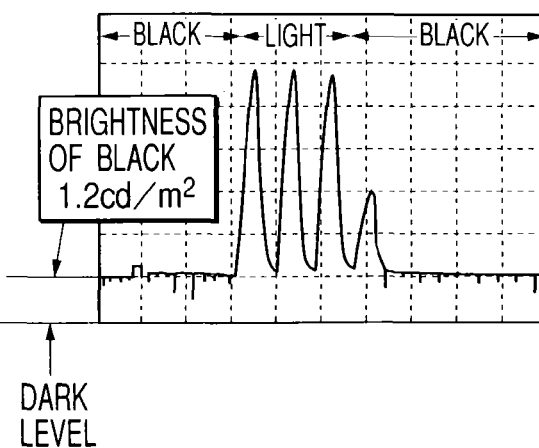

FIGS. 16(a) and 16(b) show the measurement results of brightness waveforms in the blink-lighting of the light source in accordance with the present invention and the continuous lighting of the light source, respectively, using a driving method of the liquid crystal display device proposed by the present inventors and described in Japanese Patent Application No. Hei 11-282641 (corresponding U.S. patent application Ser. No. 09/658,989), respectively. The descriptions of black and light shown at the top of FIGS. 16(a) and 16(b) indicate periods during which the screen of a liquid crystal display element is displaying a black image and periods during which the screen is displaying a light image (a darker image than a white image) with the abscissa representing time, respectively, and display timing in FIG. 16(a) is approximately the same as that of FIG. 16(b). In the driving of the liquid crystal display device, the light transmittance in the light-image displaying operation (including the white-image displaying operation) of pixels is modulated in a saw-tooth wave fashion with respect to the time axis. Therefore, variation in brightness between lightness and darkness appears also at the time of displaying a white image in the continuous lighting of the light source in FIG. 16(b). Such a video image signal waveform in the light-image displaying is effective particularly for displaying a moving object without producing the afterimage on its locus in the display of a moving picture.

By comparing brightnesses at the time of a black-image displaying in FIGS. 16(a) and 16(b), it is apparent that the average brightness of FIG. 16(a) is half that of FIG. 16(b). Even if a video signal for a black display is given to a pixel of the liquid crystal display element, a small of light leaks through the pixel as long as the light source is lit. Therefore, the brightness waveform of FIG. 16(b) floats by 1.2 cd/m² from a dark level corresponding to a theoretical zero brightness level during a period for a black display. On the other hand, the brightness waveform of FIG. 16(a) floats by 1.2 cd/m² from the dark level during the first period, but exhibits brightness considerably near the dark level during the second period. Since the measured brightness values during the second period are also affected by the dark current of the measuring device, they are practically almost at the dark level. Accordingly, the integral of brightness over the repeating period of the blink-lighting of the light source according to the present invention in FIG. 16(a) was 0.6 cd/m² (average brightness). It is thought that the blink-lighting of the light source according to the prevent invention is capable of suppressing the brightness of the black image display as above because the afterglow produced during the second period is almost extinguished by limiting the light transmission of pixels.

Figure 16C:
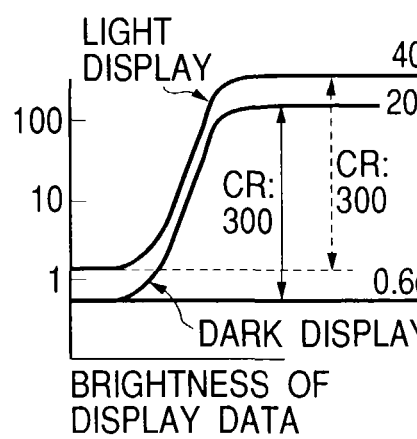
Figure 16D:
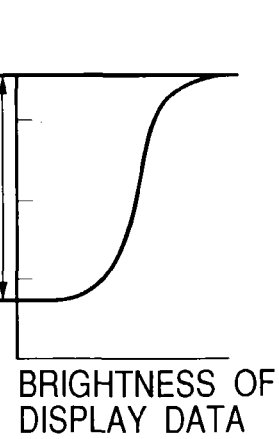

The effects of increasing the contrast ratio CR of the display image obtained by the blink-lighting of the light source according to the present invention based upon the above results (4) and (5) are summarized as in FIG. 16(d). On the other hand, FIG. 16(c) shows the characteristics of the contrast ratio CR in the art described in the NIKKEI Electronics (Nov. 11, 1999) mentioned above. As is apparent from comparison between FIGS. 16(d) and 16(c), in the present invention, a difference between the maximum and minimum values of brightness within a frame of an image display can be increased, and consequently, even a still image can be displayed with the contrast ratio of 600:1 or more. In other words, in the liquid crystal display device, the blink-lighting of its light source according to the present invention is capable of suppressing the brightness of pixels intended for displaying the darkest (black) level or the level (dark-gray) near to it, to a level lower than the level obtained with the conventional technique, and consequently, is capable of reproducing a sharp image of the cathode ray tube level quality without making the display screen whitish.

As described above, it is apparent that the blink-lighting of the light source of the liquid crystal display device according to the present invention on the basis of the above-described results of (4) and (5) obtained experimentally by the present inventors achieves the object of the present invention mentioned already and other objects by the proper selection of the duty ratio and the lamp current. Further, while the aforementioned explanation is based on the examples using the fluorescent lamp as a light source, even if the light source is replaced by a tube exhibiting the desired afterglow characteristics such as a xenon lamp, similar operation is exhibited and similar advantages can be obtained.

These experimental results and studies are summarized as follows.

In preferable setting ranges of the first period $\Delta t_I$, the second period $\Delta t_{II}$, and the sum of the first period $\Delta t_I$ and the second period $\Delta t_{II}$ serving as the repeating period in the blink-lighting of the light source of the liquid crystal display device according to the present invention, their upper limit are determined in consideration of prevention of flicker in the display screen (the blink-lighting period ($\Delta t_I + \Delta t_{II}$)) and prevention of overheating of the display screen (the length of the second period $\Delta t_{II}$), and their lower limit are determined in consideration of the speed of rise of luminescence (discharge) in the light source (the first period $\Delta t_I$) and suppression of overheating of the light source (the second period $\Delta t_{II}$).

The first period $\Delta t_I$ can be lengthened as long as the temperature of the light source does not reach a value that lowers its brightness, but it is preferable to limit the first period to less than 25 msec in consideration of suppressing flicker of the display screen. Further, it is advantageous to set the first period $\Delta t_I$ to 20 msec or less, preferably 15 msec or less for maximizing the brightness of the light source which serves as the initial brightness of afterglow during the succeeding second period $\Delta t_{II}$ and at the same time suppressing overheating of the light source during the first period $\Delta t_I$.

The second period $\Delta t_{II}$ can be lengthened as long as the afterglow of the light source continues to maintain the specified intensity level, but it is preferable to limit the first period to less than 25 msec in consideration of the same reason as for the first period $\Delta t_I$. Further, it is advantageous to set the second period $\Delta t_{II}$ to 10 msec or less, for example, in consideration of the speed of rise of luminescence of the light source during the succeeding first period $\Delta t_I$ which is included in the succeeding repeating period ($\Delta t_I + \Delta t_{II}$), because the lighting of the light source can be started without supplying a high discharge-starting voltage to the light source when an interval between the two successive first periods $\Delta t_I$ is short. The second period $\Delta t_{II}$ can be shortened to a length of time in a range in which the temperature rise of the light source does not cause reduction in its brightness, but it is advantageous to select the second period $\Delta t_{II}$ to be at least 1 msec, for example, preferably at least 2 msec for making the most of the advantage provided by the afterglow.

Further, it is preferable to allot to the first period $\Delta t_I$ a sufficient length of time for the brightness of the light source to reach a specified level after the supply of the lamp current is started again which has been ceased during the preceding second period $\Delta t_{II}$ included in the preceding repeating period ($\Delta t_I + \Delta t_{II}$), and it is advantageous to select the first period $\Delta t_I$ to be 1 msec or more, for example, preferably 2 msec or more.

The above specific time division between the first period $\Delta t_I$ and the second period $\Delta t_{II}$ are based on the knowledge of the fluorescent lamps (for example, cold-cathode tubes or xenon lamps) widely used for the liquid crystal display devices, and these conditions also satisfy the relationship "Microscopic electric power (energy) consumption $P_1$<macroscopic power (energy) consumption $P_2$" during the blink-lighting period already described in Section "Control circuit of a light source". However, if the temperature characteristics or the afterglow characteristics are different, they may be modified suitably according to the characteristics.

The afterglow of the light source can cease within a length of time of the order of the pulse width of an AC current for lighting the light source, depending upon characteristics of the fluorescent material coated on the inner wall of the light source, but in this case, when the second period $\Delta t_{II}$ is selected to be sufficient for lowering the temperature of the light source, the brightness of the light source remains at the dark level during a remaining portion of the second period $\Delta t_{II}$ after ceasing of the afterglow, and consequently, the maximum brightness and the contrast ratio of the displayed image are reduced.

Accordingly, when a light source is used which emits visible light (white; red, green, blue or a combination of them) using fluorescent materials, it is preferable to use a fluorescent material capable of generating afterglow lasting for at least a certain period of time (for example, 25 msec as described above). It is preferable that the intensity of the afterglow falls to 50% or less of its intensity at the end of the first period (i.e., at the start of the second period) during the second period (during a length of time from the end of the first period to the start of the succeeding first period) for suppressing the brightness of black-image-displaying pixels. Particularly in the liquid crystal display device according to the present invention, it is recommended that, for further enhancing the contrast ratio of the display image, the kind of the fluorescent lamp incorporated in the liquid crystal display device or fluorescent materials coated on the inner wall thereof is selected such that the intensity of the afterglow at the end of the second period becomes not more than 10% of the intensity at the start of the second period.

Further, in a waveform of the lamp current (the AC current produced in the secondary side circuit of FIG. 1) of the liquid crystal display device according to the present invention, plural current waves each corresponding to one cycle of the frequency of the AC current, for example, each current wave exhibiting a maximal value and a minimal value during one period of 25 μsec (microsecond corresponding to $10^{-6}$ sec) intervals (at 40 kHz) between the adjacent current peaks along the time axis, for example, appears repeatedly during each of the first period $\Delta t_I$ and the second period $\Delta t_{II}$. Further, even in a case where the AC current is not generated in the secondary side circuit during the second period $\Delta t_{II}$, each of the second period $\Delta t_{II}$ period lasts for a length of time corresponding to a plurality of the above-mentioned cycles.

In other word, the sum of the first period $\Delta t_I$ and the second period $\Delta t_I$ forming one period of blink-lighting of the light source of the liquid crystal display device according to the present invention is always larger than time obtained as the reciprocal number of the frequency of an AC current for continuously lighting the light source, and this fact reflects a difference in technical concept between the blink-lighting of the light source according to the present invention and that disclosed in Japanese Patent Laid-open No. Hei 9-266078 (laid-open on Oct. 7, 1997).

The blink-lighting of the light source of the liquid crystal display device according to the present invention not only enhances the contrast ratio of the display image, but also suppresses overheating of the light source and optical elements disposed around it by controlling the lamp current in the secondary side circuit of the light source control circuit and suppresses the power consumption in the light source, and consequently the present invention provides the following advantages.

In the side-light type liquid crystal display device explained in connection with FIGS. 2(a) and 2(b), the temperature rise of the light source forms a non-uniform temperature distribution in the display screen of the liquid crystal display element. In the liquid crystal display device of this kind, the liquid crystal display element (panel PNL) is assembled together with the light source unit by a frame-like housing, but it is easily influenced by heat from the light source transmitted through the housing. In the case of the side-light type liquid crystal display device shown in FIG. 2(a), the surface temperature of a pair of substrates 3 constituting a liquid crystal display element rises to approximately 50° C. at its portions (opposite ends of the substrates 3) closest to the fluorescent lamp, but at a portion remotest from the fluorescent lamps 8 (a center of the substrates 3), the temperatures remains at about 40° C. On the other hand, the light transmittance of the liquid crystal layer 2 varies by 2 to 3% for a temperature difference of 5° C. and varies by 5% for a temperature difference of 10° C. Therefore, when the liquid crystal display element displays a black image over its entire screen area, non-uniformity in display occurs in the screen due to the difference of the light transmission.

When the blink-lighting of the light source according to the present invention is employed for the liquid crystal display device, the temperature rise of the light source can be suppressed, therefore the temperature difference between the portions nearest to the fluorescent lamp 8 and the portion remotest therefrom can be suppressed to less than 5° C., and as a result the problem of the non-uniform display can be solved. For non-uniformity of brightness of the display screen due to difference of by the light transmission, a brightness difference not less than 5% is perceived by almost all users, and a brightness difference suppressed to not more than 3% is not objectionable to many users. Accordingly, the duty ratio and the lamp current during the first period of the blink-lighting of the light source according to the present invention can be adjusted by measuring the temperature distribution in the screen of the liquid crystal display element by using a thermography or the like.

Figure 17A:
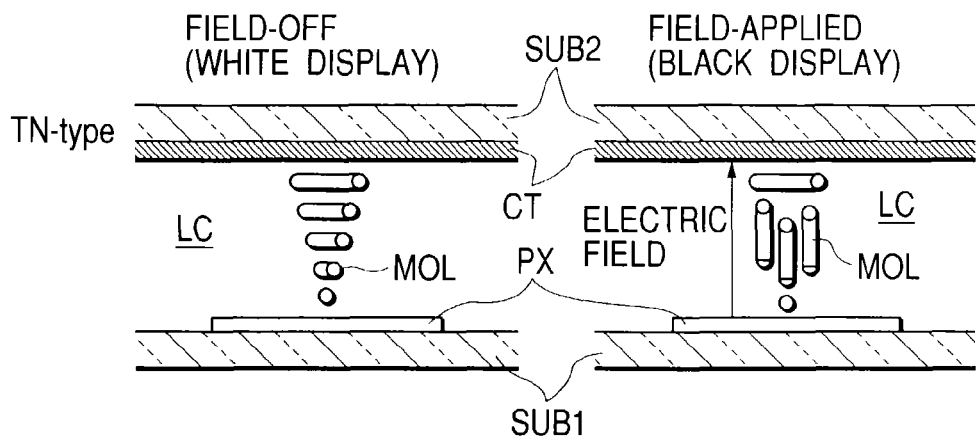
FIGS. 17(a), 17(b), and 17(c) are schematic cross-sectional views showing TN type, VA type and IPS type of an active-matrix type liquid crystal display device, respectively.
Figure 17B:
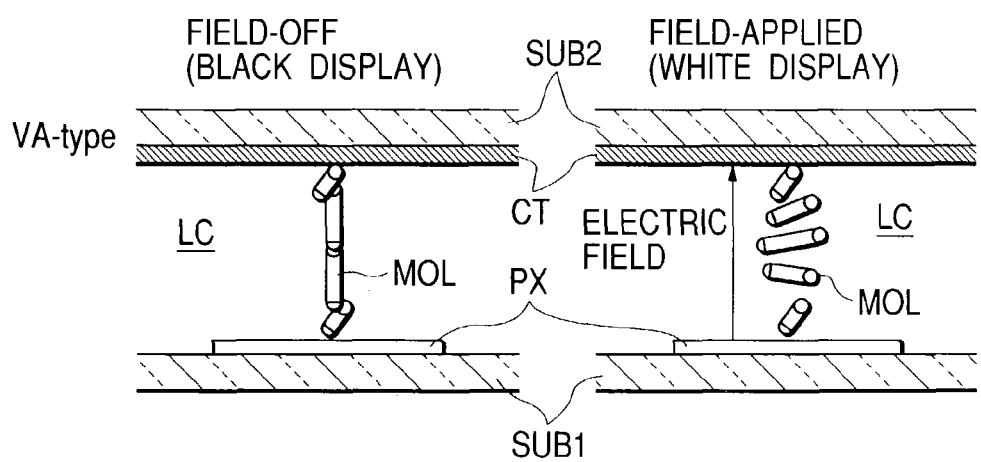
Figure 17C:
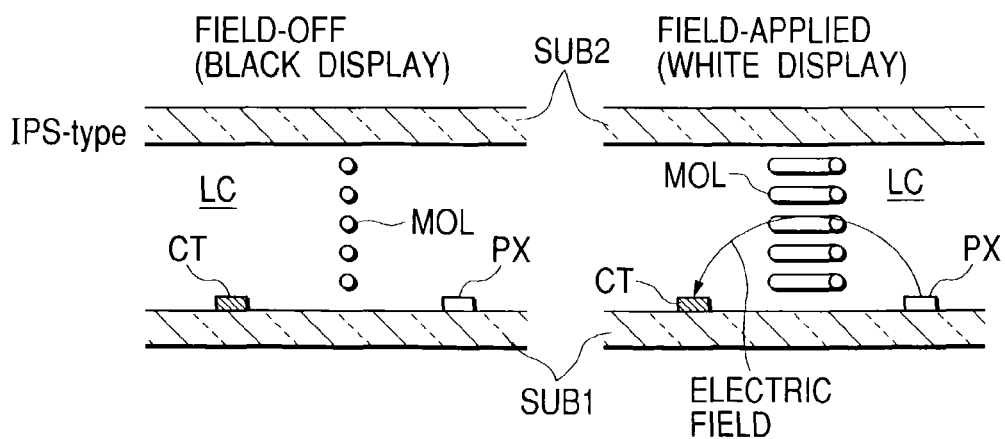

Further, as described previously, a transition temperature of a liquid crystal composition used in a liquid crystal display element differs depending on the kind of its liquid crystal display element. FIGS. 17(a), 17(b) and 17(c) show schematically a pixel of the twisted nematic type (TN type), a pixel of the vertical oriented type (VA) type, and a pixel of the in-lane switching type (IPS type), respectively, of the active matrix type liquid crystal display elements, and the transition temperatures of the liquid crystal compositions used are lower in the order from FIGS. 17(a) to 17(c). Accordingly, the IPS type liquid crystal display element easily deteriorates in the image display performance due to the temperature rise of the display screen, and for example, and the aforementioned non-uniformity in display also tends to be pronounced. Since these three kinds of liquid crystal display devices are different from each other in the manner of orientation of liquid crystal molecules MOL in their liquid crystal layers LC, the configuration for producing electric fields for control of the orientation of the liquid crystal molecules MOL, and hence the kind of the liquid crystal compositions contained in the respective liquid crystal layers (such as difference in transition temperature and dielectric anisotropy). Further, a difference in direction of electric fields applied to a liquid crystal molecule appears as a difference of the arrangement of a pixel electrode PX and a counter electrode CT in the respective pixels. In the TN type of FIG. 17(a) and the VA type of FIG. 17(b), the pixel electrode PX and the counter electrode CT are disposed on one electrode SUB1 of a pair of substrates which sandwich the liquid crystal layer LC therebetween and the other electrode SUB2 of the pair of substrates, respectively, but in many of the IPS types of FIG. 17(c), both electrodes are provided on either one of a pair of substrates. Further, in the TN type of FIG. 17(a), one of the pixel electrode PX and the counter electrode CT is disposed to oppose the other of the two electrode PX, CT in parallel with the main surface of one of the pair of substrates within the same pixel, but in the VA type of FIG. 17(b), the two electrodes may be displaced from each other in parallel with the main surface, and in the IPS type of FIG. 17(c), both the electrodes have to be arranged in a predetermined spaced relationship in parallel with the major surface. Therefore, in an assembly of the liquid crystal display device, according to the kinds of the liquid crystal display elements used, particularly in the case of the VA type or the IPS type, the control circuit shown in FIG. 14 or FIG. 15, for example, may be provided for the blink-lighting of the light source in the light source unit according to the present invention.

Incidentally, the detailed explanation of the TN type liquid crystal display device is described in Japanese Patent Laid-open No. Hei 9-33951 (its corresponding U.S. Pat. No. 5,847,781), the detailed explanation of the VA type liquid crystal display device is described in Japanese Patent Laid-open No. 2000-122065, and the detailed explanation of the IPS type liquid crystal display device is described in Japanese Patent Laid-open Nos. Hei 8-254712 and 9-15650 (their corresponding U.S. Pat. No. 5,754,266).

<<Embodiment 1 in Moving Picture Display>>

The following explains an embodiment for displaying a moving picture (a dynamic image) on a display screen employing the blink-lighting of a light source for the liquid crystal display device according to the present invention.

For the liquid crystal display device intended for the moving picture display in which the rewriting period of its display data signal (16.7 msec at 60 Hz, or 8.4 msec at 120 Hz), it is preferable to prepare the liquid crystal composition (liquid crystal layer) used for the liquid crystal display device such that the liquid crystal composition limits its response time to a value smaller than the rewriting period of its display data signal (16.7 msec or 8.4 msec). However, when the response speed of the liquid crystal material is considerably slow as compared with the aforesaid rewriting period, a ghostphenomenon (multiple spurious contours) occurs. Therefore, it is preferable not to synchronize occurrence of each of the rewriting period of data signal with that of the period consisting of intensity-increasing time and intensity-decreasing time of the light from the light source (the above-described operating period of the light source). The advantages obtained by this technique are remarkable, in particular, when the repeating period of the aforesaid blink-lighting of the light source is selected to be not more than the rewriting period of data signal. Accordingly, the repeating period consisting of the first period $\Delta t_I$ and the second period $\Delta t_{II}$ of FIGS. 11(a)–11(d) and the rewriting period of the display image signal (a syn signal Vsync indicated in FIG. 11(a)) are made different from each other by providing a predetermined phase difference between the two periods, for example.

Figure 18A:
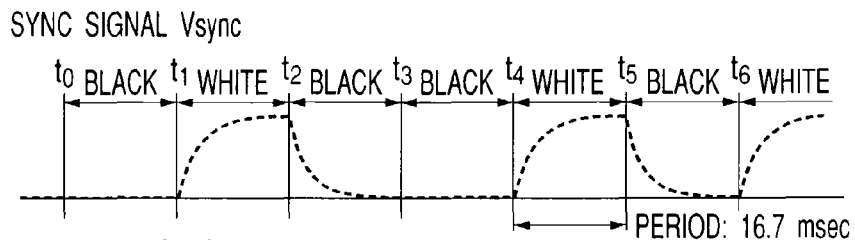
FIG. 18(a) illustrates a waveform (dotted line) of an image signal input synchronized with a sync signal into a pixel of the liquid crystal display device in Embodiment 1 where blink-lighting of a light source of a liquid crystal display device according to the present invention is applied to moving picture display.
Figure 18B:
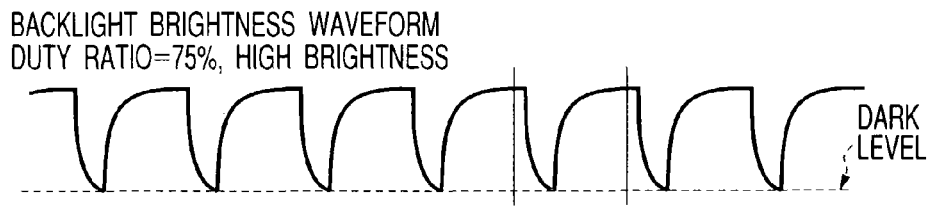
FIGS. 18(b) to 18(e) illustrate brightness waveforms (the abscissa of the dotted line corresponds to a dark level) of the light source corresponding to the image signal using the same time axis (abscissa) as in FIG. 18(a)
Figure 18C:
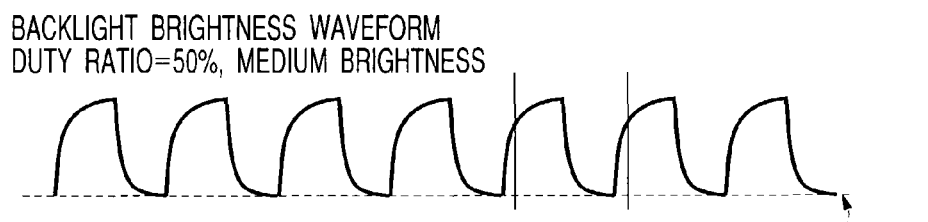
Figure 18D:
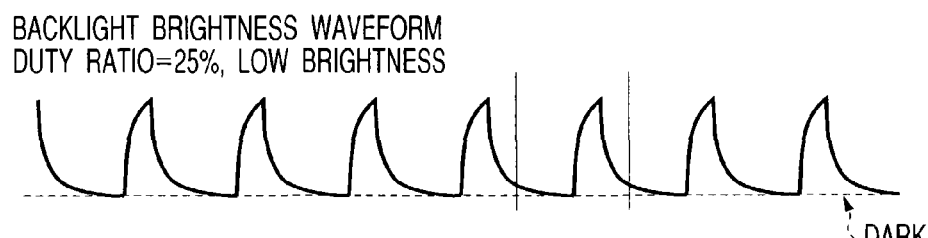
Figure 18E:
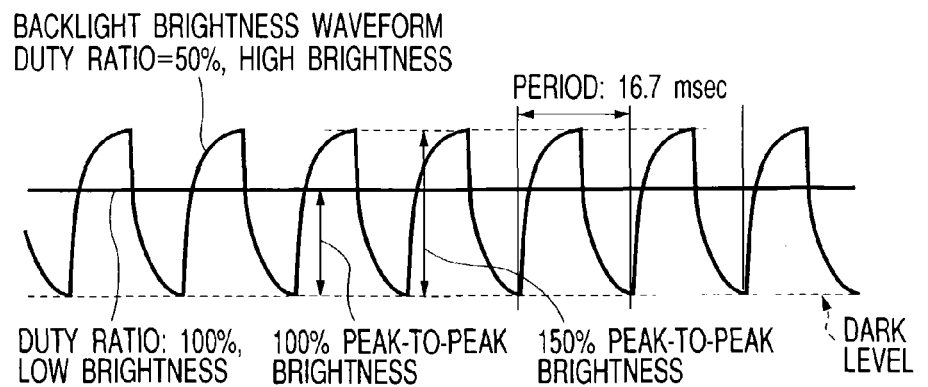

FIGS. 18(a) to 18(e) illustrate an embodiment of the moving-picture displaying operation by the liquid crystal display device employing the blink-lighting of the light source of the liquid crystal display device according to the present invention. FIG. 18(a) shows a waveform of an image signal inputted to one pixel of the liquid crystal display element in synchronism with the synch signal Vsync, FIG. 18(b) shows a brightness waveform of the light source (a backlight) lit with the duty ratio of 75% (high brightness), FIG. 18(c) shows a brightness waveform of the light source lit with the duty ratio of 50% (medium brightness), and FIG. 18(d) shows a brightness waveform of the light source lit with the duty ratio of 25% (low brightness), with FIG. 18(b) to FIG. 18(e) illustrating brightness waveforms of the light source using the same time axis (abscissa) as in FIG. 18(a). The pixel is supplied with image signals at times $t_0$, $t_1$, $t_2$, . . . , $t_6$ synchronized with the sync signals, all the brightness waveforms of the light source have the repeating period as that of the sync signals, but they are out of phase with the sync signals. When light control is carried out by adjusting the time division between a lighting period (the first period) and a light-ceasing period (the second period) of the specified blink-lighting period, it is also possible to allot all the aforesaid blink lighting period to only one of the lighting period and the light-ceasing period. If all the blink-lighting period are allotted to the lighting period, the light source is continuously lit, and on the other hand, if all the blink-lighting period is allotted to the light-ceasing period, the light source produces a so-called screen-saving (dark-image-displaying) state where the light source does not illuminate the liquid crystal panel. However, inclusion of the light-ceasing period in this blink-lighting period not only reduce power (energy) consumption by the light source, but also improves luminous efficacy of the light source to be improved. In addition, as shown in FIG. 18(e), the light source can be blink-lit to produce high brightness by increasing the peak-to-peak value of the brightness during the lighting period without changing the duty ratio.

Referring now to FIGS. 2(a) to 2(c), one example of such a liquid crystal display device used for displaying a moving picture will be described. In the present embodiment, the side light type liquid crystal display device shown in FIG. 2(a) is formed of a pair of glass substrates 3 of 0.7 mm in thickness, a plurality of pixels disposed on one of the glass substrates, and a plurality of thin film transistors disposed at each of the pixels for TFT driving. The liquid crystal layer 2 sandwiched between the pair of substrates 3 is such that its dielectric anisotropy $\Delta\epsilon$ is positive and $\Delta n \cdot d$ is 0.41 µm, where d is a thickness of the liquid crystal layer. Here the twist angle of liquid crystal molecules of the liquid crystal layer 2 is 90°, but it is desirable to adopt a low twist angle such as 70° for increasing a response speed of the liquid crystal. When the twist angle is decreased, it is necessary to reduce the cell gap d so as to provide a smaller $\Delta n \cdot d$ value (0.35 µm, for example) suitable for the smaller twist angle.

The light source unit 10 used in the present embodiment is provided with two fluorescent lamps (cold-cathode tubes) 8 of 4 mm in outer diameter arranged along the long sides of a light guide 11, one at each side, as shown in a perspective view of FIG. 2(b).

In the present preferred embodiment, the control circuit CTRL for the light source having a configuration as illustrated in FIG. 1 is operated to supply the first current of 10 mA (an effective value) during the aforesaid lighting period (the first period) in the secondary side and the second current of 0 mA during the aforesaid light-ceasing period (the second period) to the fluorescent lamps 8 while the duty ratio is adjusted. The surface temperature of the fluorescent lamp 8 rose with time as shown in FIG. 13(a). On the other hand, first the brightness increased with time as shown in FIG. 13(a), then it decayed slightly temporarily, and soon became stable. A temporary decay in brightness decreases with decreasing duty ratio, but all the decays in brightness appearing in the moving pictures remained at levels negligible human perception.

In this way, when the duty ratio is set to be not more than 50%, temperature rise at the central part of the fluorescent lamp 8 is restricted to 70° C. or less and a difference between the maximum and the minimum of the brightness in the display region (an effective display region) in the liquid crystal display element (the liquid crystal display panel) becomes 20% or more of its average value. In addition, even if the duty ratio is restricted 50% or less, it is possible to obtain the maximum brightness of 200 cd/m² or more and limit the minimum of the brightness to 2 cd/m² or less.

The outer diameter of the fluorescent lamp 8 used in the light source unit is usually about 2 mm, it is also possible to use a type of the outer diameter of 2.6 mm having its outer diameter and its inner diameter increased, a type of the outer diameter of 3 mm having a wall thickness of the glass tube increased, and a type of the diameter of 4 mm or more having its inner diameter increased and having an increased amount of gas and/or mercury. In general, if the diameter of the lamp is increased, the area of its surface is increased, and therefor this increased lamp diameter is advantageous for radiation of heat. Further, the increasing of the outer diameter of the fluorescent lamp provides some advantages of lowering its turn-on voltage and thereby lengthening its lamp life (the half-life period of brightness).

When a cold-cathode tube (a fluorescent lamp) of 2 mm in outer diameter is used, the cold-cathode tube generates heat irrespective of its longitudinal length if it is supplied with a lamp current not less than 6 mA, and thereby reduces its luminous efficacy (brightness). On the other hand, in the case of the fluorescent lamp 8 of 2.5 mm in outer diameter the adverse effects of the generated heat was suppressed, therefore efficiency of discharge within the fluorescent lamp by supply of current is increased, and consequently, a sufficient brightness can be attained even if the duty ratio is limited to 50%. These advantage can be obtained by increasing the outer diameter of the cold-cathode tube to 2.5 mm or more, for example, 2.6 mm, 3.0 mm or 4.1 mm.

When the light control device shown in FIG. 14 is assembled into the liquid crystal display device of the present, the ratio of the first period (the lighting period) or the second period (the light-ceasing period) to the operating period of the light source, the electrical power (energy) supplied for lighting of the lamp of the light source, or a combination of the above-mentioned ratio and the above-mentioned electrical power are varied.

Figure 19:
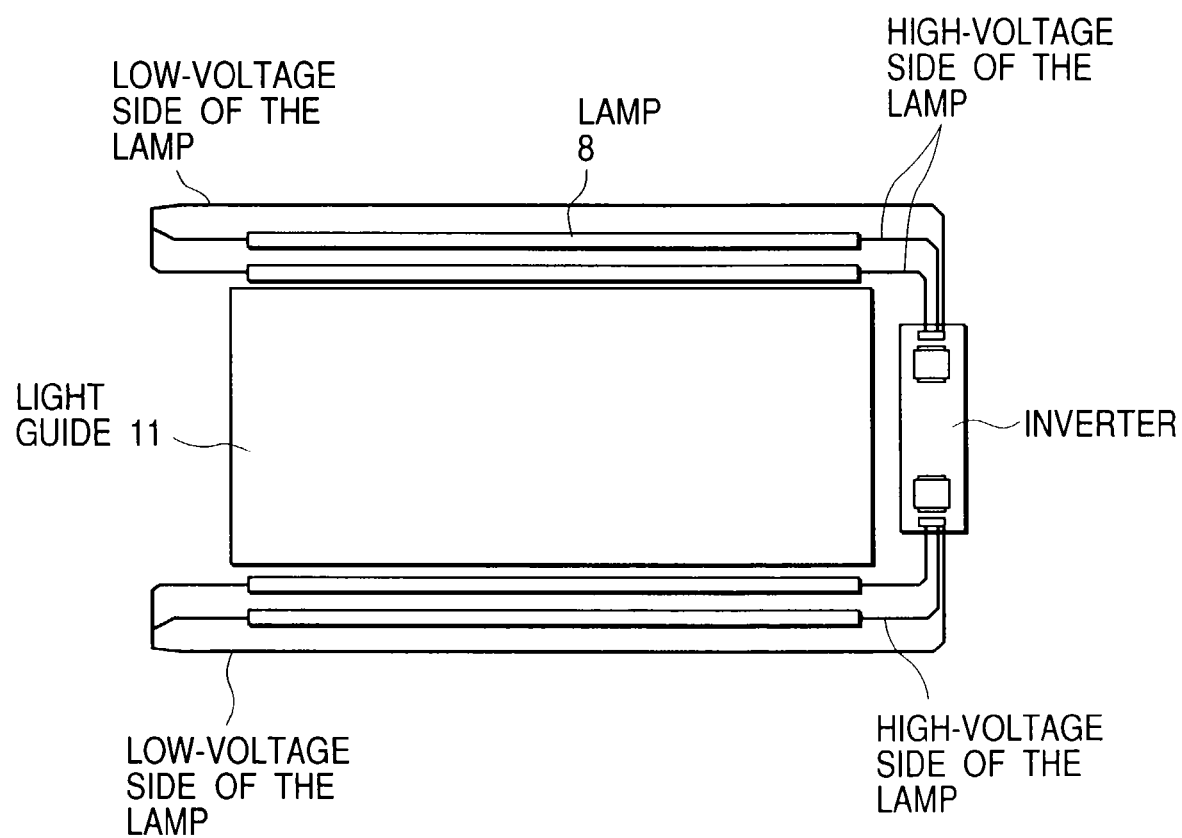
FIG. 19 is a plan view showing an inverter circuit of a light source unit having the layout of FIG. 2(c) and one example of a circuit configuration of light sources.

In addition, as the liquid crystal display device shown in FIG. 2, an IPS type liquid crystal display element can be used in which the liquid crystal layer 2 provides the value $\Delta n \cdot d$ of 0.28 μm, the liquid crystal molecules are oriented in parallel to each other with a twist angle of 0°, and electrical fields are applied in parallel with the major surfaces of the substrate. FIG. 2(c) is a perspective view of the light source unit 10 which is useful for combination with such a liquid crystal display element. Since the aperture ratio of pixels in the IPS type liquid crystal display element is smaller as compared with that of the TN type or the VA type, this IPS type liquid crystal display element uses the side edge type light source unit 10 having four cold-cathode tubes of 4 mm in outer diameter, two on each of the long sides of the light guide 11. An inverter arrangement is shown in FIG. 19 in which two of the fluorescent lamps 8 are driven by each of the transformers.

<<Embodiment 2 in Moving Picture Display>>

This embodiment explains a modulated lighting of the light source suitable for the moving picture display.

Figure 20A:
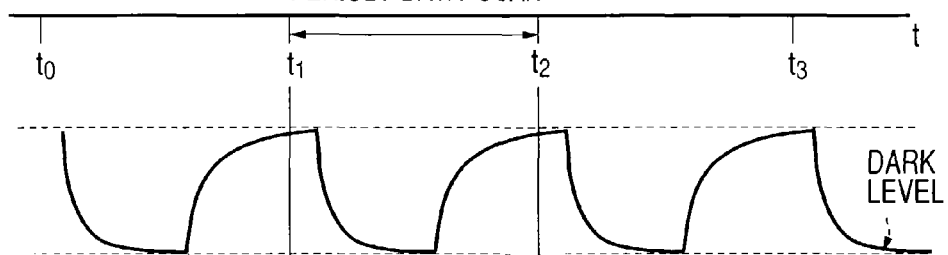
FIGS. 20(a) to 20(e) illustrate variations of brightness waveforms of the light source (the abscissa of the dotted line corresponds to a dark level) using the same time axis (abscissa), in Embodiment 2 where blink-lighting of a light source of a liquid crystal display device according to the present invention is applied to moving picture display.
Figure 20B:
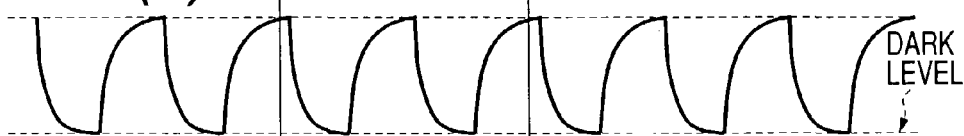
Figure 20C:

In order to attain moving-picture display characteristics equal to those of a cathode ray tube by the liquid crystal display device, it is possible to achieve the impulse-type light generation as in the case of a CRT by blink-lighting the backlight including the lighting period and light-ceasing period instead of lighting the backlight continuously. In this case, as indicated in the high brightness lighting in FIG. 20(a), the medium brightness lighting in FIG. 20(b) and the low brightness lighting in FIG. 20(c), the blinking period can be changed with respect to the specified data-rewriting period (the period of the sync signal Vsync).

In accordance with this embodiment, the impulse-type light generation approximately equal to that in the case of the CRT can be realized in the liquid crystal display device using the light source unit (the backlight system) and this makes possible displaying of moving pictures.

The efficiency of utilization of energy in the conventional backlight system for the liquid crystal display device was poor because the fluorescent lamp was lit continuously whether the display signals are intended for light images or dark images. On the other hand, by controlling the intensity of light from the backlight according to the content of information of the image display signal, the luminous efficacy of the fluorescent lamp was improved, and further, brightness was improved by saving in an electric power (energy) consumption and suppression of temperature rise of the lamp. In addition, in this embodiment, when the displayed image is dark, the amount of light from the backlight is reduced, and when the displayed image is bright, the amount of light from the back light is increased. At this time, a relationship between brightness and gray-scale characteristics, a so-called tone-curve characteristic is also controlled in according to brightness of-the background and image display signals.

Figure 20D:
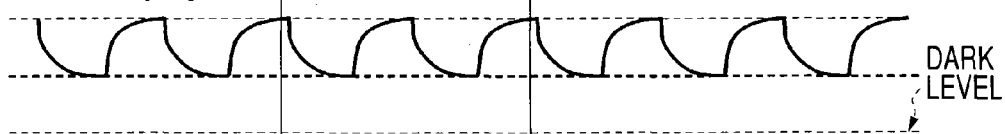
Figure 20E:
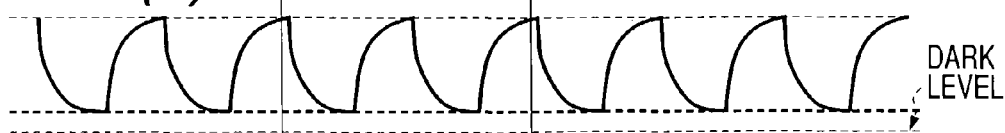

In this way, the amount of light from the backlight is controlled by varying a time ratio between the aforesaid first period (the lighting period) and the aforesaid second period (the light-ceasing period) according to information on brightness contained in the display signals. In addition, it is possible to display a more beautiful moving image by varying a time ratio between the lighting period and the light-ceasing period according to information on movement contained in the display signals, and thereby shortening the lighting time for the fast-moving images and lengthening the lighting time for the slow-moving images. At this time, it is preferable that an effective value of the current supplied to the lamp for lighting the light source during each of the blink-lighting periods is substantially kept constant irrespective of the time ratio between the lighting period and the light-ceasing period of the light source. Further, it is also possible to vary the amount of light from the light source by increasing an effective value of the current during the second period and thereby lighting the light source with a lower brightness than that during the first period, even during the second period. For example, in contrast with the low-brightness lighting shown in FIG. 20(c), without reducing the brightness of the light source to zero completely during the second period, the high-brightness lighting can be performed as shown in FIG. 20(d) or the medium-brightness lighting can be performed as shown in FIG. 20(e).

Further, in order to produce a more perfect moving picture display, it is necessary not only to employ the backlight system of the impulse light generation type, but also to synchronize the scanning of the image signal with the blinking of the light source as shown in FIGS. 11(a) to 11(d). In general, as signals for determining the scanning timing of the image signals in the active-matrix type liquid crystal display element, there are vertical sync signals, horizontal sync signals, dot clock signals, frame signals, and others, therefore these scanning periods and the blinking periods are adjusted to synchronize supplying of image data to the pixels with the scanning of the blink-lighting of the light source. It is desired in the present embodiment to utilize the light source unit having the direct-light type backlight, but, also in the light source unit having the side-edge type backlight, it is possible to divide an optical system, for example, a set comprised of the light sources and the light guide into an upper half and a lower half.

In the side-edge type backlight, the blinking period of the light source and the rewriting period of the display image signal may be selected to be equal to each other, and the starting time of lighting of the light source may be synchronized with the starting time of signal-scanning of a scanning signal line disposed in a range from a (0.3×n)th scanning line to a (0.7×n)th scanning line, a (0.5×n)th scanning line, for example, of n scanning, lines of the active matrix type liquid crystal display device incorporating the backlight, where n is the total number of the useful scanning signal lines for image displaying.

The "n scanning signal lines" will be explained by using specific examples for the standards specifying the degree of the image display definition by the liquid crystal display device. In the liquid crystal display device of the XGA class which displays images using 1,024 video signal lines (3×1,024 video signal lines in the case of the color image display) and 768 scanning signal lines, the number n is 768, and in the liquid crystal display device of the UXGA class which displays images using 1,600 video signal lines (3×1,600 video signal lines in the case of the color image display) and 1,200 scanning signal lines, the number n is 1,200.

In the active matrix type liquid crystal display panel, the video signal lines supplies data signals (or display data signals) to pixel electrodes disposed at the respective pixels via active matrix elements disposed at the respective pixels, and the scanning signal lines control transfer of the data signals at the active matrix elements. Because of the above functions, the video signal lines are also called the data signal lines. As the active matrix elements, thin film transistors are widely used which have source and drain electrodes serving to input or output data signals, respectively, and a gate electrode for switching on and off the transfer of the data signals between the source and drain electrodes, and therefore the video signal lines are also called the source signal lines or the drain signal lines, and the scanning signal lines are also called the gate signal lines.

In an example of the liquid crystal display device for the UXGA class color image display (n=1200), the (0.3×n)th scanning signal line corresponds to 360th scanning signal line and the (0.7×n)th scanning signal line corresponds to the 840th scanning signal line. Signal scanning of the scanning signal lines is started in sequence from the first scanning signal line toward the n-th (1200th in this example) scanning signal line. In this manner of signal scanning, if the starting time of lighting the aforesaid light source is synchronized with the starting time of the signal scanning of the 600th scanning signal line corresponding to the (0.5×n)th scanning signal line, writing of the image signal into a group of pixels positioned at the central part of the screen is synchronized with the blinking of the backlight, and consequently, the high-quality moving picture display is provided.

In the moving picture display, the blinking period of the light source may be made equal to the rewriting period of the display image signal, and at the same time a scanning timing of the first (n=1) scanning signal line (a signal line supplied with the scanning signal first during one frame period) among the number n of the scanning signal lines in the liquid crystal display device may be delayed by a specified time from the starting time of the blinking period of the light source.

On the other hand, it is preferable that the length of the above-described light-ceasing (OFF) period of the light source is selected to be at least ½₀ of that of the lighting (ON) period, and the integral of brightness over the light-ceasing (OFF) period is at most 90% of the integral of brightness over the lighting period for improving the contrast ratio of the moving picture display.

<<Structure of Liquid Crystal Display Device Used for Moving Image Display>>

More perfect and beautiful moving picture display is realized by improving the configuration of the liquid crystal display device itself, in a case where the blink-lighting of the light source of the liquid crystal display device according to the present invention is carried out by using the above-described techniques for the moving picture display. The liquid crystal display device comprises a liquid crystal display panel composed of a pair of opposing substrates at least one of which is provided with pixel electrodes and a liquid crystal layer sandwiched therebetween, a control means for supplying voltages corresponding to display image signals to the pixel electrodes, and a light source unit (a backlight system) for illuminating the liquid crystal display panel. The light source unit comprises a lamp (a light source), a reflector for reflecting light emitted from the lamp and a light guide for directing the reflected light toward the liquid crystal layer. The lamp is disposed along at least one of the four sides of the light guide. The light source is blink-lighted with a repeating period consisting of the lighting period and the light-ceasing period, and the amount of light illuminating the liquid crystal display panel is varied by selecting the time ratio between the lighting period and the light-ceasing period included in the blink-lighting period and selecting an electrical power (energy) for lighting the light source. The backlight system installed in this kind of liquid crystal display device is called the side-edge type, and at least one lamp (for example, a fluorescent lamp) are arranged in a thickness direction of the light guide. The positions of the lamps in the four sides of the light guide are determined based on the desired brightness of the display device and light transmission through the liquid crystal cell.

The TN (Twisted Nematic) type liquid crystal display device having a high light transmission is provided with one lamp along a long side of the light guide, and for obtaining of higher brightness, the TN type liquid crystal display device may be provided with one lamp along each of the two long sides of the light guide, or may be provided with one lamp along each of the two short sides of the light guide. The lamps can be of the L or U shape with a bend therein instead of the linear shape.

The IPS type liquid crystal display device having a low light transmission can be provided with two or three lamps along each of the two long side of the light guide.

The following explains another embodiment of the present invention. The liquid crystal display device comprises a liquid crystal display panel composed of a pair of opposing substrates at least one of which is provided with pixel electrodes and a liquid crystal layer sandwiched therebetween, a control means for supplying voltages corresponding to display image signals to the pixel electrodes, and a light source for illuminating the liquid crystal display panel. The light source comprises a plurality of lamps immediately under the useful display area of the liquid crystal display panel (disposed to face the useful display area) and a plurality of reflectors for reflecting light from each of the lamps, and the light source is blink-lighted with a repeating period consisting of the lighting period and the light-ceasing period, and the amount of light illuminating the liquid crystal display panel is varied by selecting the time ratio between the lighting period and the light-ceasing period included in the blink-lighting period and selecting an electrical power (energy) for lighting the light source. The backlight system installed in this kind of liquid crystal display device is called the direct-light type, and four to twelve lamps (fluorescent lamps, for example) are arranged in a direction of the long sides of the liquid crystal display panel, or four to twenty lamps are arranged in a direction of the short sides of the liquid crystal display panel, depending upon the brightness required of the liquid crystal display device and its display screen size.

Conventional lamps in the side-edge type backlight system have been disposed outside the useful display area of the liquid crystal display panel. This is because this arrangement prevents the liquid crystal cell from being heated by the heat of the lamp. The liquid crystal exhibits characteristics that its refractive index varies with temperature and thereby its light transmittance varies. Consequently, if the liquid crystal is locally heated, the transmittance, i.e., brightness is, locally changed, as a result a non-uniform display is produced. However, by applying the blink-lighting of the present invention to the backlight system and including the circuit for controlling this operation in the backlight system, heat generated by the backlight system is reduced and thereby non-uniformity in display is hardly produced in the liquid crystal display panel. In addition, the lamps in the backlight system can be disposed within the display area, and thereby a width (a frame border) of a peripheral frame surrounding the display screen of the liquid crystal display device is reduced.

A cold-cathode fluorescent lamp, a hot-cathode fluorescent lamp, a xenon lamp or a vacuum fluorescent display tube can be used as the lamp for the aforesaid backlight. Although the cold cathode fluorescent lamp has a feature in that it generates little heat, it is preferable to increase the diameter of the lamp diameter for the light source to at least 3 mm for effective prevention of heat generation (or effective radiation of heat) by increasing the area of the surface of the lamp. Further, increasing the glass thickness of the lamp of the light source to 1 mm or more and increasing its thermal specific gravity can provide a more effective thermal radiation. It is also possible to increase the diameter of the lamp of the light source and to replace the gas contained in the lamp with xenon.

A more concrete configuration of the liquid crystal display device according to the present invention will be illustrated based upon the aforesaid description.

Figure 21A:
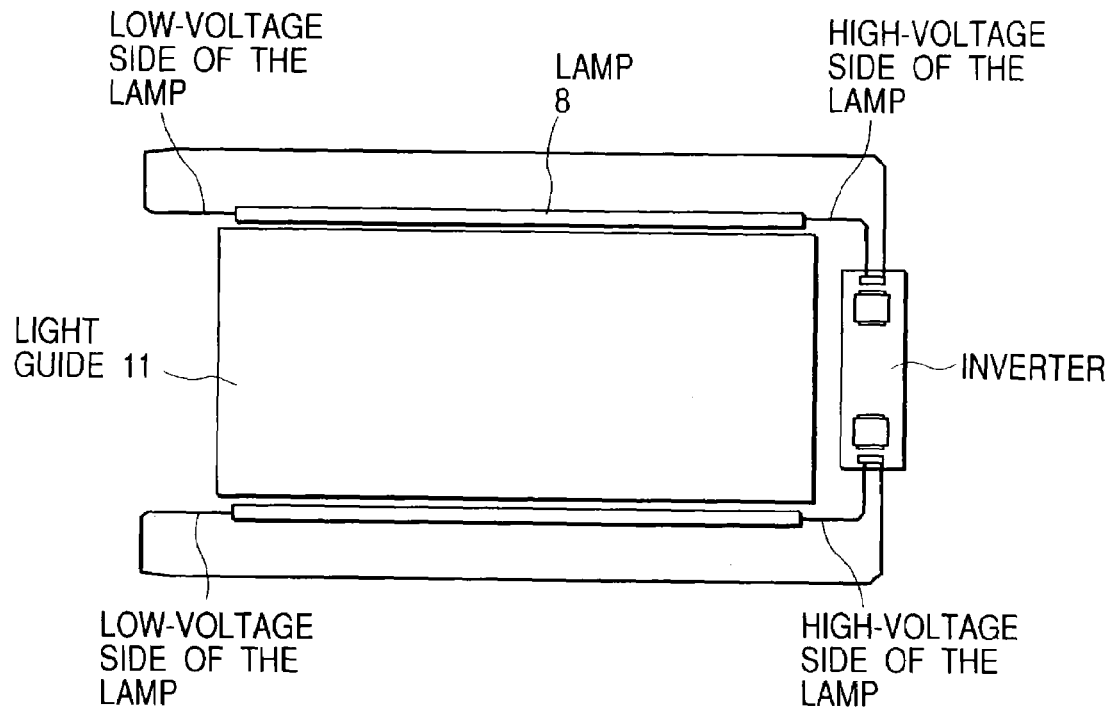
FIGS. 21(a) and 21(b) are plan views showing two examples of an inverter circuit of a light source unit and a circuit configuration of light sources suitable for a liquid crystal display device according to the present invention, respectively.
Figure 21B:
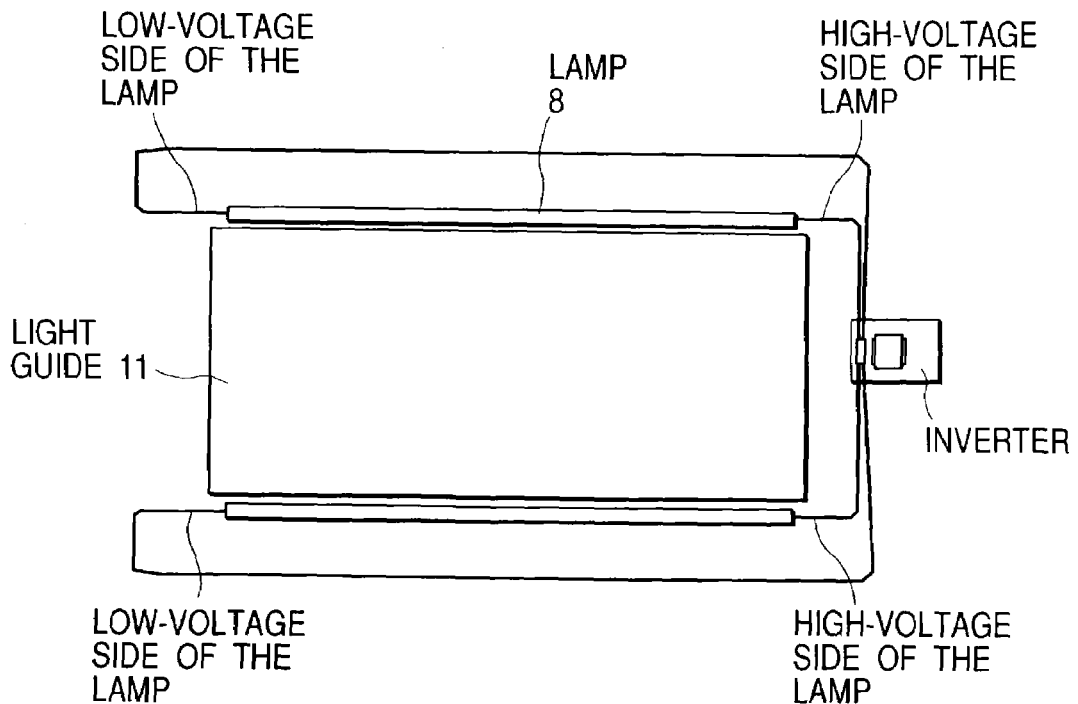

The backlight system (the light source unit) shown in FIG. 21(a) has an inverter arrangement in which one lamp is lit with one transformer, but the backlight system may be configured such that two lamps are lit with one transformer as shown in FIG. 21(b). In this case, some component parts such as a transformer and a ballast capacitor are used for two lamps in common, and therefore, the cost of the backlight system can be reduced by reducing of the number of component parts. The inverter used herein is a general term for circuits for lighting the lamp (its examples are illustrated in FIGS. 1 and 5), and includes a converter circuit for converting a DC voltage into an AC voltage, a current control circuit, a frequency modulation circuit and a voltage booster circuit using a transformer and the like. A piezoelectric element can be used instead of the transformer.

Figure 22A:
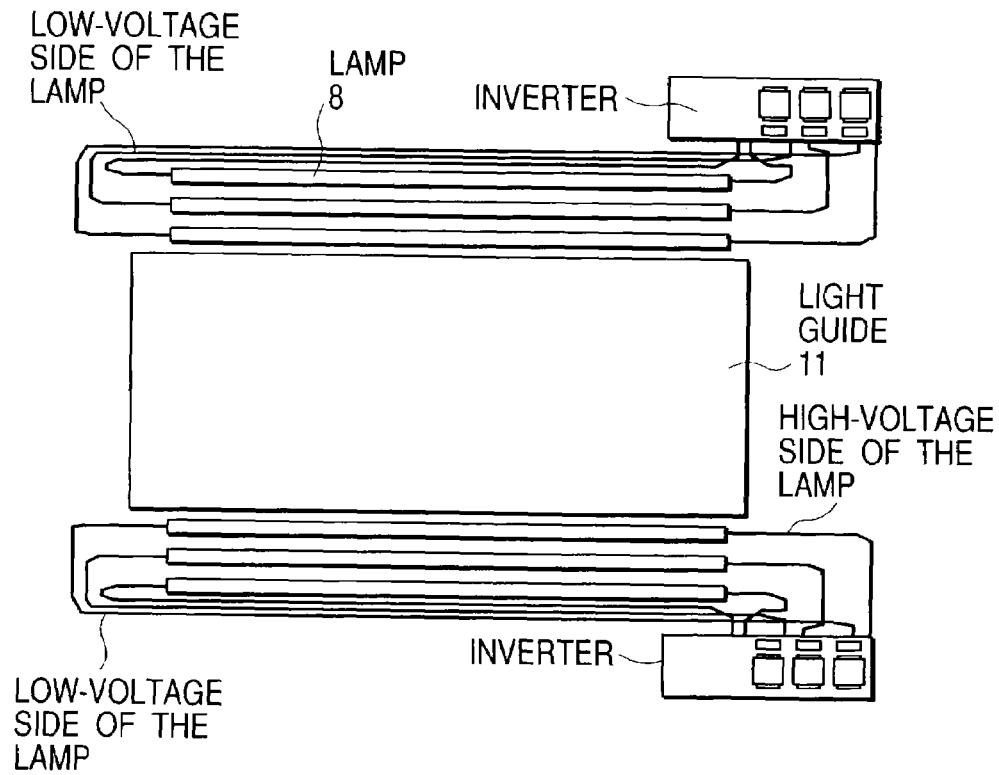
FIGS. 22(a) and 22(b) are plan views showing two examples of an inverter circuit of a light source unit and a further circuit configuration of light sources suitable for a liquid crystal display device according to the present invention, respectively.
Figure 22B:
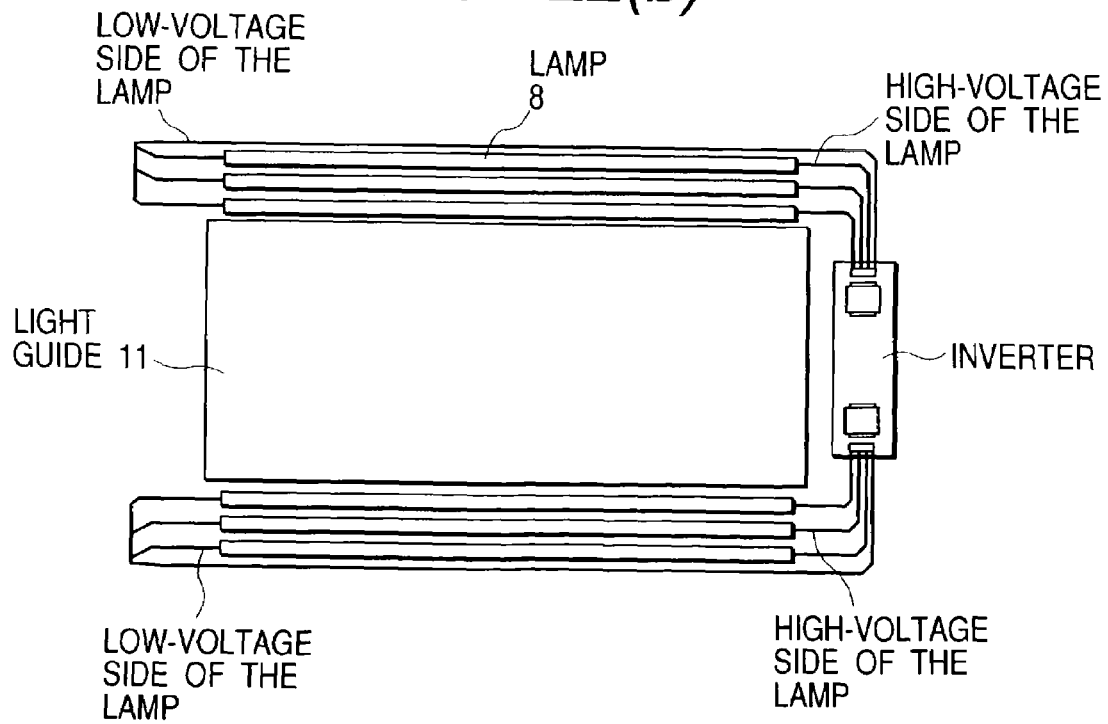

FIG. 22(a) is a plan view of the light source unit for the liquid crystal display device in which three fluorescent lamps 8 are disposed at each of the long sides of the light guide 11. Although a separate inverter is used for each of the lamps in the light source unit, if the output of the inverter is high, the same inverter can be connected to a plurality of lamps as shown in FIG. 22(b). This type of light source unit is effective when the transmission in the display mode of the liquid crystal is low or when higher brightness is required.

Figure 23A:
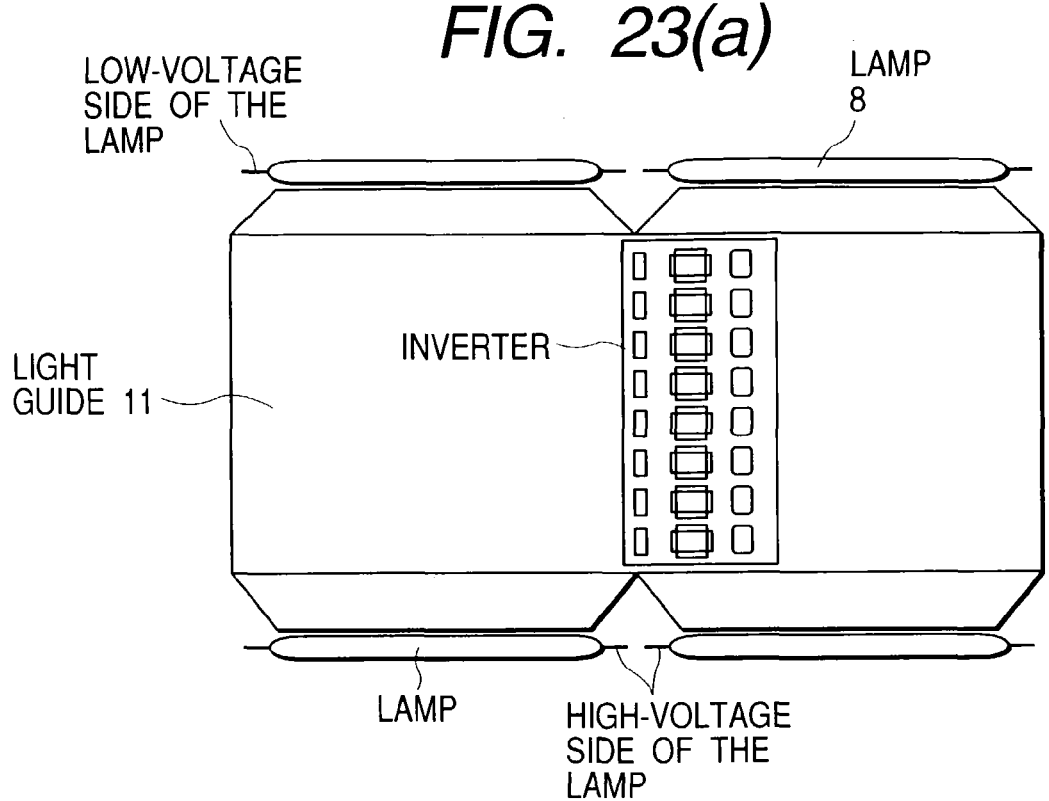
FIGS. 23(a) and 23(b) are plan views showing two examples of an inverter circuit of a light source unit and another circuit configuration of light sources suitable for a liquid crystal display device according to the present invention.
Figure 23B:
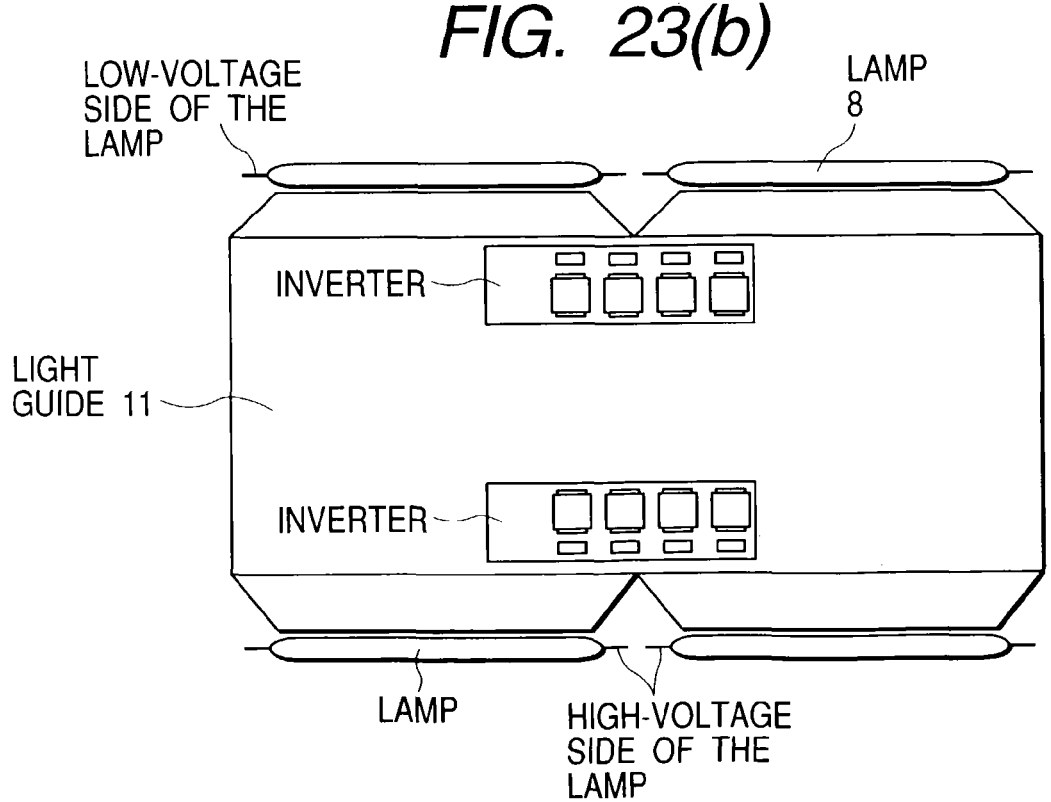

Further, as shown in FIGS. 23(a) and 23(b), four to eight fluorescent lamps may be disposed at each of the long sides of the light guide 11. In these cases, a plurality of fluorescent lamps disposed at the same side of the light guide are arranged in line along one side of the light guide in such a way that their high-voltage side terminals face each other about the middle of the one side of the light guide, and the inverter is disposed at the rear (the surface opposite from the liquid crystal display panel) of the central part of the light guide.

Figure 24:
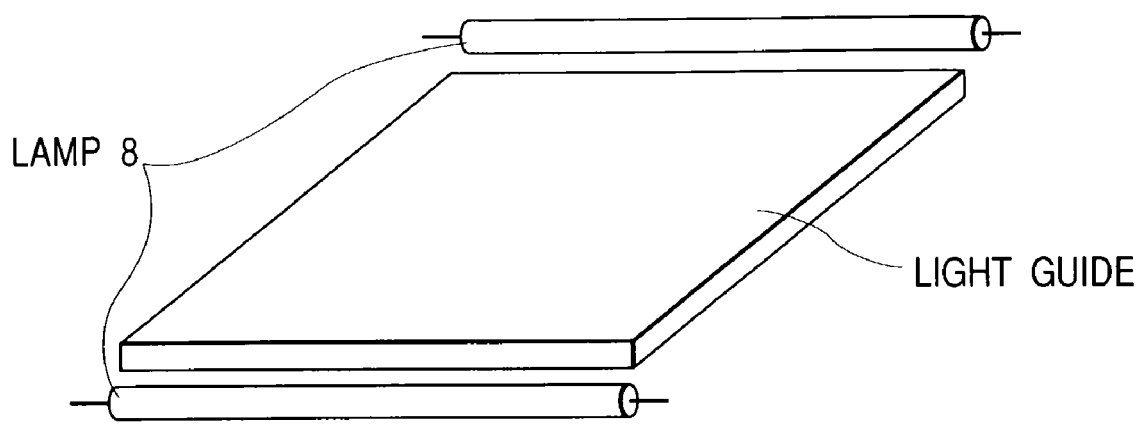
FIG. 24 is a perspective view showing, in connection with a light source unit of a side-edge type incorporated into a liquid crystal display device according to the present invention, one example of a layout in which light sources are arranged at the short sides of a light guide.

FIG. 24 shows a side-edge type light source unit in which one fluorescent tubes 8 is disposed at each of the short sides of the light guide 11. In this case, although two separate inverters are used for the top and bottom side lamps, respectively, the one inverter may be used for the two lamps in common. This arrangement is preferable for the large-sized liquid crystal display device and in particular is suitable for an apparatus having a liquid crystal display panel with its pixels having a high aperture ratio such as the TN type or VA type liquid crystal display panel.

Figure 25:
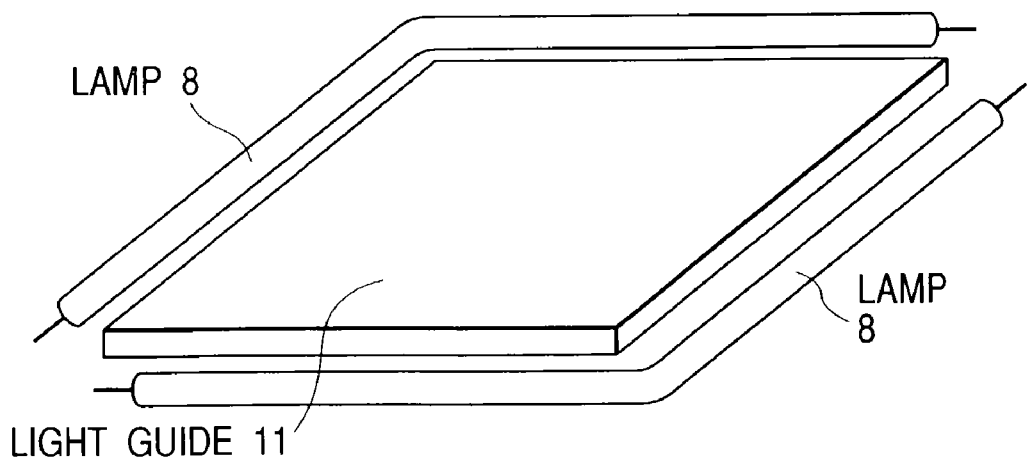
FIG. 25 is a perspective view showing, in connection with a light source unit of a side-edge type incorporated into a liquid crystal display device according to the present invention, one example of a layout in which sides of a light guide are surrounded by an L-shaped light source.

FIG. 25 shows a side-edge type light source unit in which one fluorescent lamps 8 are disposed at each of the long side of the light guide 11. Since the peripheral edges of the light guide 11 are surrounded with two L-shaped fluorescent lamps 8, the brightness of the light source unit can be improved remarkably. Since the two fluorescent lamps are spaced apart from each other, heat from each of the lamps may be radiated easily. Further, non-uniformity in display may hardly be produced by this light source unit, which is effective for restricting the overall size of the liquid crystal display device.

Figure 26A:
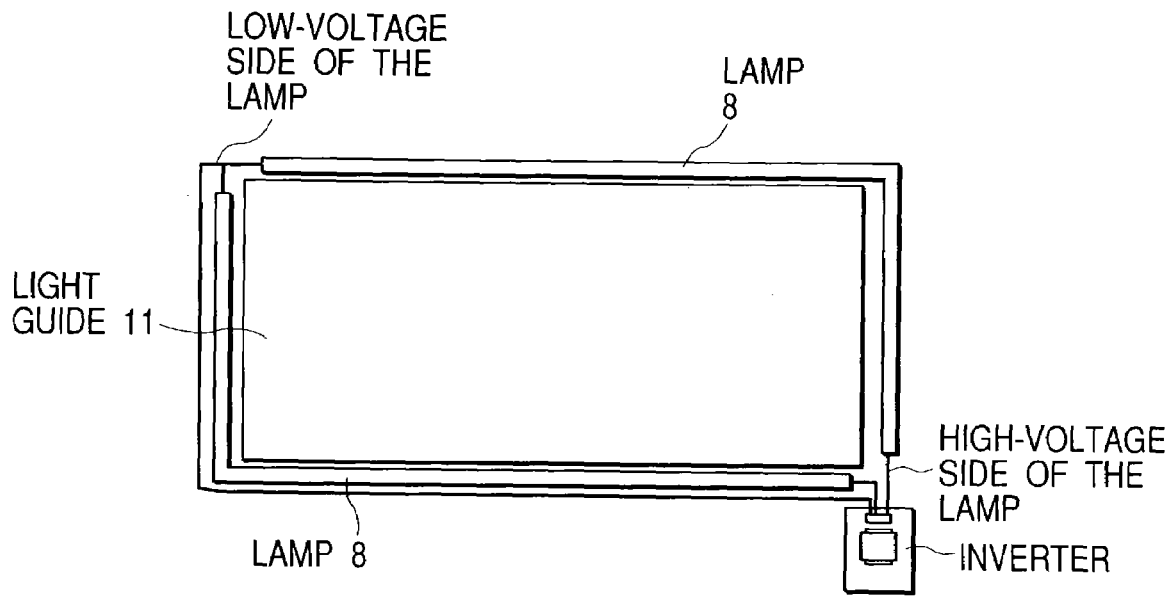
FIGS. 26(a) and 26(b) are plan views plan views showing two examples of an inverter circuit of a light source unit having a layout of FIG. 25 and a circuit configuration of light sources.
Figure 26B:
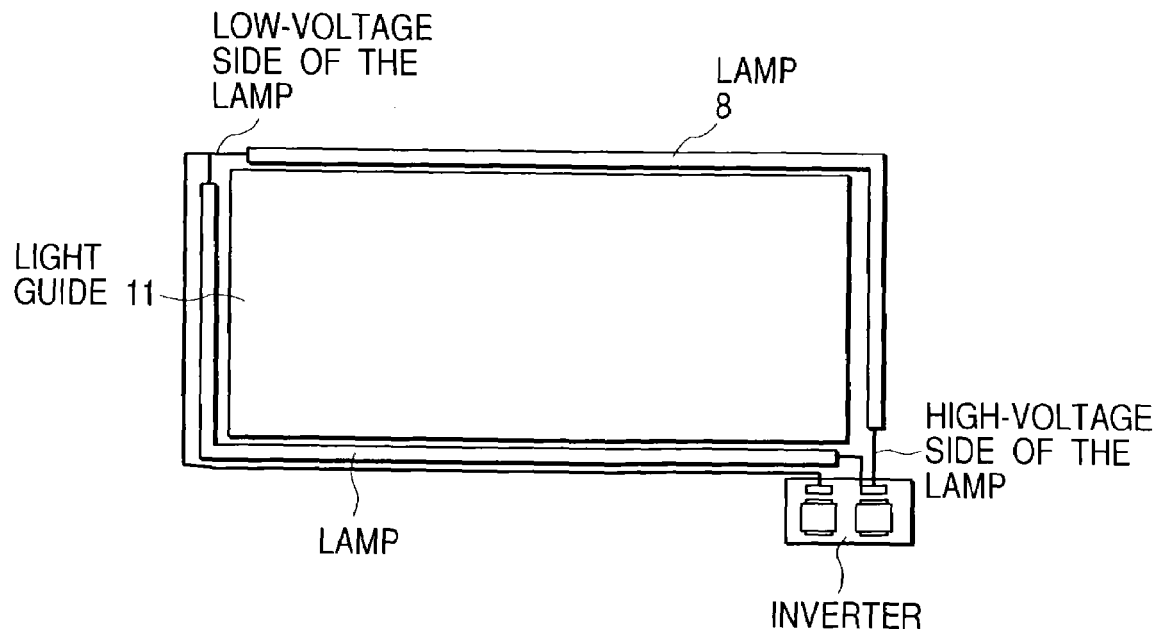

In FIGS. 26(a) and 26(b) is illustrated the inverter arrangement in the light source unit shown in FIG. 25. One transformer can light one or two lamps. In particular, when two lamps are lit with one transformer, power loss is reduced by placing the high-voltage sides of the lamps closer to the transformer.

Figure 27A:
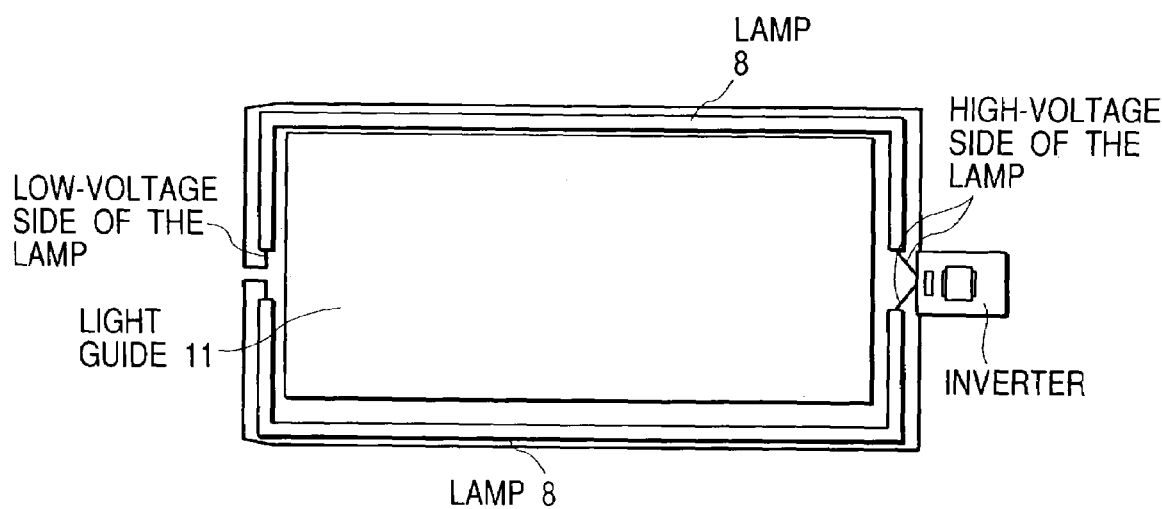
FIG. 27(a) is a perspective view showing, in connection with a light source unit of a side-edge type incorporated into a liquid crystal display device according to the present invention, one example of a layout in which sides of a light guide are surrounded by a U-shaped light source.
Figure 27B:
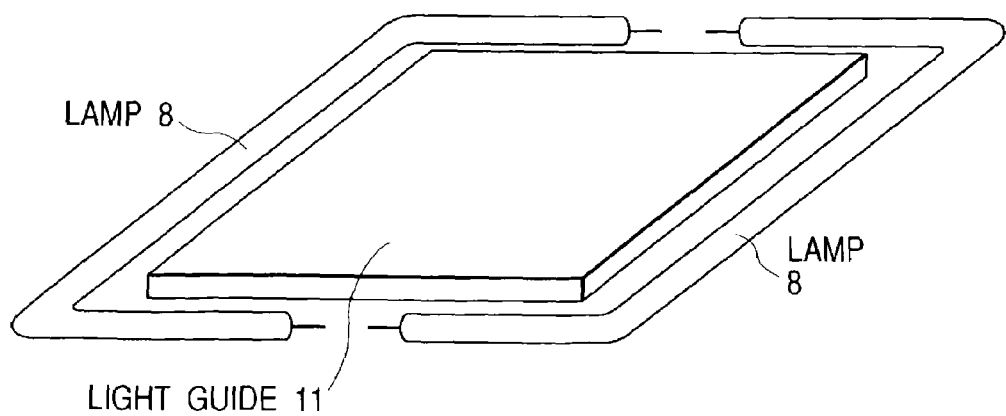
FIG. 27(b) is a plan view showing one example of an inverter circuit and a circuit configuration of light sources corresponding to the layout.

The U-shaped fluorescent lamps shown in FIG. 27(a) or FIG. 27(b) may also be utilized as the fluorescent lamp 8.

Advantages obtained by using the L-shaped or U-shaped fluorescent lamps consist in improved brightness around the periphery of the panel, in particular, the corner portions thereof.

Figure 28A:
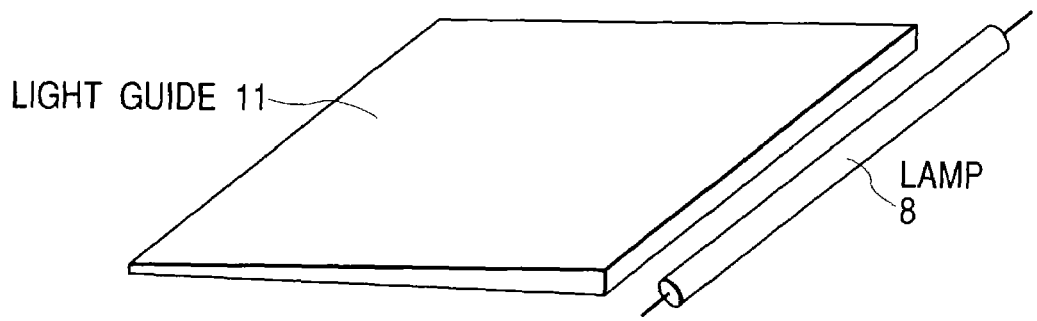
FIG. 28(a) is a perspective view showing, in connection with a light source unit of a side-edge type incorporated into a liquid crystal display device according to the present invention, one example of a layout in which a linear light source is provided on one side of a light guide.
Figure 28B:
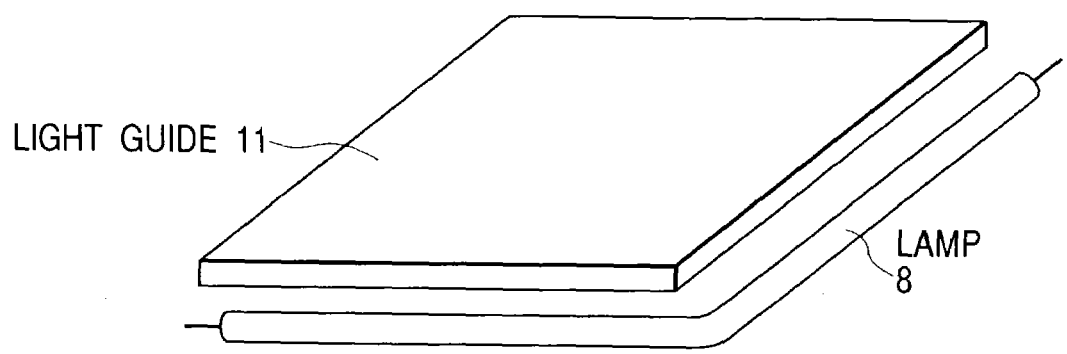
FIG. 28(b) is a perspective view showing one example of a layout in which an L-shaped light source is provided along two sides of a light guide.
Figure 28C:
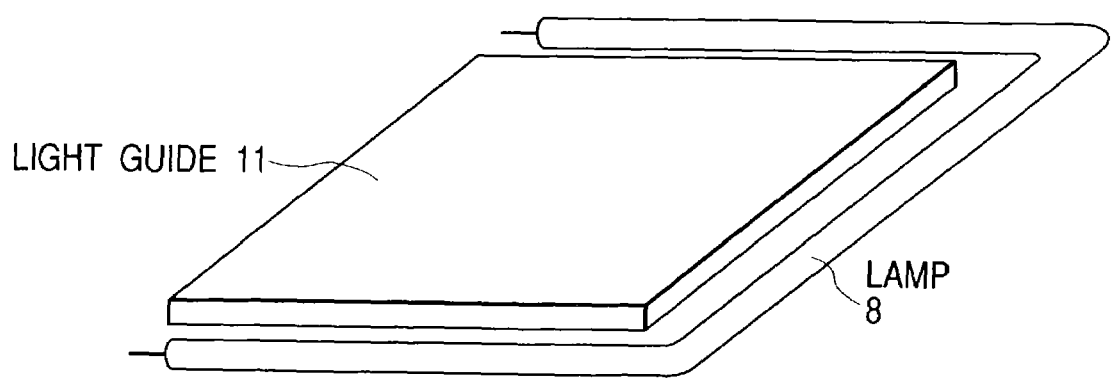
FIG. 28(c) is a perspective view showing one example of a layout in which a U-shaped light source is provided along three sides of a light guide.

FIG. 28(a) shows a side-edge type light source unit in which one fluorescent lamp 8 is disposed along one of long sides of the light guide 11. The light guide 11 has a wedge-shaped cross section in its thickness direction. In addition, the light guide may be formed of a flat plate, and an L-shaped fluorescent lamp 8 may be combined with it as shown in FIG. 28(b), or a U-shaped fluorescent lamp 8 may be combined with it as shown in FIG. 28(c). In the TN type liquid crystal display device, a problem sometimes arises in that, as a position in the display screen is farther from the light source, the brightness at the position becomes darker. The configuration of the light source unit shown in FIG. 28(c) is useful for solving the problem.

Figure 29A:
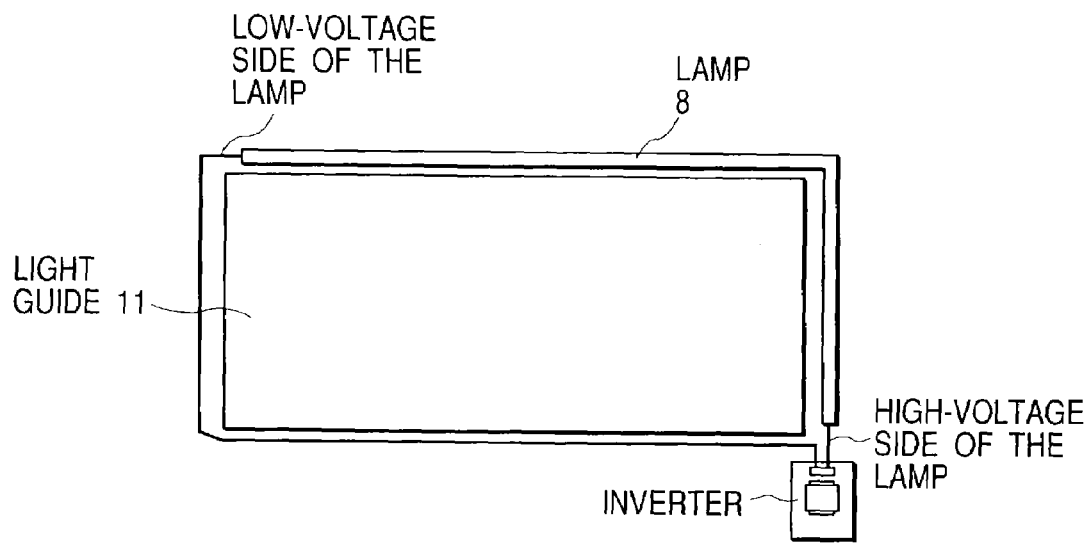
FIG. 29(a) is a plan view of a light source having a layout of FIG. 28(b)
Figure 29B:
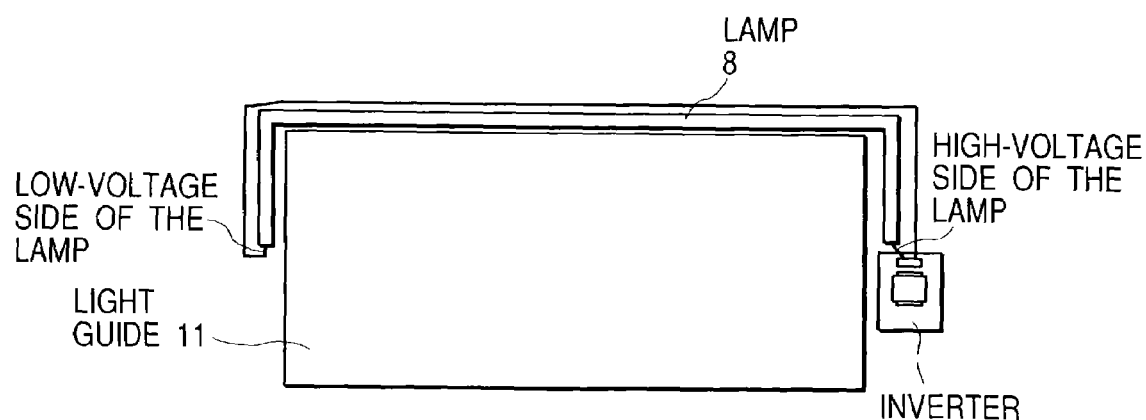
FIG. 29(b) is a plan view showing an inverter circuit and a circuit configuration of a light source unit having a layout of FIG. 28(c); a light source.

Examples of the inverter arrangements in the light source units shown in FIGS. 28(b) and 28(c) is shown in FIG. 29(a) and FIG. 29(b), respectively. Usually, a large number of white dots, for example, are printed on the underside of the light guide 11 for reflecting light are applied at the lower side of the light guide 11, and uniformity of brightness over the entire screen area is improved by reducing the density of the white dots near the lamp and increasing the density of the white dots at portions remote from the lamp.

Figure 30A:
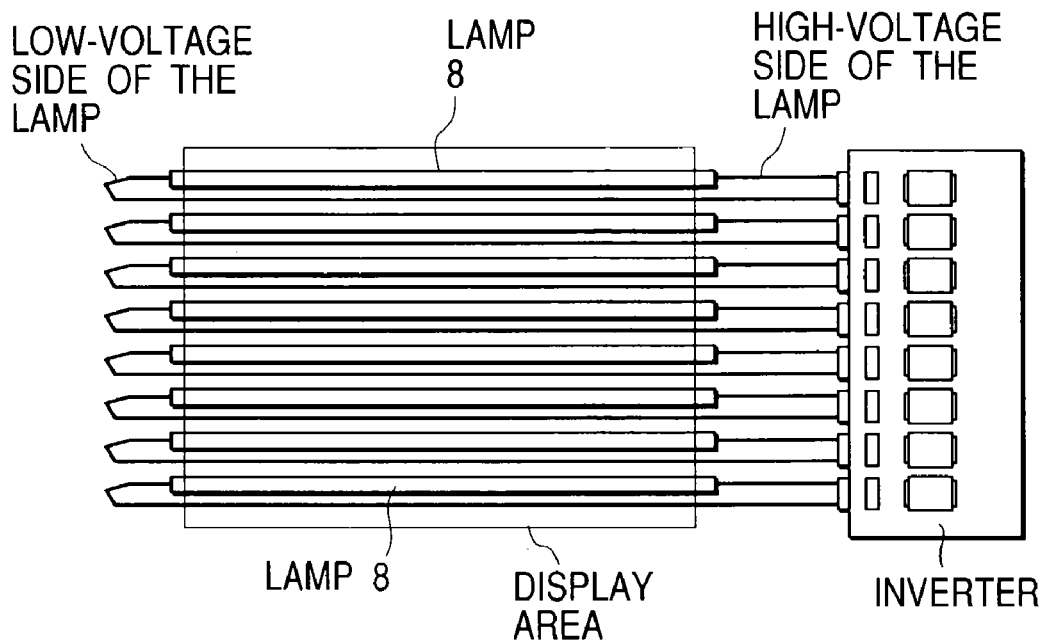
FIGS. 30(a) and 30(b) are plan views showing, in connection with a light source unit of direct-light type incorporated into a liquid crystal display device according to the present invention, two examples of an inverter circuit and a circuit configuration in the light source unit.
Figure 30B:
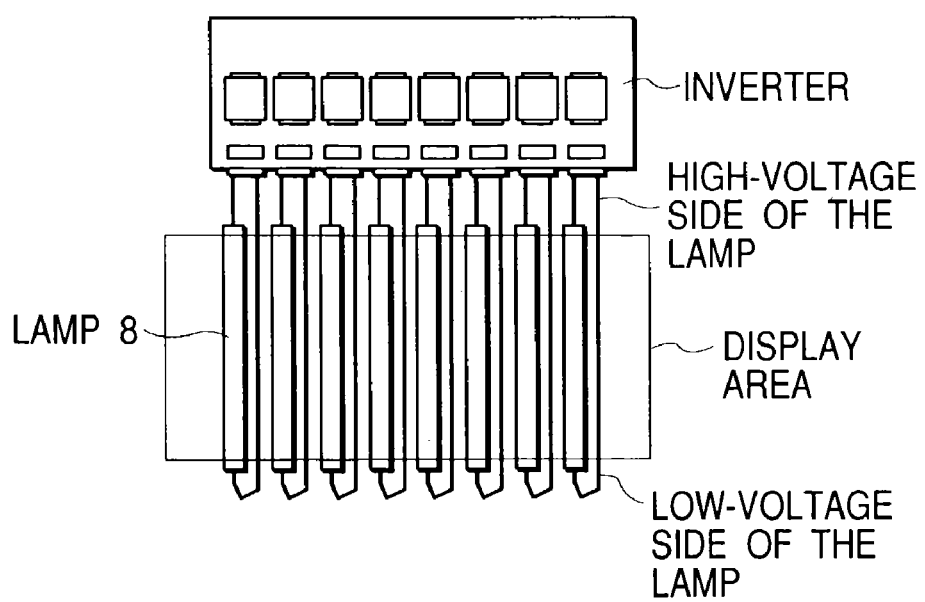
Figure 31:
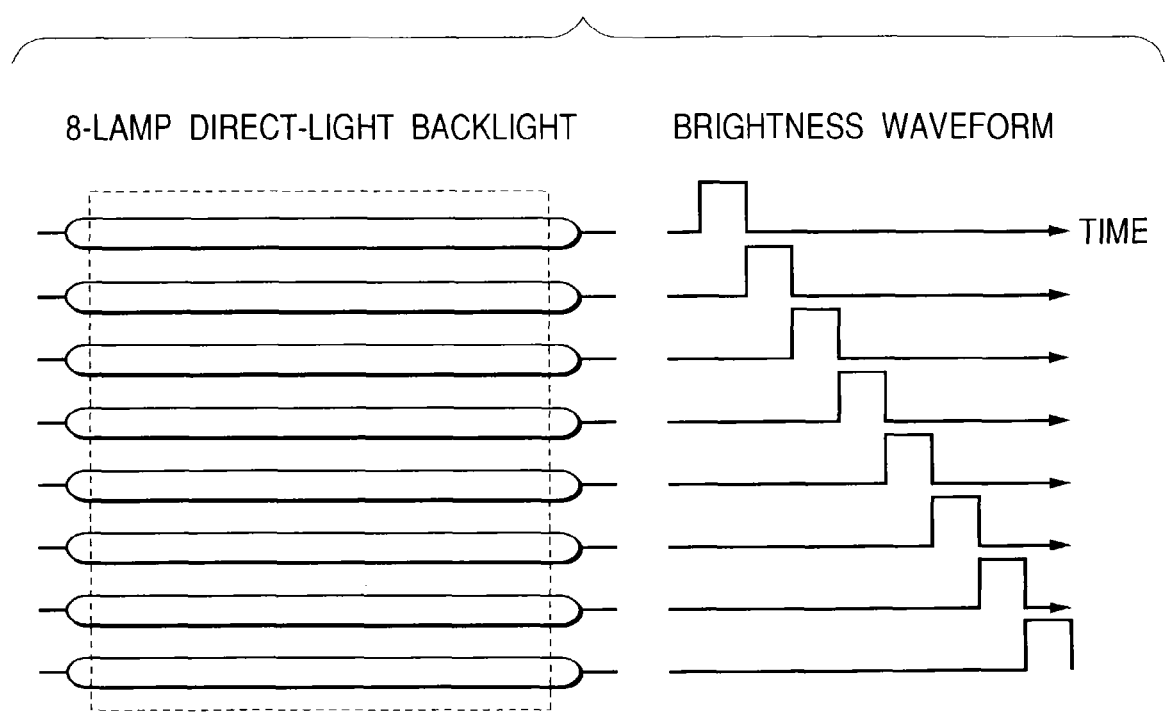
FIG. 31 is an explanatory view showing, in a lighting manner of light sources of a liquid crystal display device proposed for a moving picture display, a layout of light sources (backlight) and its lighting timing.

FIG. 30(a) shows an inverter arrangement in the liquid crystal display device having the direct-light type backlight system described in connection with FIGS. 3(a) and 3(b). Six to eight fluorescent lamps 8 are arranged in a direction of the long sides of the substrate 3. FIG. 30(b) shows a modification of the example shown in FIG. 30(a), and twelve fluorescent lamps 8 are arranged in a direction of the short sides of the substrate 3.

As described above, in the liquid crystal display device employing the lighting operation of the light source in accordance with the present invention, its brightness can be increased without increasing the consumption power heat generation at the light source and occurrence of non-uniformity in display can be suppressed. Accordingly, it is possible to realize the liquid crystal display device having a superior luminous efficacy of the light source of the light source and a superior display uniformity. Further, the liquid crystal display device of the present invention can display pictures or video images with a high contrast ratio as in the case of a cathode ray tube, by increasing brightness of pixels intended for bright images and simultaneously suppressing brightness of pixels intended for dark images.

What is claimed is:

1. A liquid crystal display device comprising:
    a liquid crystal display panel having a plurality of pixels;
    a lighting device having at least one light source and projecting light generated by the at least one light source on the liquid crystal display panel; and
    a circuit supplying a first current during a first period and a second current smaller than the first current during a second period to the at least one light source alternately,
    wherein the circuit has a current monitoring circuit which measures the first current and the second current, and a light control circuit which adjusts a ratio of the first period to the second period based upon a signal from the current monitoring circuit.

2. A liquid crystal display device according to claim 1, wherein a sum of the first period and the second period is kept constant without reference to the ammeter the signal from the current monitoring circuit.

3. A liquid crystal display device according to claim 1, wherein an integral of brightness produced by the at least one light source over the second period is equal to or lower than 90% of brightness of the at least one light source during the first period.

4. A liquid crystal display device according to claim 1, wherein the signal from the current monitoring circuit reflects a temperature variation of the at least one light source.

5. A liquid crystal display device according to claim 1, wherein the at least one light source is a fluorescent lamp.

* * * * *